(12) United States Patent
Masuda et al.

(10) Patent No.: US 6,678,087 B1
(45) Date of Patent: Jan. 13, 2004

(54) OPTICAL AMPLIFIER AND OPTICAL FIBER COMMUNICATION SYSTEM USING THE AMPLIFIER

(75) Inventors: Hiroji Masuda, Yokosuka (JP); Noboru Takachio, Yokosuka (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/633,038

(22) Filed: Aug. 4, 2000

(30) Foreign Application Priority Data

Aug. 6, 1999 (JP) .......................................... 11-224534
Sep. 17, 1999 (JP) .......................................... 11-264493

(51) Int. Cl.$^7$ .............................................. H01S 3/00
(52) U.S. Cl. .................. 359/334; 359/337; 359/337.21; 359/341.1; 359/341.2; 359/341.3; 372/6
(58) Field of Search .............................. 372/6; 359/337, 359/337.21, 341.2, 341.3, 341.32, 334, 341.1; 385/24, 10

(56) References Cited

U.S. PATENT DOCUMENTS

| | | | | |
|---|---|---|---|---|
| 5,189,676 A | * | 2/1993 | Wysocki ........................ | 372/6 |
| 5,234,772 A | * | 8/1993 | Oguchi ..................... | 428/473.5 |
| 5,323,404 A | * | 6/1994 | Grubb ............................ | 372/6 |
| 5,636,301 A | * | 6/1997 | O'Sullivan .................... | 385/24 |

(List continued on next page.)

FOREIGN PATENT DOCUMENTS

| JP | 5-327106 | 12/1993 |
|---|---|---|
| JP | 06043507 | 2/1994 |
| JP | 7-181529 | 7/1995 |

OTHER PUBLICATIONS

White, A. Grubb, S. "Fiber Raman Lasers and Amplifiers," Optical Fiber Telecommunications IIIB, p. 297–317.*
Nishioka, H. et. al. "High Compression Ratio Backward Raman Conversion for High Brightness Excimer Laser Systems," IEEE Journal of Quantum Electronics, vol. 29, No. 7, Jul. 1993.*
Sridhar, B. et al. "Erbium–Doped Fiber Power Amplifiers with Pump Reflecting Mirrors in the 800 nm Band," IEEE Photonics Tech. Lett. vol. 4, No. 8, Aug. 1992.*
Desurvire, E. "Analysis of Gain Difference Between Forward–and Backward–Pumped Erbium–Doped Fiber Amplifiers in the Saturation Regime," IEEE Photonics and Tech Lett. vol. 4, No. 7, Jul. 1992.*
P.C. Becker et al. "Erbium–Doped Fiber Amplifiers: Technology and Applications" Academic Press, 1999, pp. 291–293.*

(List continued on next page.)

Primary Examiner—Thomas G. Black
Assistant Examiner—Stephen Cunningham
(74) Attorney, Agent, or Firm—Ostrolenk, Faber, Gerb & Soffen

(57) ABSTRACT

An optical amplifier is implemented which can reduce its size and cost by using a smaller number of components. Signal light coupled by an optical combiner with pump light fed from a pumping light source is incident on an EDF (erbium-doped fiber) to be pumped and amplified by the pump light, is emitted from the EDF to be incident on a second optical circulator and output from its second port, passes through an optical component to be fed back to the second optical circulator and launched into the EDF from the second optical circulator, passes through the EDF again in the direction opposite to the first passing direction followed by passing through the optical combiner, and is output from the third port of a first optical circulator.

41 Claims, 52 Drawing Sheets

U.S. PATENT DOCUMENTS

| | | | | |
|---|---|---|---|---|
| 5,712,715 | A | * | 1/1998 | Erdogan et al. ........ 359/337.21 |
| 5,812,583 | A | * | 9/1998 | Petersen ...................... 372/27 |
| 5,815,518 | A | * | 9/1998 | Reed et al. .................. 359/334 |
| 5,825,520 | A | * | 10/1998 | Huber ......................... 359/130 |
| 5,867,306 | A | * | 2/1999 | Isshiki ..................... 359/337.1 |
| 5,966,480 | A | * | 10/1999 | LeGrange et al. .......... 359/333 |
| 5,978,131 | A | * | 11/1999 | Lauzon et al. ............ 359/337.5 |
| 6,104,528 | A | * | 8/2000 | Hwang .................. 359/337.11 |
| 6,204,958 | B1 | * | 3/2001 | Taylor ......................... 359/337 |
| 6,215,581 | B1 | * | 4/2001 | Yadlowsky .................. 359/337 |
| 6,236,498 | B1 | * | 5/2001 | Freeman et al. ............ 359/124 |
| 6,310,899 | B1 | * | 10/2001 | Jacobovitz-Veselka et al. 372/3 |
| 6,320,884 | B1 | * | 11/2001 | Kerfoot et al. ............. 359/334 |
| 6,339,494 | B1 | * | 1/2002 | Hwang et al. ........... 359/337.1 |
| 6,342,965 | B1 | * | 1/2002 | Kinoshita ................... 359/334 |
| 6,344,922 | B1 | * | 2/2002 | Grubb et al. ............... 359/334 |
| 6,377,392 | B1 | * | 4/2002 | Mizrahi ................. 359/337.21 |

OTHER PUBLICATIONS

Hansen et al., "Loss Compensation in Dispersion Compensation Fiber Modules by Raman Amplification." OFCC 1998 Tech. Digest, pp. 20–21 (Feb. 1998).*

Emori et al., Broadband Lossless DCF using Raman Amplification Pumped by Multichannel WDM Laser Diodes Elect. Lett. 34:22, Oct. 1998. pp. 2145–2146.*

P.F. Wysocki, et al., "Broad–Band Erbium–Doped Fiber Amplifier Flattened Beyond 40 nm Using Long–Period Grating Filter", IEEE Photonics Technology Letters, vol. 9, No. 10, Oct. 1997, pp. 1343–1345.

E. Desurvire, "Erbium–Doped Fiber Amplifiers", John Wiley & Sons, Inc., Section 6.2, 1994, pp. 461–463.

"100 Nm Bandwidth Flat Gain Raman Amplifiers Pumped and Gain–Equalized by 12–Wavelength–Channel WDM High Power Laser Diodes", Yoshirhiro Emori, et al., Proc. OFC PD19, 1999.

"A 92 nm Bandwidth Raman Amplifier", Karsten Rottwitt, et al., Proc. OFC PD6, 1998.

"Highly Efficient 1.3 µm Raman Fibre Amplifier", E. M. Dianov, et al., Electronics Letters, Apr. 2, 1998, vol. 34, No. 7 pp 669–670/.

"75–nm 3–dB Gain–band Optical Amplification with Erbium–doped Fluoride Fibre Amplifiers and Distributed Raman Amplifiers in 9×2.5–Gb/s WDM Transmission Experiment", Hiroji Masuda, et al., ECOC 97, Sep. 22–25, 1997, Conference Publicaiton No. 448, IEE, 1997.

* cited by examiner

OPTICAL AMPLIFIER AND OPTICAL FIBER COMMUNICATION SYSTEM USING THE AMPLIFIER

This application is based on Japanese Patent Application Nos. 11-224534 (1999) filed Aug. 6, 1999, and 11-264493 (1999) filed Sep. 17, 1999, the contents of which are incorporated hereinto by reference.

BACKGROUND OF THE INVENTION

1. Field of the Invention

The present invention relates to an optical amplifier applicable to an optical fiber communication system and the like, and utilizing an active optical fiber as its gain medium, and to a Raman amplifier capable of improving its gain and pumping efficiency and to an optical fiber communication system using the Raman amplifier.

2. Description of the Related Art

As conventional examples of such optical amplifiers, there are a first configuration as shown in FIG. 21 (see, P. F. Wysocki, et al., IEEE Photon. Technol. Lett., vol.9, pp.1343–1345, 1997), and a second configuration as shown in FIG. 22 (see, E. Desurvire, Erbium-Doped Fiber Amplifiers, John Wiley & Sons, Inc., Section 6.2, 1994). In the optical amplifier of the first conventional configuration as shown in FIG. 21, signal light incident on a first optical isolator 41 is combined by a first optical combiner 42 with pump light fed from a first pumping light source 43, and is incident on a first erbium-doped fiber (called EDF from now on) 44. The EDF 44 amplifies the signal light using the pump light, and the amplified signal light passes through a second optical isolator 45 to be incident on a partially reflective gain equalizer 46. The signal light emerging from the partially reflective gain equalizer 46 passes through a third optical isolator 47, and is combined by a second optical combiner 48 with pump light fed from a second pumping light source 49 to be incident on a second EDF 51. The second EDF 51 amplifies it using the pump light, and the amplified light signal is emitted through a fourth optical isolator 52. In FIG. 21, the symbol "a" designates a fusion splice.

In the second conventional optical amplifier as shown in FIG. 22, signal light is incident on a first port of an optical circulator 61 and emitted from a second port so that it is combined by an optical combiner 63 with pump light fed from a pumping light source 64, and the coupled signal light and pump light are incident on an erbium-doped fiber (EDF) 65, in which the signal light is pumped and amplified by the pump light. The amplified signal light is incident on a wavelength independent reflector 66 which reflects off the signal light to be incident on the EDF 65 from the opposite direction to the first incident direction. Then, the signal light passes through the EDF 65 and is incident on the second port of the optical circulator 61 via the optical combiner 63. The signal light is supplied from the third port of the optical circulator 61 to a gain equalizer 62 to be output therefrom.

The optical amplifiers of the first and second conventional configurations as shown in FIGS. 21 and 22 use rare-earth doped fibers such as the erbium-doped fibers (EDF) 44, 51 and 65 as a gain medium. The rare-earth doped fibers include besides the erbium-doped fiber a praseodymium-doped fiber, thulium-doped fiber depending on the type of the rare-earth material.

The partially reflective gain equalizer 46 is placed in an intermediate position to carry out gain equalization with maintaining the noise figure and optical output of the optical amplifier at good values. The partially reflective gain equalizer 46 consists of a Bragg fiber grading that equalizes the gain spectrum by reflecting part of the signal light in the direction opposite to its propagation direction to give a transmission loss, thereby providing the transmission loss with wavelength dependence.

The partially reflective gain equalizer 46 is interposed between the optical isolators 45 and 47 to prevent the signal light or spontaneously emitted light, which is reflected or amplified by the partially reflective gain equalizer 46, from returning to the first or second EDF 44 or 51, thereby preventing noise because of their return. The two optical isolators 41 and 52 at the two ends are installed to prevent the optical amplifier from becoming instable because of residual reflection light from outside.

FIGS. 23A and 23B illustrate gain spectra of the optical amplifier of FIG. 21, and a loss spectrum of the gain equalizer 46, respectively. FIG. 23A comparatively illustrates two spectra when the gain equalizer is used and not used, which illustrates that the gain equalization is carried out between the wavelengths $\lambda 1$ and $\lambda 2$.

In the second configuration of the optical amplifier as shown in FIG. 22, the pumping efficiency is improved by using the optical circulator 61 and wavelength independent reflector 66. Since the signal light reflected by the wavelength independent reflector 66 passes through the erbium-doped fiber (EDF) 65 twice, the gain (in terms of dB) is twice that of one passage. In addition, since the pump light is also reflected by the wavelength independent reflector 66, the pump light in the EDF is enhanced. FIGS. 24A and 24B illustrate a reflectivity spectrum and a loss spectrum of the wavelength independent reflector 66, respectively. The reflectivity is set high (close to 100%), and the loss is set low. The signal light passing through the EDF 65 twice is guided to the signal light output port by the optical circulator 61, and is output through the gain equalizer 62. The gain spectrum of the amplifier and the loss spectrum of the gain equalizer 62 are the same as those of FIGS. 23A and 23B. The gain equalizer 62 used by the second configuration can be either partially reflective or antireflective. The antireflective gain equalizer includes a Mach-Zehnder optical filter or long period fiber grating.

FIGS. 25A and 25B each show part of the erbium-doped fiber 65 and wavelength independent reflector 66 used in the second configuration: FIG. 25A shows a silicate erbium-doped fiber 65a, whereas FIG. 25B shows a non-silicate erbium-doped fiber 65b. As for the silicate erbium-doped fiber (EDF) 65a, it usually undergoes fusion splicing (denoted by the symbol "a") with adjacent pigtail fibers 67. Generally, the core diameter of the EDF is considerably smaller than that of the pigtail fibers 67, and hence the fusion splicing of the two requires much expense and time. On the other hand, as for the non-silicate erbium-doped fiber (EDF) 65b, since the fusion splicing between the EDF and the pigtail fibers 67 cannot be achieved, high NA (high numerical aperture) silicate fibers 68 and the EDF are butted and bonded at angled polished surfaces (denoted by the symbol "c"), followed by the fusion splicing between the high NA silicate fibers 68 and the pigtail fiber 67 (denoted by the symbol "a")

The first configuration of the conventional optical amplifier as shown in FIG. 21 includes many components such as the EDFs 44 and 51, the pumping light sources 43 and 49, and the optical combiners 42 and 48, which presents a problem of increasing the size and cost of the optical amplifier.

As for the second configuration of the conventional optical amplifier as shown in FIG. 22, since the gain equalizer 62 is installed outside the gain medium EDF, that is, on the output side of the signal light, a problem arises of reducing the optical output power by an amount of the loss of the gain equalizer 62.

Furthermore, since the configuration comprising the EDF 65a or 65b in connection with the wavelength independent reflector 66 as shown in FIG. 25A or 25B requires the fusion splicing made by butting the angled polished surfaces followed by bonding, it has a problem of increasing the number of optical components, and hence increasing the cost of components and assembly.

FIG. 46 is a block diagram showing a first configuration of a conventional Raman amplifier. The Raman amplifier comprises an optical fiber 161, a gain medium of the Raman amplification; a pumping light source 162; an optical combiner 163 for multiplexing the light of the pumping light source 162 with signal light; and an optical isolator 164 for preventing residual reflection light from entering the Raman amplifier.

The pumping light source 162 comprises fiber gratings (FGs) 166 for narrowing oscillation wavelengths of a plurality of laser diodes (LDs) 165; a wavelength selective combiner (WSC) 167 for combining a plurality of wavelengths of the pump light; and an optical isolator 168 for eliminating external residual reflection light (see, Y. Emori et al., Proc. OFC, PD19, 1999).

FIGS. 47A–47C are block diagrams showing application schemes of a conventional or present invention Raman amplifier: FIGS. 47A and 47B each show a scheme when the Raman amplifier is applied to an optical fiber communication system; and FIG. 47C shows a scheme when it is applied to measurement comprising a light source 173 and a measuring system 174. Furthermore, FIG. 47A shows a case of employing a distributed amplifier that utilizes a transmission fiber itself constituting the transmission path as an amplifying medium; and FIG. 47B shows a case used as a linear repeater, post-amplifier or preamplifier installed at a post- or pre-stage of the transmission fiber constituting the transmission path.

Although FIG. 46 shows a case of backward pumping in which the propagation direction of the pump light is opposite to that of the signal light, the following description is also applicable to forward pumping in which the two propagation directions are the same, or to bidirectional pumping.

The optical fiber 161 as shown in FIG. 46 corresponds to a transmission fiber 171 or Raman fiber 172. The transmission fiber 171 consists of a 1.3 μm zero-dispersion single-mode fiber (SMF) or 1.5 μm dispersion-shifted fiber (DSF). In the Raman fiber 172 as shown in FIGS. 47B and 47C, the composition and structure parameters of the optical fiber are set to increase the Raman gain coefficient. Generally speaking, as to the silicate fiber, the Raman gain coefficient increases with the $GeO_2$ concentration in the fiber core or with the decrease in the mode diameter of propagation light (with an increase in the numerical aperture).

The length of the transmission fiber 171 is several tens of kilometer, whereas that of the Raman fiber 172 is a few kilometers. Thus, when using the transmission fiber 171, the signal light is amplified dispersedly in the transmission fiber, whereas when using the Raman fiber 172, the signal light is amplified concentratedly at a pre- or post-stage of the transmission fiber 171.

As described above, using the transmission fiber 171 as the optical fiber 161 can improve the optical noise characteristic as compared with using the Raman fiber 172 as the optical fiber 161 because the former amplifiers the signal light dispersedly. On the other hand, using the Raman fiber 172 as the optical fiber 161 has a characteristic of obviating restriction to the transmission fiber 171 as compared with using the transmission fiber 171 as the optical fiber 161 because the former amplifies the signal light concentratedly.

The pumping light source 162 includes, as its lasers, wavelength multiplexed laser diodes (LDs), or single wavelength or wavelength multiplexed fiber Raman lasers (see, K. Rottwitt et al., Proc. OFC, PD6, 1998 or E. M. Dianov et al., Electron. Lette., Vol.34, No.7, pp.669–670, 1998). The Raman amplifier with the structure as shown in FIG. 46 is highly reliable, highly stable and compact, constituting a more practical LDs than others. Generally, since the pumping efficiency of the Raman amplification using the optical fiber is low, the pump light power from a few hundred milliwatts to a few Watts is required. The pump light power of a single LD is usually a few hundred milliwatts. Accordingly, it is normal that the wavelength division multiplexing configuration of the pump light is employed as shown in FIG. 46. Although three LDs are used in this case, any number of LD or LDs can be employed.

As described above, to achieve the wavelength division multiplexing of the pump light, the pumping light source comprises the fiber gratings (FGs) for narrowing the oscillation wavelengths of the LDs; the wavelength selective combiner (WSC) for carrying out the wavelength division multiplexing of the pump light waves of different wavelengths; and the optical isolator for removing the external residual reflection light. Generally, the LDs are a Fabry-Perot LD, the transmission width of the FGs is less than about 1 nm and the spacing between adjacent wavelengths of the LDs is about 10 nm. The oscillation spectrum width of the LDs before passing through the FGs is about 10 nm. Thus, a configuration is proposed in which the spacing between adjacent wavelengths of the LDs are set greater than 10 nm to obviate the FGs (see, H. Masuda et al., Proc. ECOC, Post Dead-Line Paper, pp.73–76, 1997, for example). When the number of LDs is one, it is obvious that the wavelength selective combiner is unnecessary. Generally, the wavelength division multiplexing of the pump light waves is employed not only for increasing the total pump light power, but also for increasing the bandwidth of the Raman gain. The wavelength selective combiner consists of a Mach-Zehnder waveguide circuit (MZ-PLC) or an arrayed waveguide (AWG).

FIG. 48 is a block diagram showing a second configuration of the conventional Raman amplifier that carries out optical polarization division multiplexing of the pump light waves using polarization beam couplers (PBC) 173 to achieve higher total pump light power than the configuration as shown in FIG. 46.

FIG. 49 shows the transmittance spectra of three ports of the wavelength selective combiner 167, which illustrates the high transmittance at the pump light wavelengths.

FIG. 50 is a diagram showing a third configuration of the conventional Raman amplifier, which is disclosed in a document, E. M. Dianov et al., Electron. Lett., Vol.34, No.7, pp.669–670, 1998. The third configuration differs from the first and second configurations in that it carries out the pumping of the optical fiber using a single wavelength rather than using a plurality of wavelengths as in the first and second configurations. A high NA fiber 171 as shown in FIG. 50 is a kind of the optical fibers. FIG. 51 schematically illustrates the difference between a gain spectrum of the single wavelength pumping and that of the multiwavelength pumping. The multiwavelength pumping has wider bandwidth. This differs clearly from the case of the EDFA which employs the multiwavelength pumping to increase the pump light power. In the EDFA, the gain spectra are the same for both the single wavelength pumping and the multiwavelength pumping.

In the third configuration, a considerable amount of the pump light emitted from the high NA fiber 171 is reflected to be incident on the high NA fiber again, increasing its total pump light. As a result, the gain is increased because the Raman gain (internal value) in terms of dB is proportional to the total pump light power. The reflection of the pump light is carried out by guiding the pump light emitted from the high NA fiber to an input port of the 4-port fiber optical combiner and divider to divide it from the signal light, by causing the pump light emitted from the output port of the 4-port fiber optical combiner and divider to reflect off a fiber grating (FG) 175, and by returning the reflected pump light from the output port to the input port. In FIG. 50, the reference numeral 174 designates an optical isolator, 172 designates an optical combiner and 173 designates the optical combiner and divider.

As described above, the conventional Raman amplifier has low pumping efficiency, and hence requires high power pumping light source, which presents a problem of increasing the number of components of the pumping light source and its cost. In contrast, when the total pump light power of the pumping light source is limited, it presents a problem of being unable to provide a sufficient gain of the signal light.

Furthermore, in the third configuration, the pump light emerging from the high NA fiber passes through the 4-port fiber optical combiner and divider twice before returning to the high NA fiber, and hence undergoes a loss because of the insertion loss of the 4-port fiber optical combiner and divider. This presents a problem of being unable to neglect the insertion loss because it is no less than about 0.5 dB for a single passage, and 1 dB for twice passages. Moreover, the 4-port fiber optical combiner and divider has wavelength dependence of the insertion loss in the signal light wavelength region, and this presents a problem of providing an excessive loss for a wideband signal light.

SUMMARY OF THE INVENTION

The present invention is implemented to solve the foregoing problems. Therefore, an object of the present invention is to provide a small, inexpensive optical amplifier with a reduced number of components.

Another object of the present invention is to provide an optical amplifier capable of increasing its gain and pumping efficiency, and an optical fiber communication system using the optical amplifier.

To accomplish the foregoing problems, according to one aspect of the present invention, there is provided an optical amplifier comprising: a first optical circulator having a first port for receiving signal light, and a second port for emitting the signal light; a pumping light source for generating pump light; an optical combiner for combining the signal light emitted from the second port of the first optical circulator with the pump light fed from the pumping light source; an active optical fiber constituting a gain medium for receiving the signal light and pump light from the optical combiner, and for amplifying the signal light with being pumped by the pump light; and a second optical circulator having a first port for receiving the signal light passing through the active optical fiber, a second port for emitting the signal light, and a third port for receiving the signal light again to return it to the first port to be output from the first port, wherein the signal light emitted from the first port of the second optical circulator passes through the active optical fiber again in a direction opposite to a first incident direction, and the signal light passing through the active optical fiber in the opposite direction is incident on the second port of the first optical circulator via the optical combiner to be output from a third port of the first optical circulator.

This makes it possible to reduce the number of the components because the signal light passing through the first optical circulator and optical combiner and then through the active optical fiber is returned toward the active optical fiber through the second optical circulator to be incident again on the active optical fiber from the opposite direction.

According to another aspect of the present invention, there is provided an optical amplifier comprising: a first optical circulator having a first port for receiving signal light, and a second port for emitting the signal light; a pumping light source for generating pump light; an optical combiner for combining the signal light emitted from the second port of the first optical circulator with the pump light fed from the pumping light source; an active optical fiber constituting a gain medium for receiving the signal light and pump light from the optical combiner, and for amplifying the signal light with being pumped by the pump light; a gain equalizer on which the signal light and pump light passing through the active optical fiber are incident, the gain equalizer being antireflective for the signal light; and a reflector for reflecting the signal light emitted from the gain equalizer to be incident on the gain equalizer, wherein the signal light reflected by the reflector and passing through the gain equalizer again passes through the active optical fiber again in a direction opposite to a first incident direction, and the signal light passing through the active optical fiber in the opposite direction is incident on the second port of the first optical circulator via the optical combiner to be output from a third port of the first optical circulator.

This makes it possible to considerably reduce the number of components because the signal light passing through the optical circulator and optical combiner and then through the active optical fiber passes through the antireflective gain equalizer twice before and after reflected on the reflector to be incident on the active optical fiber again from the opposite direction, halving the transmission loss as compared with the conventional system because of passing through the antireflective gain equalizer twice.

According to still another object of the present invention, there is provided an optical amplifier comprising: a first optical circulator having a first port for receiving signal light, and a second port for emitting the signal light; a pumping light source for generating pump light; an optical combiner for combining the signal light emitted from the second port of the first optical circulator with the pump light fed from the pumping light source; an active optical fiber constituting a gain medium for receiving the signal light and pump light from the optical combiner, and for amplifying the signal light with being pumped by the pump light; and a reflector for reflecting the signal light passing through the active optical fiber such that the signal light travels through the active optical fiber in a direction opposite to a first incident direction, the reflector having a reflectivity depending on a wavelength of the signal light, and having a gain equalizing function, wherein the signal light reflected by the reflector after undergoing gain equalization by the reflector passes through the active optical fiber again in the direction opposite to the first incident direction, and the signal light passing through the active optical fiber in the opposite direction is incident on the second port of the first optical circulator via the optical combiner to be output from a third port of the first optical circulator.

This makes it possible to obviate the gain equalizer needed in the conventional system and to reduce the number of the components because the signal light passing through the optical circulator and optical combiner and then through the active optical fiber reflects off the reflector with the gain equalization function to be incident on the active optical fiber again from the opposite direction.

The reflector may comprise a fiber grating disposed in the active optical fiber for reflecting the signal light, and wherein the fiber grating carries out the gain equalization with a reflectivity independent of the signal light wavelength or a reflectivity dependent on the signal light wavelength.

This makes it possible to reduce the number of the components and the cost of the system because the reflector is composed of the fiber grating incorporated in the active optical fiber to reflect off the signal light.

The active optical fiber may consist of one of a rare-earth doped fiber and a Raman fiber.

This makes it possible to employ a rare-earth doped fiber or Raman fiber as the active optical fiber.

The second optical circulator may transmit at a low loss the pump light which is emitted from the pumping light source and passes through the active optical fiber, and launch the pump light into the active optical fiber again.

This makes it possible to reduce the number of the components and cost of the system because the second optical circulator passes the pump light, which is output from the pumping light source and passes through the active optical fiber, at the low loss to be incident on the active optical fiber again.

The reflector may comprise a mirror for reflecting at a high reflectivity the pump light which passes through the active optical fiber and the gain equalizer, and is incident on the mirror.

This makes it possible to prevent the reduction in the optical output power of the signal light which passes through the gain equalizer and is amplified by the active optical fiber because the reflector comprises the mirror for reflecting the pump light, which passes through the gain equalizer and is incident on the mirror, at high reflectivity.

The reflector with the wavelength dependent reflectivity may comprise a pump light fiber grating and a signal light fiber grating deposited in series for reflecting the pump light passing through the active optical fiber at a high reflectivity.

This makes it possible to reflect the pump light passing through the active optical fiber at the high reflectivity because the reflector with the wavelength dependent reflectivity comprises the fiber grating for the pump light and the fiber grating for the signal light.

The fiber grating disposed in the active optical fiber may comprise a pump light fiber grating and a signal light fiber grating deposited in series for reflecting the pump light passing through the active optical fiber at a high reflectivity.

This makes it possible to reflect the pump light passing through the active optical fiber at high reflectivity because the fiber grating incorporated in the active optical fiber comprises the pump light fiber grating and signal light fiber grating.

The optical amplifier may further comprise a second optical amplifier that is disposed at an input side of the first port of the first optical circulator on which the signal light is incident, that includes a second active optical fiber, and that has a sufficient gain for reducing a noise figure of the optical amplifier after the first optical circulator.

This makes it possible to positively reduce the noise figure of the optical amplifier after the optical circulator because the system comprises the short second active optical fiber installed before the optical amplifier, that is, at the input side of the optical circulator on which the signal light is incident, thereby providing the second optical amplifier with the sufficient amplification.

According to another aspect of the present invention, there is provided an optical amplifier comprising: an optical fiber operating as a gain medium of a Raman amplifier; a pumping light source for pumping the optical fiber; an optical combiner for combining pump light fed from the pumping light source with input signal light; and a pump light reflector for reflecting the pump light passing through the optical fiber.

It corresponds to the embodiments as shown in FIGS. 26, 28 and 30, which is capable of increasing the total power of the input pump light because the pump light passing through the optical fiber without loss is reflected by the pump light reflector to be incident to the optical fiber again. Since the internal Raman gain (the gain in the optical fiber measured in terms of dB) is proportional to the total power of the input pump light, the internal Raman gain is considerably increased as compared with that of the conventional Raman amplifier, which improves the pumping efficiency of the Raman amplifier.

According to another aspect of the present invention, there is provided an optical amplifier comprising: an optical fiber operating as a gain medium of a Raman amplifier; a pumping light source for pumping the optical fiber; an optical combiner and divider for combining and dividing the pump light from the pumping light source with and from input signal light; a signal light reflector for reflecting the signal light passing through the optical fiber; and an optical circulator for emitting from its two different ports the signal light reflected by the signal light reflector and the input signal light.

It corresponds to the embodiment as shown in FIG. 31, and has an advantage over the conventional configuration of being able to double the signal light gain so long as the Raman gain is not saturated by the signal light.

According to another aspect of the present invention, there is provided an optical amplifier comprising: an optical fiber operating as a gain medium of a Raman amplifier; a pumping light source for pumping the optical fiber from an opposite direction to a propagation direction of signal light; a signal light reflector for reflecting the signal light passing through the optical fiber; and an optical circulator for receiving at its two different ports the signal light reflected by the signal light reflector and the input signal light, wherein the signal light reflector transmits the pump light fed from the pumping light source at a low loss.

It corresponds to the embodiment as shown in FIG. 33, and differs from the embodiment as shown in FIG. 31 in that it does not comprise the optical combiner and antireflection terminator. As to the improvement of the signal light gain, it offers an advantage over the conventional configuration of being able to double the signal light gain.

According to another aspect of the present invention, there is provided an optical fiber operating as a gain medium of a Raman amplifier; a pumping light source for pumping the optical fiber from an opposite direction to a propagation direction of signal light; a signal light reflector for reflecting the signal light passing through the optical fiber; a pump light reflector for reflecting pump light passing through the optical fiber; and an optical circulator for receiving at its two different ports the signal light reflected by the signal light reflector and the input signal light, wherein the signal light reflector transmits the pump light fed from the pumping light source at a low loss, and the pump light reflector transmits the signal light at a low loss.

It corresponds to the embodiment as shown in FIG. 34, and has the advantages of both the embodiments as shown in FIGS. 26 and 33, thus markedly improving the signal light gain.

According to another aspect of the present invention, there is provided an optical amplifier comprising: an optical fiber operating as a gain medium of a Raman amplifier; a pumping light source for pumping the optical fiber from a forward direction with respect to a propagation direction of signal light; an optical combiner and divider for combining and dividing pump light fed from the pumping light source with and from input signal light; a signal light reflector for reflecting the signal light passing through the optical fiber; a pump light reflector for reflecting pump light fed from the pumping light source and passing through the optical fiber; and an optical circulator for receiving at its two different ports the signal light reflected by the signal light reflector and the input signal light, wherein when the signal light reflector is disposed closer to the optical fiber than the pump light reflector is, the signal light reflector transmits the pump light fed from the pumping light source at a low loss, whereas when the pump light reflector is disposed closer to the optical fiber than the signal light reflector is, the pump light reflector transmits the signal light at a low loss.

It corresponds to the embodiment as shown in FIG. 35, and has the advantages of both the embodiments as shown in FIGS. 26 and 33, thus markedly improving the signal light gain as the embodiment as shown in FIG. 34.

The pumping light source may comprises a plurality of lasers with different wavelengths, and the pump light reflector may reflect all the pump light with different wavelengths fed from the lasers.

It corresponds to a combination of the embodiment as shown in FIG. 26 and one of the embodiments as shown in FIGS. 31, 33, 34 and 35.

Here, the pumping light source may comprise a laser diode with a gain independent of a polarization of propagated light, wherein the laser diode may have a front end surface undergone antireflection processing and a rear end surface undergone reflection processing, and wherein the pump light reflector may reflect the pump light with different wavelengths fed from the laser, and transmit the signal light at a low loss.

The pumping light source may comprise a plurality of laser diodes for oscillating light waves of different wavelengths with a gain independent of polarization of propagated light, and a wavelength selective optical combiner and divider for combining the plurality of pump light waves fed from the plurality of laser diodes, wherein the laser diodes may each have a front end surface undergone antireflection processing and a rear end surface undergone reflection processing, and wherein the pump light reflector may reflect all the pump light waves with different wavelengths fed from the laser diodes, and transmit the signal light at a low loss.

The pumping light source may comprise a laser diode with its front end surface undergone an antireflection processing and its rear end surface undergone a high reflection processing, wherein the pump light reflector may reflect the pump light with different wavelengths fed from the laser diode, and transmit the signal light at a low loss, and wherein optical components transmitting the pump light from the pumping light source may each consist of a polarization maintaining optical component for the pump light.

The pumping light source may comprise a plurality of laser diodes for oscillating light waves of different wavelengths, and a wavelength selective optical combiner and divider for combining the plurality of pump light waves fed from the plurality of laser diodes, wherein the laser diodes may each have a front end surface undergone antireflection processing and a rear end surface undergone reflection processing, wherein the pump light reflector may reflect all the pump light waves with different wavelengths fed from the laser diodes, and transmit the signal light at a low loss, and wherein optical components transmitting the pump light from the pumping light source may each consist of a polarization maintaining optical component for the pump light.

These aspects of the present invention correspond to the combination of the embodiment as shown in FIG. 28 and one of the embodiments as shown in FIGS. 31, 33, 34 and 35.

The pumping light source may comprise a pair of laser diodes for oscillating light waves of a same wavelength, and a polarization beam combiner and divider for combining two pump light waves with different polarization from two laser diodes, wherein the laser diodes may each have a front end surface undergone antireflection processing and a rear end surface undergone reflection processing, and wherein the pump light reflector may reflect the plurality of the pump light waves with different wavelengths fed from the laser diodes, and transmit the signal light at a low loss.

The pumping light source may comprise a plurality of pairs of laser diodes, each pair including two laser diodes for oscillating light waves of a same wavelength; a natural number of polarization beam combiner and dividers each for combining pump light waves from two laser diodes in each pair, and a wavelength selective optical combiner and divider for combining the combined pump light waves output from the polarization beam combiner and dividers, wherein the laser diodes may each have a front end surface undergone antireflection processing and a rear end surface undergone reflection processing.

These aspects of the present invention correspond to a combination of the embodiment as shown in FIG. 30 and one of the embodiments as shown in FIGS. 31, 33, 34 and 35.

According to another aspect of the present invention, there is provided an optical fiber communication system for transmitting signal light via an optical fiber using an optical amplifier, the optical amplifier comprising: an optical fiber operating as a gain medium of a Raman amplifier; a pumping light source for pumping the optical fiber; an optical combiner for combining pump light fed from the pumping light source with input signal light; and a pump light reflector for reflecting the pump light passing through the optical fiber, wherein the optical fiber is a transmission optical fiber for amplifying the optical signal dispersedly.

It corresponds to the optical fiber communication system utilizing one of the Raman amplifiers as shown in FIGS. 26, 28 and 30, which accept either a plurality of waves undergone wavelength division multiplexing or a single wavelength passing through time division multiplexing. In a field associated with the optical fiber communication system such as measurement, the signal light may consist of a plurality of wavelengths or a single wavelength.

According to one aspect of the present invention, the number of components and the cost of the components and assembly can be reduced because it is configured such that the signal light passing through the first optical circulator and optical combiner and then through the active optical fiber is returned via the second optical circulator to be incident on the active optical fiber again from the opposite direction.

According to another aspect of the present invention, the number of components and the cost of the components and assembly can be reduced because it is configured such that the signal light passing through the optical circulator and optical combiner and then through the active optical fiber passes through the antireflective gain equalizer twice before and after reflected by the reflector, and is incident on the active optical fiber again from the opposite direction. In addition, since the signal light passes through the antireflective gain equalizer twice, the transmission loss is reduced as compared with that of the conventional system.

According to another aspect of the present invention, the number of components and the cost of the components and assembly can be reduced because it is configured such that the signal light passing through the optical circulator and optical combiner and then through the active optical fiber is reflected by the reflector with the function of the gain equalization, and is incident on the active optical fiber again from the opposite direction. In particular, since it obviates the gain equalizer required by the conventional system, it can further reduce the number of components.

According to another aspect of the present invention, the number of components and the cost can be reduced because its reflector consists of the fiber grating incorporated in the active optical fiber for reflecting the signal light.

According to another aspect of the present invention, the number of components and the cost can be reduced because the second optical circulator transmits the pump light, which is emitted from the pumping light source and passes through the active optical fiber, at the low loss, and makes it incident on the active optical fiber again.

According to another aspect of the present invention, the number of components and the cost can be reduced because the reflector comprises the mirror for reflecting at the high reflectivity the pump light which passes through the active optical fiber and is incident on the mirror after passing through the gain equalizer. In addition, since the signal light is amplified again by the active optical fiber after passing through the gain equalizer, the reduction in the optical output power can be prevented.

According to another aspect of the present invention, the number of components and the cost can be reduced because the reflector with wavelength dependent reflectivity comprises the pump light fiber grating and the signal light fiber grating, which also makes it possible to reflect the pump light passing through the active optical fiber at the high reflectivity.

According to another aspect of the present invention, the number of components and the cost can be reduced because the fiber grating incorporated in the active optical fiber comprises the pump light fiber grating and signal light fiber grating, which also makes it possible to reflect the pump light passing through the active optical fiber at the high reflectivity.

According to another aspect of the present invention, the noise figure of the optical amplifier after the optical circulator can be positively reduced because it comprises not only the short second active optical fiber before the optical amplifier, that is, at the input side of the optical circulator on which the signal light is incident, but also the second optical amplifier with the sufficient gain.

According to another aspect of the present invention, the Raman amplifier comprises an optical fiber as the gain medium of the Raman amplifier, a pumping light source for pumping the optical fiber, an optical combiner for coupling the pump light fed from the pumping light source with the signal light, and a pump light reflector for reflecting the pump light passing through the optical fiber, and reflects the pump light passing through the optical fiber without loss by the pump light reflector to be incident on the optical fiber again, which makes it possible to increase the total power of the input pump light. On the other hand, since the internal Raman gain is proportional to the total power of the input pump light, the internal Raman gain is increased considerably as compared with that of the conventional Raman amplifier, offering an advantage of being able to improve the pumping efficiency of the Raman amplifier.

Using the embodiments of the optical amplifier in accordance with the present invention makes it possible to construct an optical fiber communication system that can accept either the signal light including a plurality of wavelengths passing through the wavelength division multiplexing, or the signal light consisting of a single wavelength passing through the time division multiplexing.

The above and other objects, effects, features, and advantages of the present invention will become more apparent from the following description of embodiments thereof taken in conjunction with the accompanying drawings.

DESCRIPTION OF THE PREFERRED EMBODIMENTS

The embodiments of the present invention will now be described with reference to the accompanying drawings.

Figure 1:
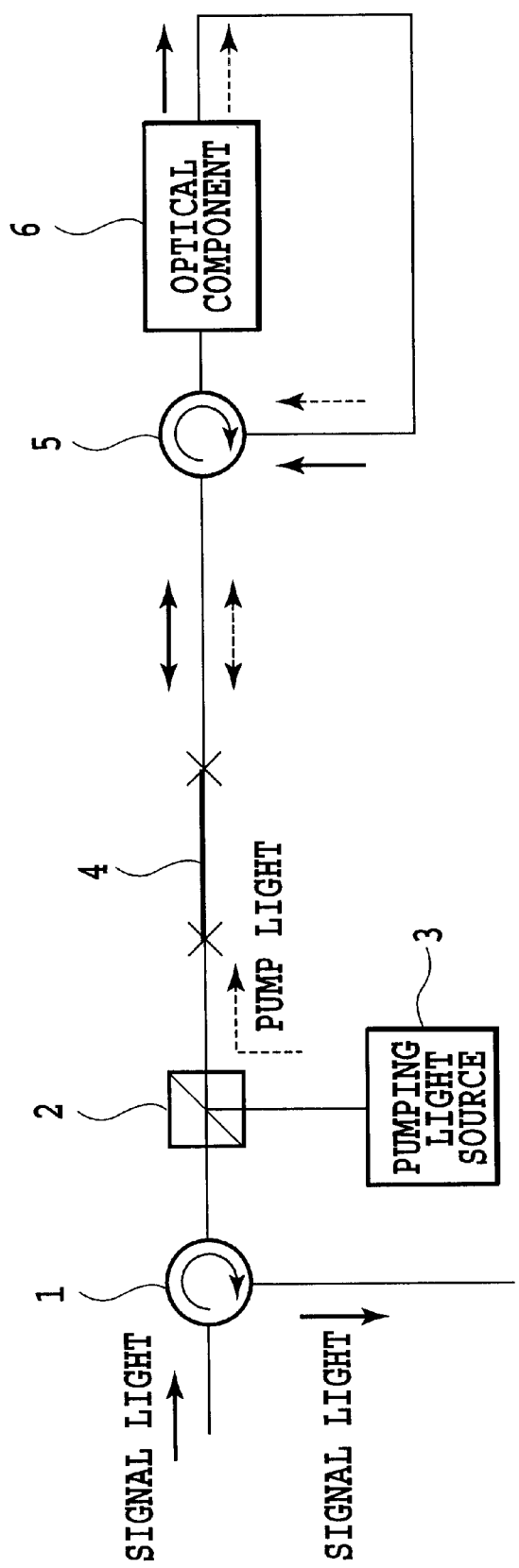
FIG. 1 is a block diagram showing a first embodiment of an optical amplifier in accordance with the present invention.

FIG. 1 is a block diagram showing a configuration of a first embodiment of the optical amplifier in accordance with the present invention. In the first embodiment of the optical amplifier as shown in FIG. 1, signal light is incident on the first port of a first optical circulator 1, and the signal light emitted from its second port is combined with the pump light from a pumping light source 3 by an optical combiner 2. The combined signal light and pump light are incident on an erbium-doped fiber (abbreviated as EDF) 4 functioning as a gain medium so that the signal light is amplified by the pump light that pumps it, and the amplified signal light is emitted from the EDF 4 together with the pump light to be incident on the first port of a second optical circulator 5. Then the signal light is emitted from the second port of the second optical circulator 5, passes through an optical component 6 to be incident on the third port of the second optical circulator 5, is incident on the EDF 4 from its first port in the reverse direction, passes through the EDF 4 in the direction opposite to the first incident direction to be launched into the second port of the first optical circulator 1 via the optical combiner 2, and is output from its third port.

Although the erbium-doped fiber (EDF) 4, an active optical fiber, is used as a gain medium in the present embodiment, this is not essential. The gain medium can be a rare-earth doped fiber or a Raman fiber, although the present embodiment employs the erbium-doped fiber, one of the rare-earth doped fibers.

The optical component 6 can be one of a gain equalizer and an optical inserting/branching circuit, which have a signal light loss. Since the signal light is reflected through the optical circulator 5 with a function of an optical isolator, the optical component 6 can be a partially reflective gain equalizer, or an optical inserting/branching circuit with directionality for the signal light because of using a directional coupler. Alternatively, the optical component 6 can be an antireflective gain equalizer.

Furthermore, the configuration without including the optical component 6 is possible. In this case, the signal light is simply reflected by the optical circulator 5 which functions as a reflector (mirror) of the signal light. The reflector has an advantage of having high durability to the optical power and being inexpensive as compared with a normal reflector consisting of a glass plate with metal film deposited thereon.

Figure 23A:
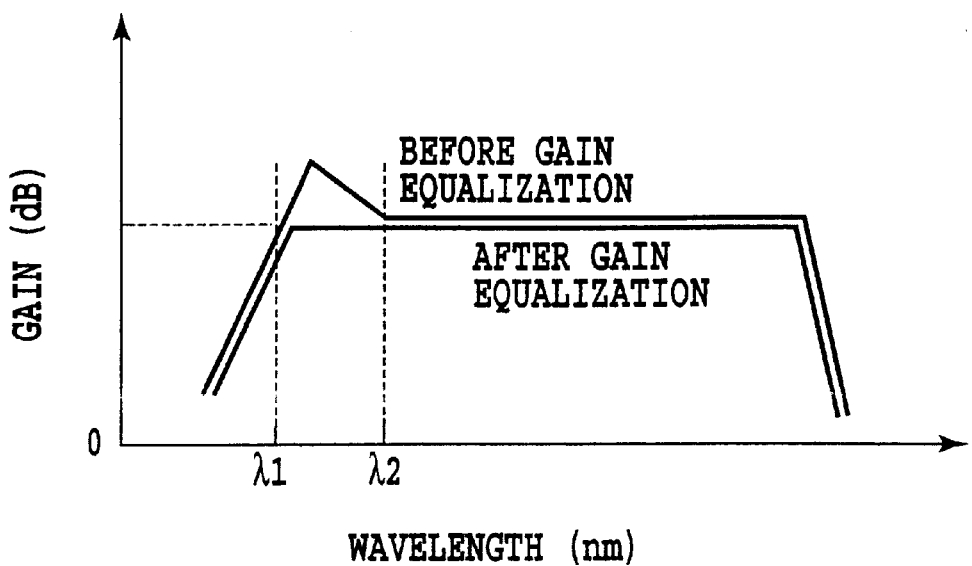
FIGS. 23A and 23B are diagrams illustrating a gain spectrum of the conventional optical amplifier as shown in FIG. 21 and a loss spectrum of its gain equalizer.
Figure 23B:
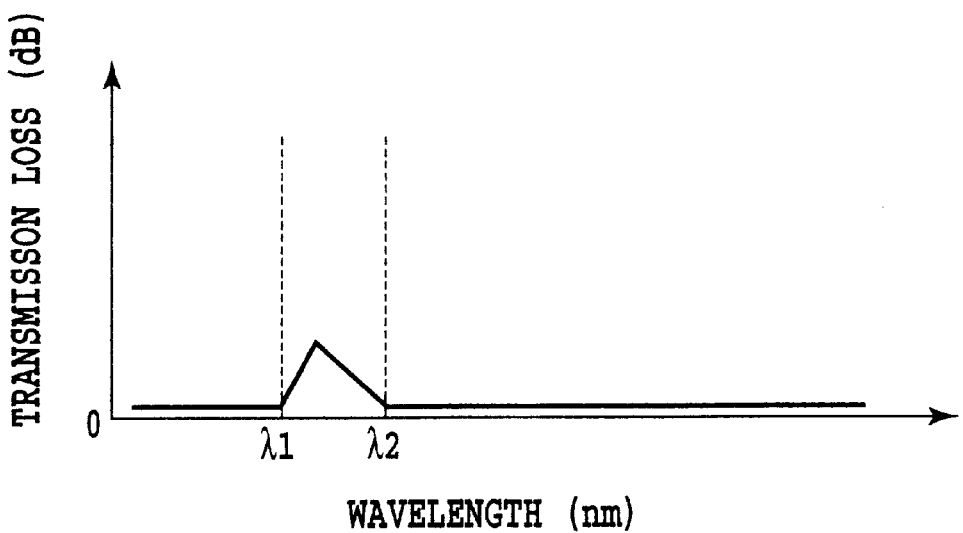
Figure 24A:
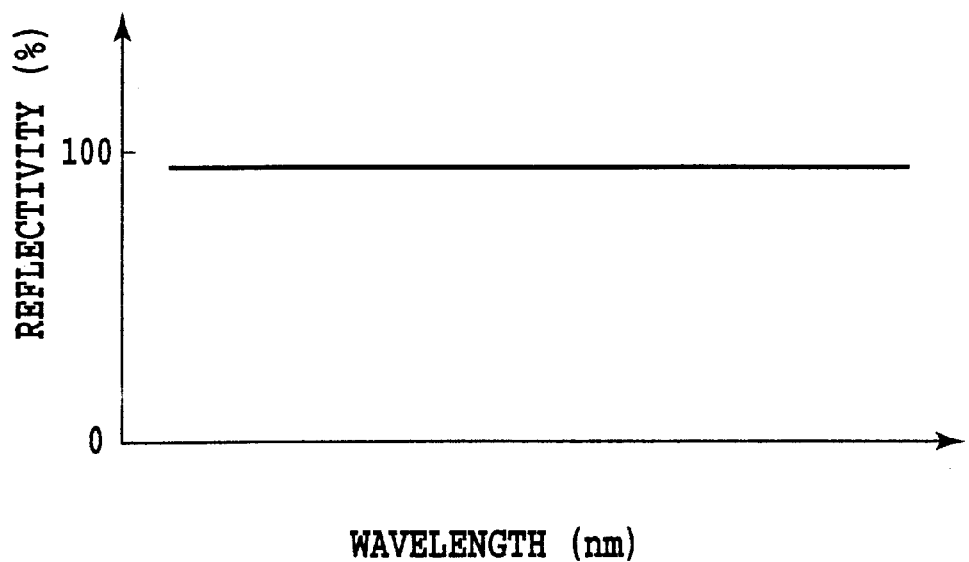
FIGS. 24A and 24B are diagrams illustrating a reflectivity spectrum and a loss spectrum of a wavelength independent reflector used by the conventional optical amplifier as shown in FIG. 22.
Figure 24B:
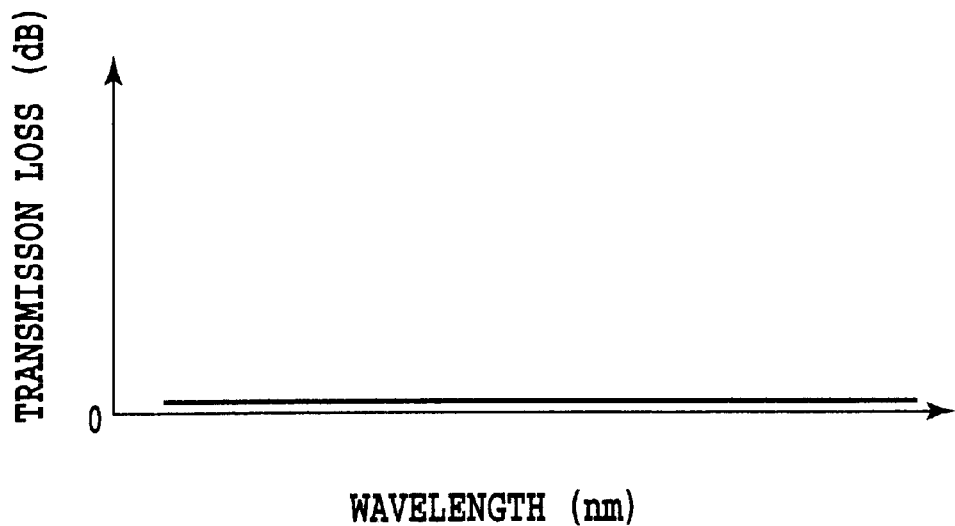

Moreover, when the optical component 6 is the gain equalizer, it is easy to set up such a configuration in which the pump light passes through the optical circulator 5 and the gain equalizer at a low loss. This makes it possible to increase the pumping efficiency because the pump light passing through the EDF 4 is guided again back to the EDF 4 as shown in FIG. 1. The gain spectrum of the amplifier and the transmission loss spectrum of the gain equalizer of the present configuration are the same as those of FIG. 23A and 23B.

Figure 2:
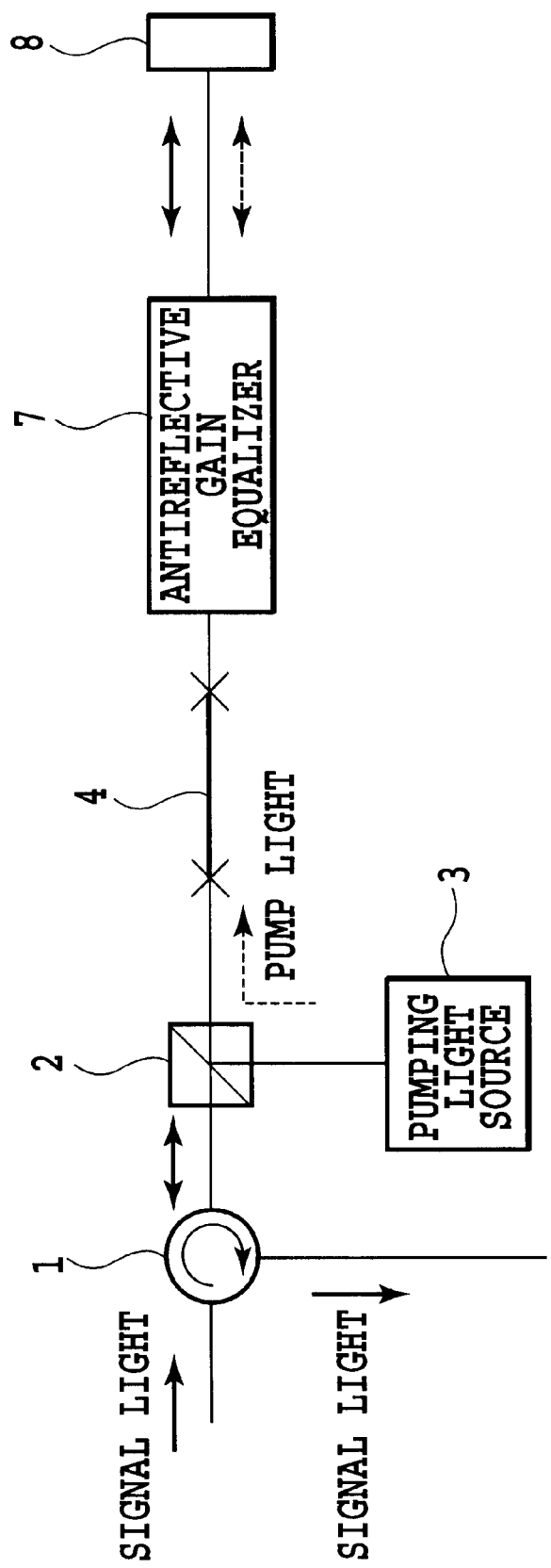
FIG. 2 is a block diagram showing a second embodiment of the optical amplifier in accordance with the present invention.

FIG. 2 is a block diagram showing a configuration of a second embodiment of the optical amplifier in accordance with the present invention. The optical amplifier as shown in FIG. 2 differs from the embodiment as shown in FIG. 1 in that it uses an antireflective gain equalizer 7 and a wavelength independent reflector 8 instead of the second optical circulator 5 and the optical component 6, and the remaining configuration and operation are the same.

Figure 22:
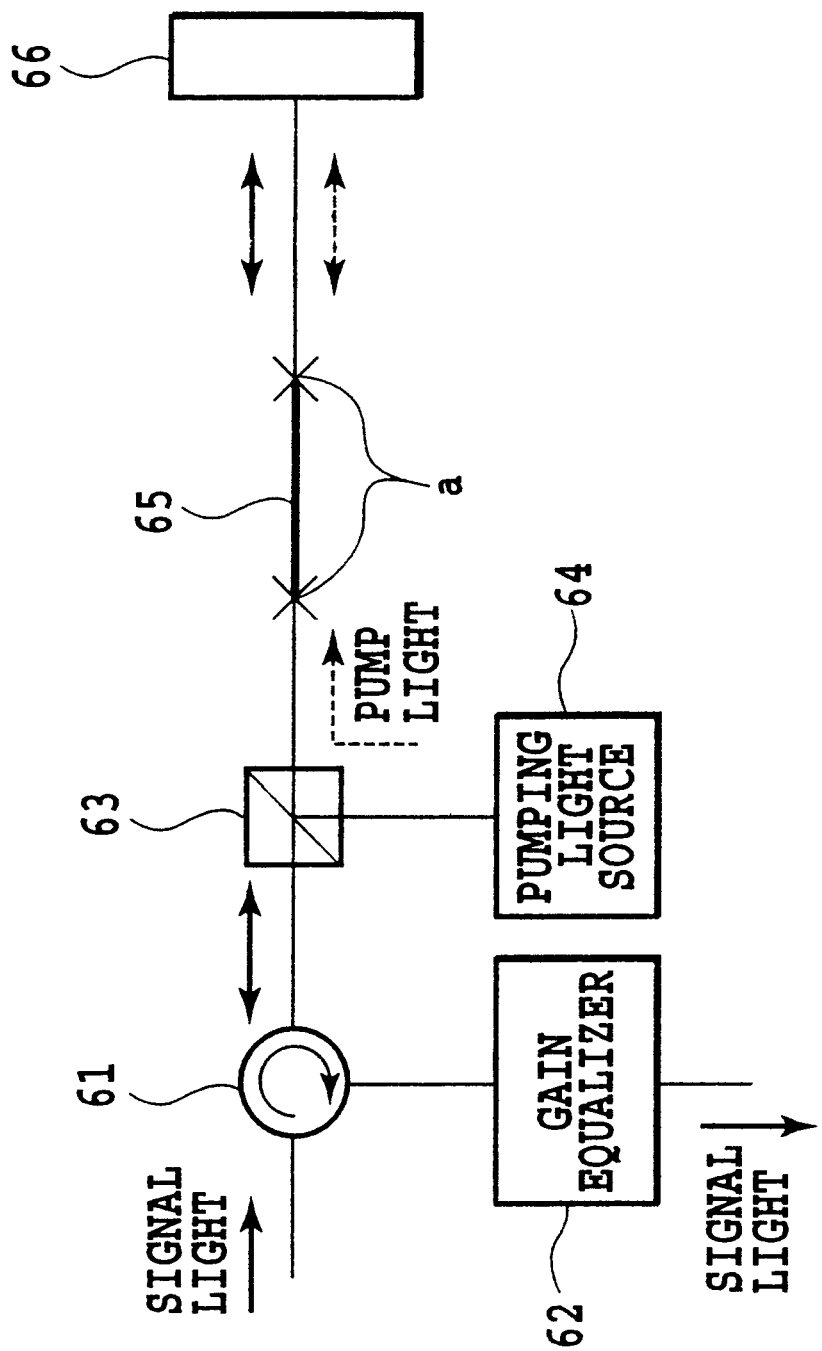
FIG. 22 is a block diagram showing a second configuration of a conventional optical amplifier.

The second embodiment of the optical amplifier as shown in FIG. 2 differs from the second conventional configuration as shown in FIG. 22 in that it is configured such that the antireflective gain equalizer 7 is interposed between the EDF 65 and the wavelength independent reflector 66 of the conventional system. The gain equalizer 7 employed by the second embodiment, however, is limited to the antireflective gain equalizer.

In the present embodiment of the optical amplifier with such a configuration, the signal light passes through the antireflective gain equalizer 7 twice before and after it is reflected by the wavelength independent reflector 8. The signal light passing through the antireflective gain equalizer 7 is amplified again by the EDF 4, and is output via the optical circulator 1. The gain spectrum of the amplifier and the transmission loss spectrum of the antireflective gain equalizer in the present configuration are the same as those of FIGS. 23A and 23B. In the present configuration, however, since the signal light is transmitted through the antireflective gain equalizer 7 twice, the transmission loss is about half that of FIG. 23B.

Figure 3:
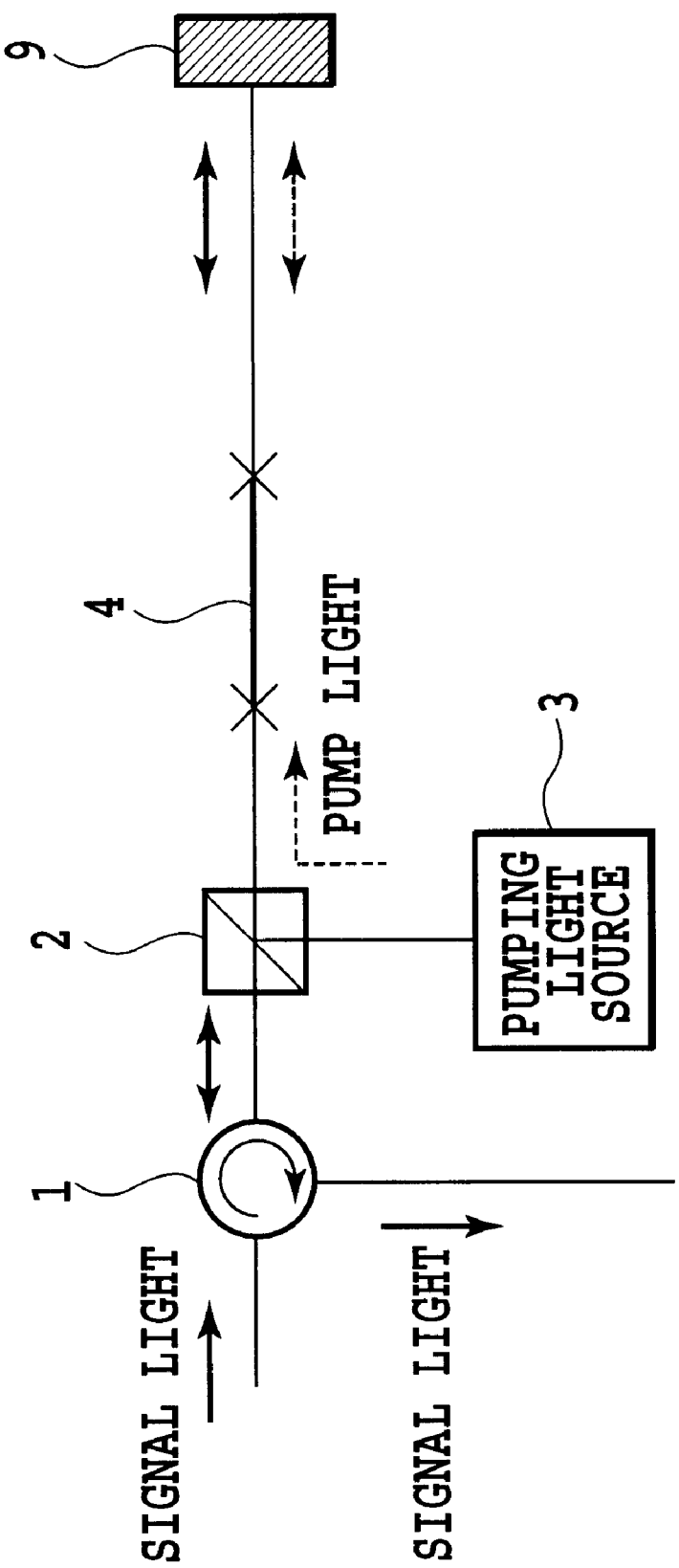
FIG. 3 is a block diagram showing a third embodiment of the optical amplifier in accordance with the present invention.

FIG. 3 is a block diagram showing a configuration of a third embodiment of the optical amplifier in accordance with the present invention. The third embodiment of the optical amplifier as shown in FIG. 3 differs from the first embodiment as shown in FIG. 1 in that it comprises a wavelength dependent reflector 9 instead of the second optical circulator 5 and the optical component 6, and the remaining configuration and operation are the same.

Furthermore, the third embodiment of the optical amplifier as shown in FIG. 3 differs from the second conventional configuration as shown in FIG. 22 in that it replaces the wavelength independent reflector 66, the reflector of the signal light, with the wavelength dependent reflector 9, thereby providing it with a gain equalization function. This makes it possible to obviate the gain equalizer 62 needed by the second conventional configuration, thereby reducing the number of the components of the configuration.

Figure 4A:
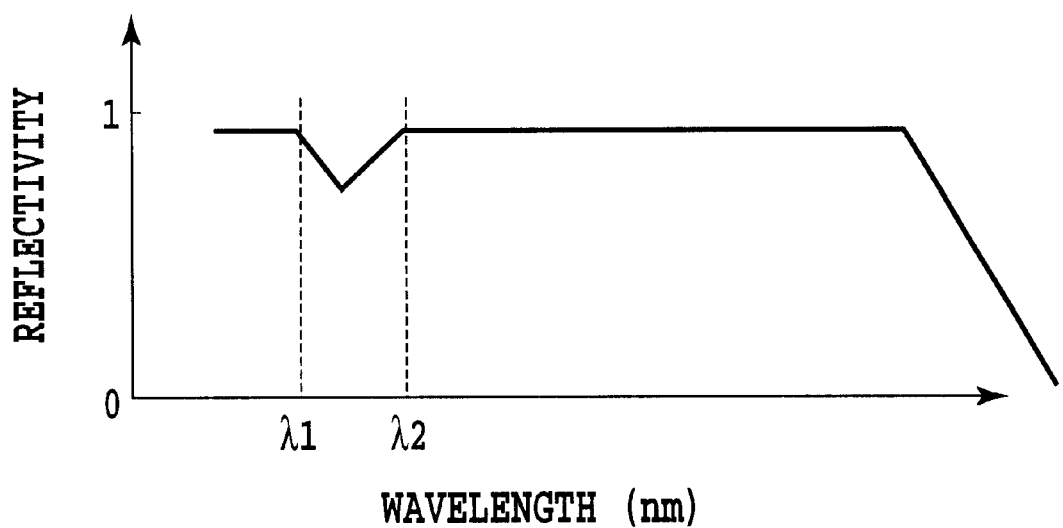
FIGS. 4A and 4B are diagrams illustrating a reflection light spectrum and a reflection loss spectrum of a wavelength dependent reflector used by the optical amplifier as shown in FIG. 3.
Figure 4B:
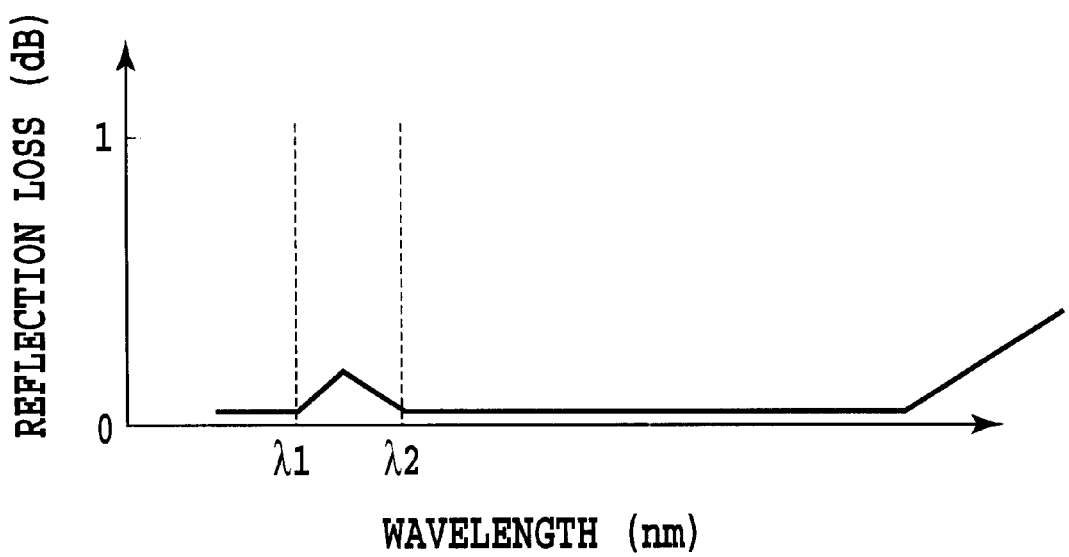

The wavelength dependent reflector 9 can consist of a glass with metal film or dielectric multi-layer film deposited thereon, or of a wideband fiber grating, as the above-mentioned wavelength independent reflector, although the wavelength dependent reflector 9 is provided with the wavelength selective function of the reflectivity by changing its design parameters. Its concrete examples will be described later. FIG. 4A illustrates a reflectivity spectrum of the wavelength dependent reflector 9, and FIG. 4B illustrates the loss spectrum thereof. The gain spectrum of the amplifier (before and after the gain equalization) using the wavelength dependent reflector 9 is the same as that of FIG. 23A.

As described above, the first and third embodiments can solve a problem of the first and second conventional configurations in that the optical amplifier is large in size and expensive because of the greater number of optical components such as the EDF, pumping light source and optical combiner. The second embodiment, on the other hand, can solve a problem of the second conventional configuration in that the optical output power is reduced by an amount corresponding to the loss of the gain equalizer because the gain equalizer is installed at the outside of the gain medium, that is, at the output side of the signal light.

Figure 5A:
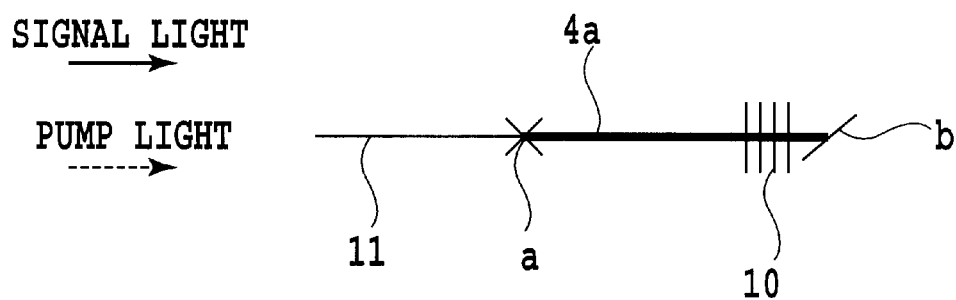
FIGS. 5A and 5B are diagrams showing concrete configurations of an erbium-doped fiber and reflector used by the optical amplifier as shown in FIG. 3.
Figure 5B:
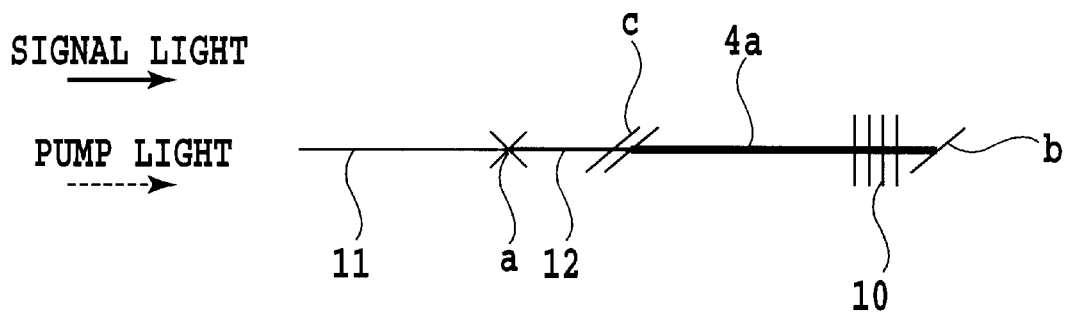
Figure 25A:
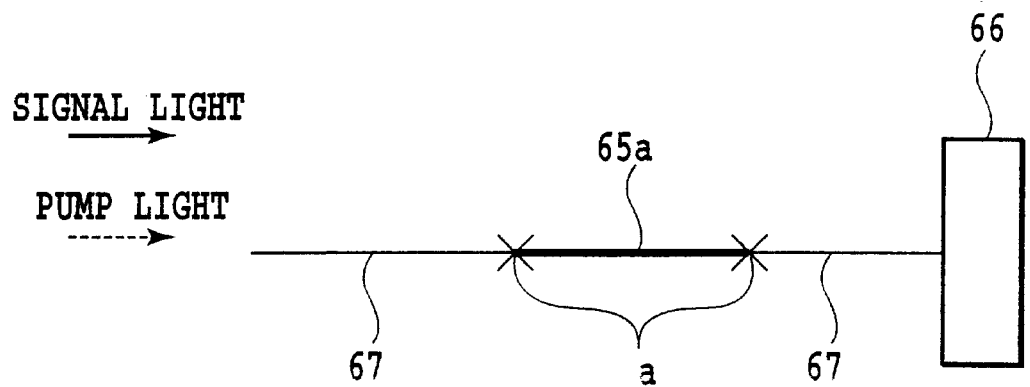
FIGS. 25A and 25B are diagrams showing concrete configurations of an erbium-doped fiber and a wavelength independent reflector employed by the second configuration of the conventional optical amplifier as shown in FIG. 22.
Figure 25B:
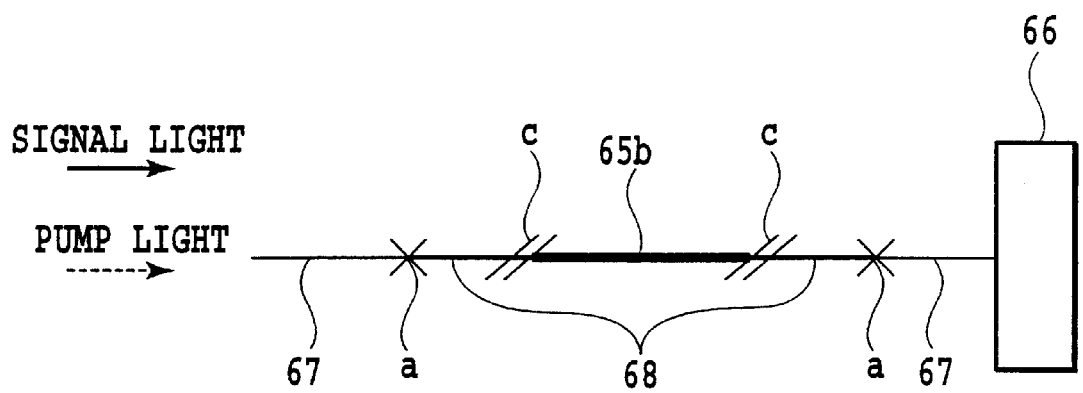

FIGS. 5A and 5B each show a configuration of the erbium-doped fiber (EDF) 4 in connection with the reflector 9 as shown in FIG. 3, in which a fiber grating 10 is used as the reflector 9. FIG. 5A shows a case using a silicate EDF 4a as the EDF, and FIG. 5B shows a case using a non-silicate EDF (such as fluoride EDF and tellurite EDF) 4b as the EDF. The configurations differ from the conventional technique as shown in FIG. 25 in that the fiber grating 10 functioning as the signal light reflector is directly built in the EDF. The fiber grating 10 may or may not reflect the pump light in addition to the signal light. The rare-earth doped fiber is not limited to the EDF: it may be a praseodymium-doped fiber, a thulium-doped fiber or the like, resulting in a similar effect. The present configuration has an advantage the conventional technique of being able to reduce the number of components and the cost of the components and assembly, thereby solving the problem of the conventional technique. In FIGS. 5A and 5B, the reference numeral 4a designates the silicate erbium-doped fiber, 4b designates the non-silicate erbium-doped fiber, 11 designates an optical component pigtail fiber, 12 designates a high NA silicate fiber, "a" designates a fusion splice, "b" designates an antireflection angled polished surface, and "c" designates an angled surface butted portion.

Figure 6:
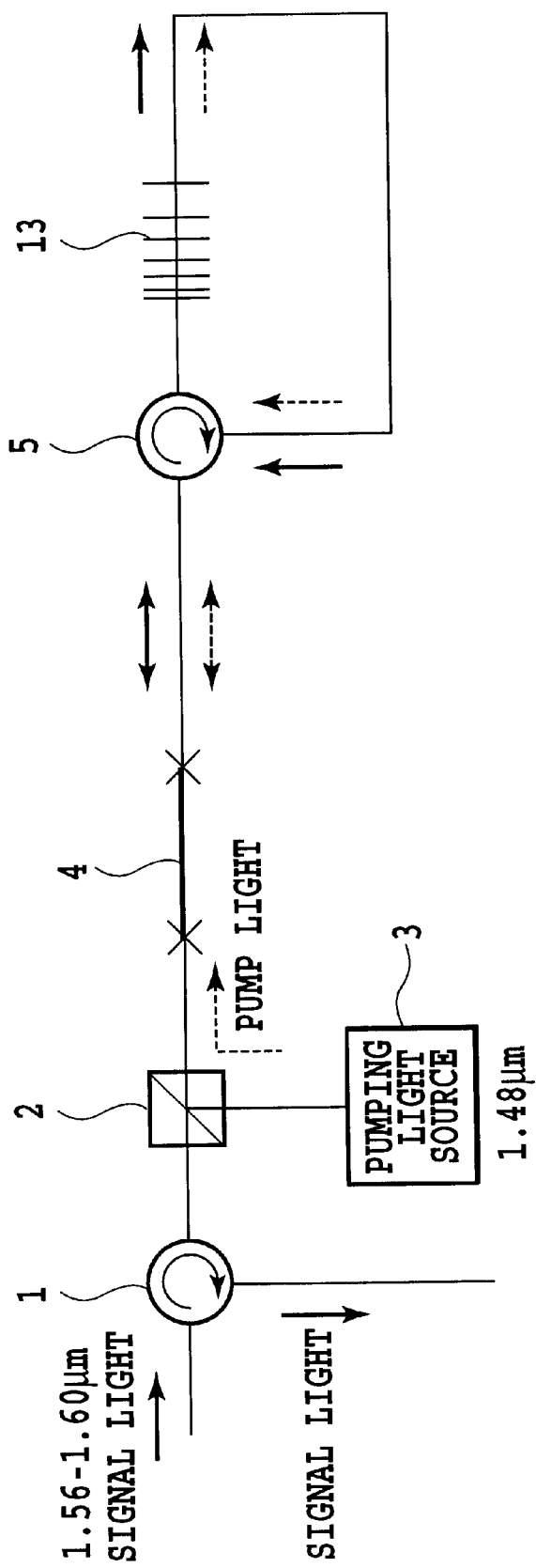
FIG. 6 is a block diagram showing a concrete example of the first embodiment of the optical amplifier as shown in FIG. 1.

FIG. 6 is a block diagram showing a concrete example of the first embodiment as shown in FIG. 1, which uses a silicate erbium-doped fiber (EDF) 4 as the gain medium, and a chirped Bragg fiber grating (CFG) as the optical component 6 consisting of the partially reflective gain equalizer and the like.

As already described in connection with FIG. 1, a considerable amount of the pump light emitted from the EDF 4 passes through the optical circulator 5 and CFG 13 incorporated in the post-stage of the EDF 4 at a low loss, and is incident again on the EDF 4 to pump the EDF 4, thereby achieving high pumping efficiency.

Figure 7A:
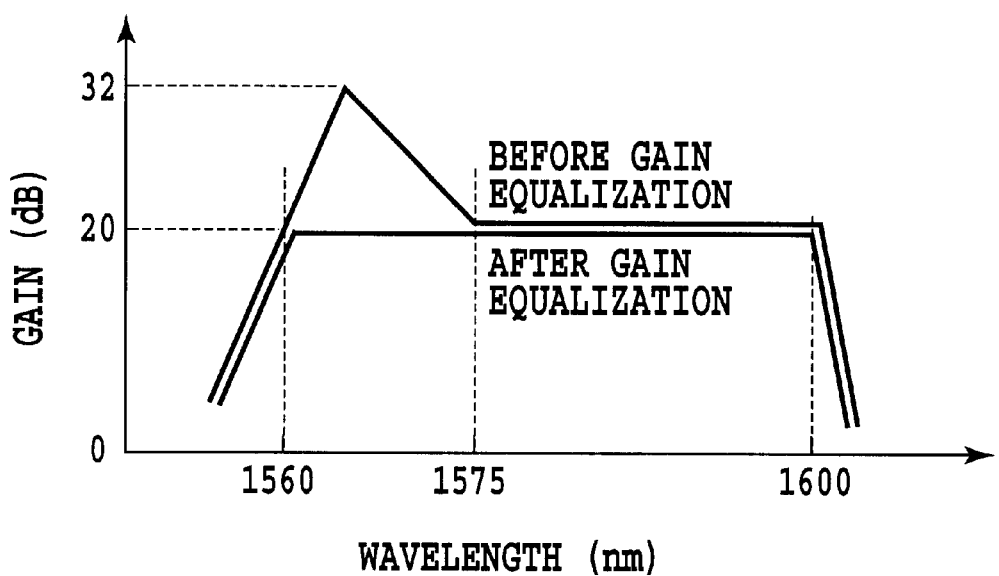
FIGS. 7A and 7B are diagrams illustrating a gain spectrum of the concrete example of the optical amplifier as shown in FIG. 6 and a transmission loss spectrum of its gain equalizer.
Figure 7B:
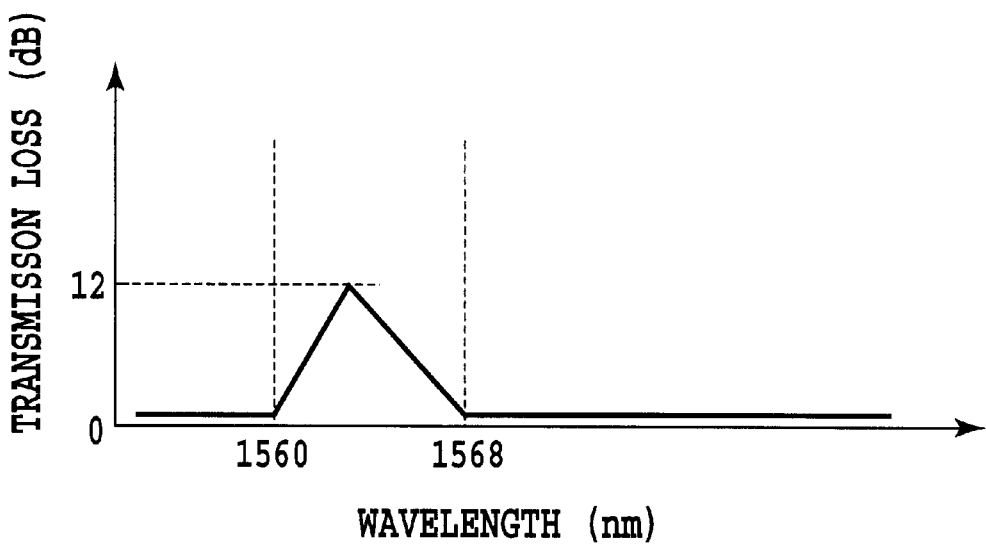

The wavelength and power of the pump light fed from the pumping light source 3 are 1.48 μm and 200 mW, respectively. The length of the EDF 4 is 50 m. FIGS. 7A and 7B illustrate a gain spectrum of the amplifier and a transmission loss spectrum of the gain equalizer of the present concrete example, respectively. Although the gain spectrum is unflat in a wavelength region 1560–1575 nm when the gain equalizer 6 (13) is not used, it becomes flat over the wavelength region 1560–1600 nm when the gain equalizer is used. The flat gain is 20 dB, and the peak loss of the gain equalizer 12 dB.

Figure 21:
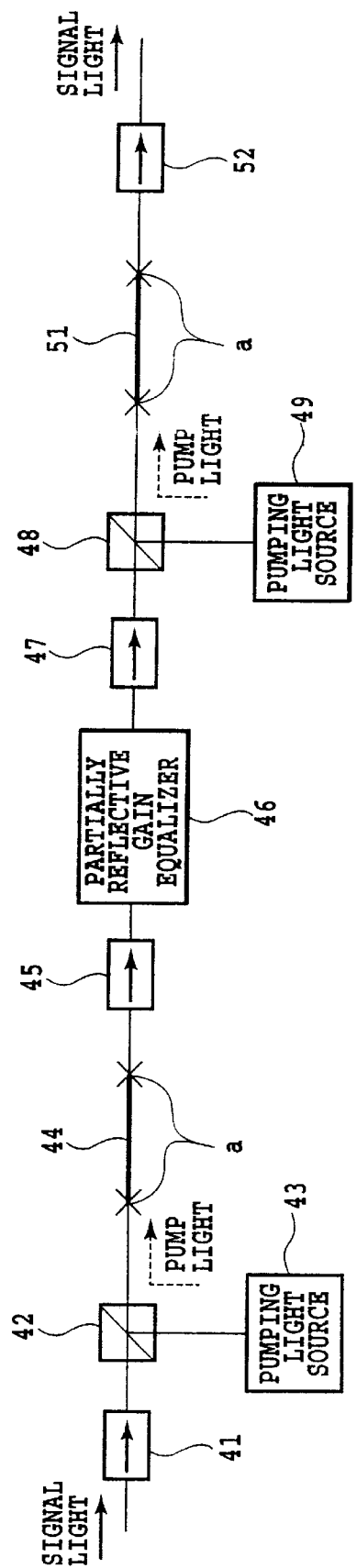
FIG. 21 is a block diagram showing a first configuration of a conventional optical amplifier.

In the conventional configuration as shown in FIG. 21, which achieves the same gain spectrum and optical output power, the length of the EDF amounts to 100 m, each 50 m of which is assigned to the EDF 44 and EDF 51, and the pump light power amounts to 300 mW, about 100 mW of which is assigned to the EDF 44, and about 200 mW of which is assigned to the EDF 51. Thus, it is clear that the present concrete example can reduce its number of components and cost as compared with the first conventional configuration.

Figure 8:
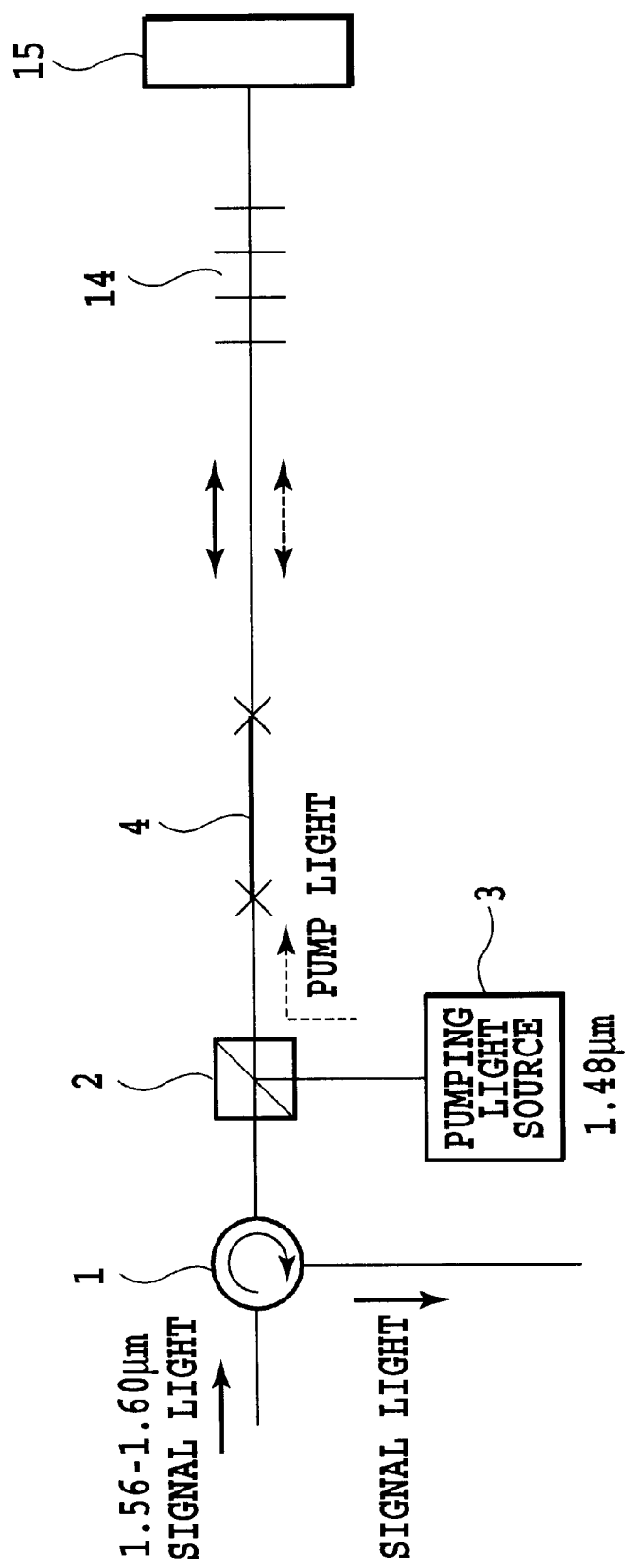
FIG. 8 is a block diagram showing a concrete example of the second embodiment of the optical amplifier as shown in FIG. 2.
Figure 9:
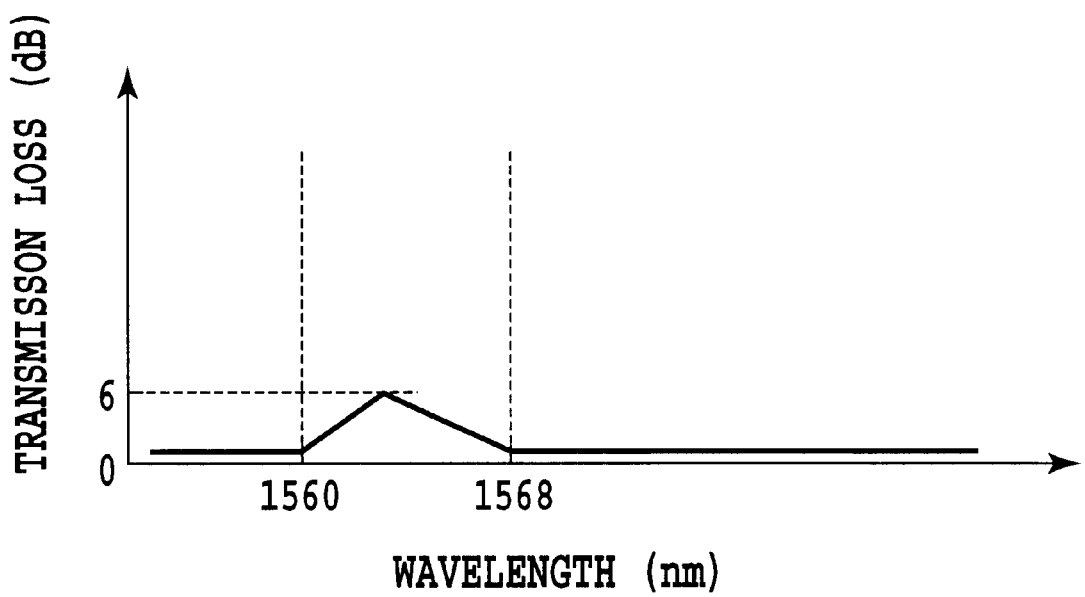
FIG. 9 is a diagram illustrating a transmission loss spectrum of a gain equalizer of the concrete example as shown in FIG. 8.

FIG. 8 is a block diagram showing a concrete example of the second embodiment as shown in FIG. 2. The concrete example uses a silicate erbium-doped fiber (EDF) 4 as its gain medium; a long period fiber grating (LPFG) 14 as the antireflective gain equalizer 7; and a mirror (a glass plate with metal film deposited thereon) 15 as the wavelength independent reflector 8. FIG. 9 illustrates a transmission loss spectrum of the gain equalizer 7 (14) of the present concrete example. The gain spectrum is the same as that of FIG. 7A. The peak loss of the gain equalizer is 6 dB, half that (12 dB) of the concrete example as shown in FIG. 6. This is because the signal light passes through the gain equalizer twice.

To achieve the same gain spectrum of the present concrete example by the second conventional configuration as shown in FIG. 22, the peak loss of the gain equalizer installed in the amplifier output stage of the second conventional configuration must be 12 dB. Since the optical output power from the EDF as the gain medium is limited in accordance with the pump light power, and the limited optical output power suffers from a considerable loss in the gain equalizer, the optical output power of the amplifier is reduced. In the present concrete example, however, since the signal light is amplified before emitted from the EDF 4 after passing through the gain equalizer 14 (7), the reduction in the optical output power, a problem of the conventional technique, can be avoided.

Figure 10:
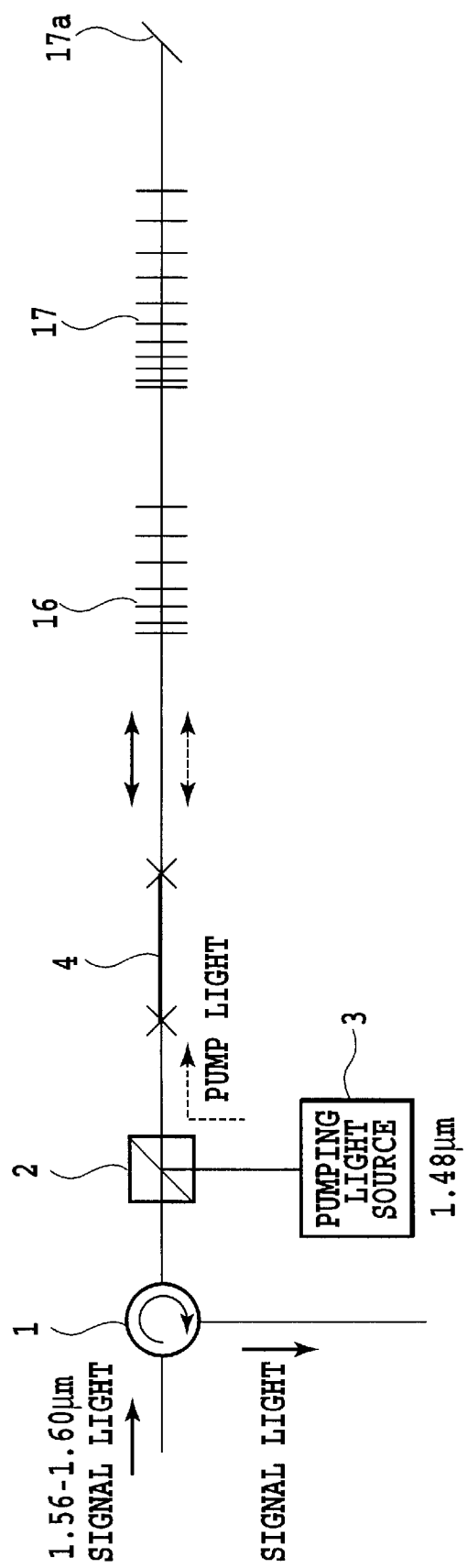
FIG. 10 is a diagram showing a concrete example of the third embodiment of the optical amplifier as shown in FIG. 3.
Figure 11A:
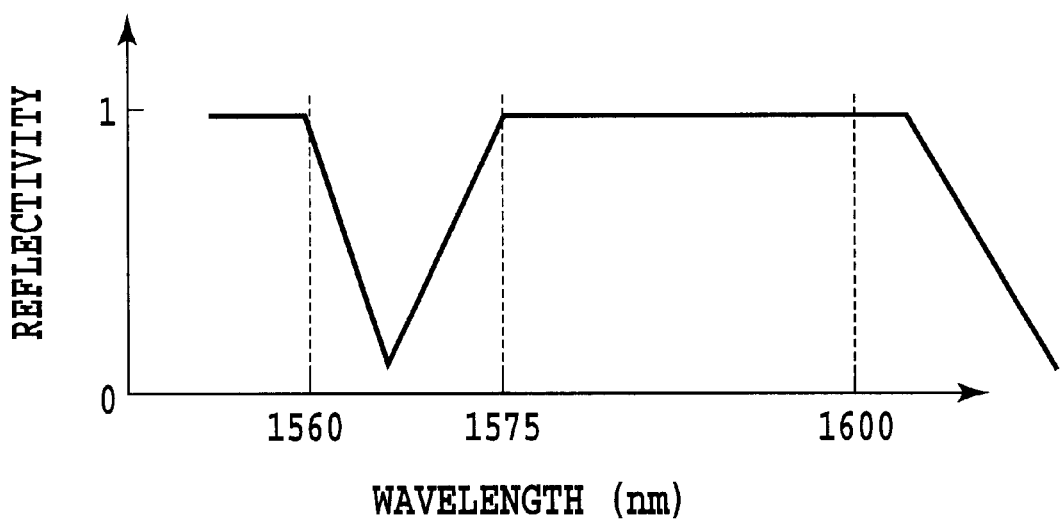
FIGS. 11A and 11B are diagrams illustrating a reflectivity spectrum and a reflection loss spectrum of signal light CFG of the concrete example as shown in FIG. 10.
Figure 11B:
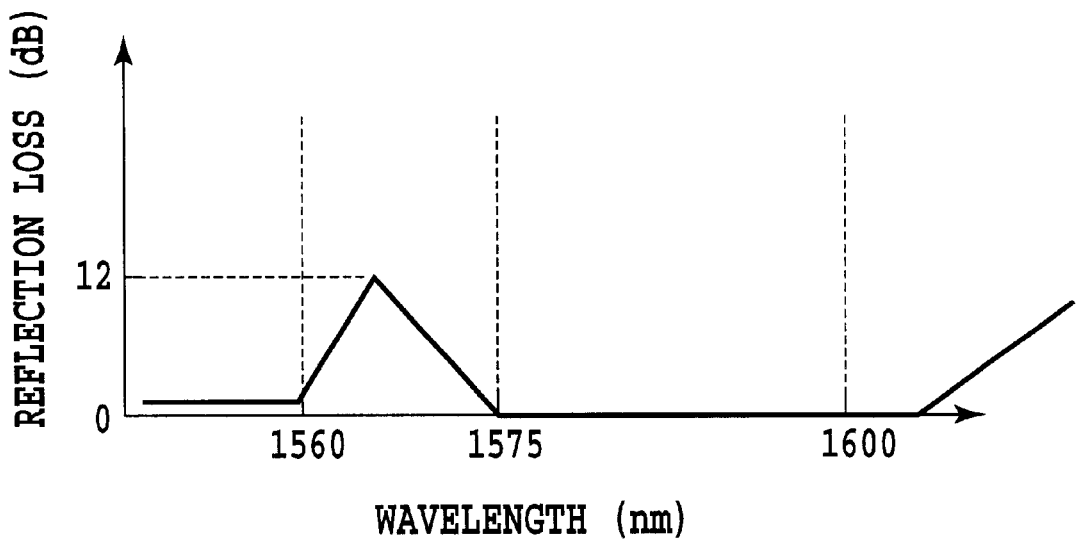

FIG. 10 is a block diagram showing a concrete example of the third embodiment as shown in FIG. 3. The concrete example as shown in FIG. 10 employs the silicate erbium-doped fiber (EDF) 4 as the gain medium; and chirped Bragg fiber gratings (CFGs) 16 and 17 each assigned to the signal light and pump light as the wavelength dependent reflector 9. The reference numeral 17a designates an antireflection angled surface. FIGS. 11A and 11B illustrates a reflectivity spectrum and a reflection loss of the signal light CFG 17 of the present concrete example. The reflectivity is kept high over a wavelength region 1575–1600 nm and in a wavelength region below 1560 nm. Such a reflectivity spectrum is obtained by making the distribution density of the chirp wavelength uneven. The peak loss of the reflectivity is 12 dB, and the gain spectrum is the same as that of FIG. 7A. On the other hand, the pump light CFG 16 reflects the 1.48 μm pump light at a high reflectivity (nearly 100%).

The present concrete example has an advantage over the second conventional configuration as shown in FIG. 22 that it can prevent the reduction in the optical output power as the concrete example of the second embodiment as shown in FIG. 8.

Figure 12:
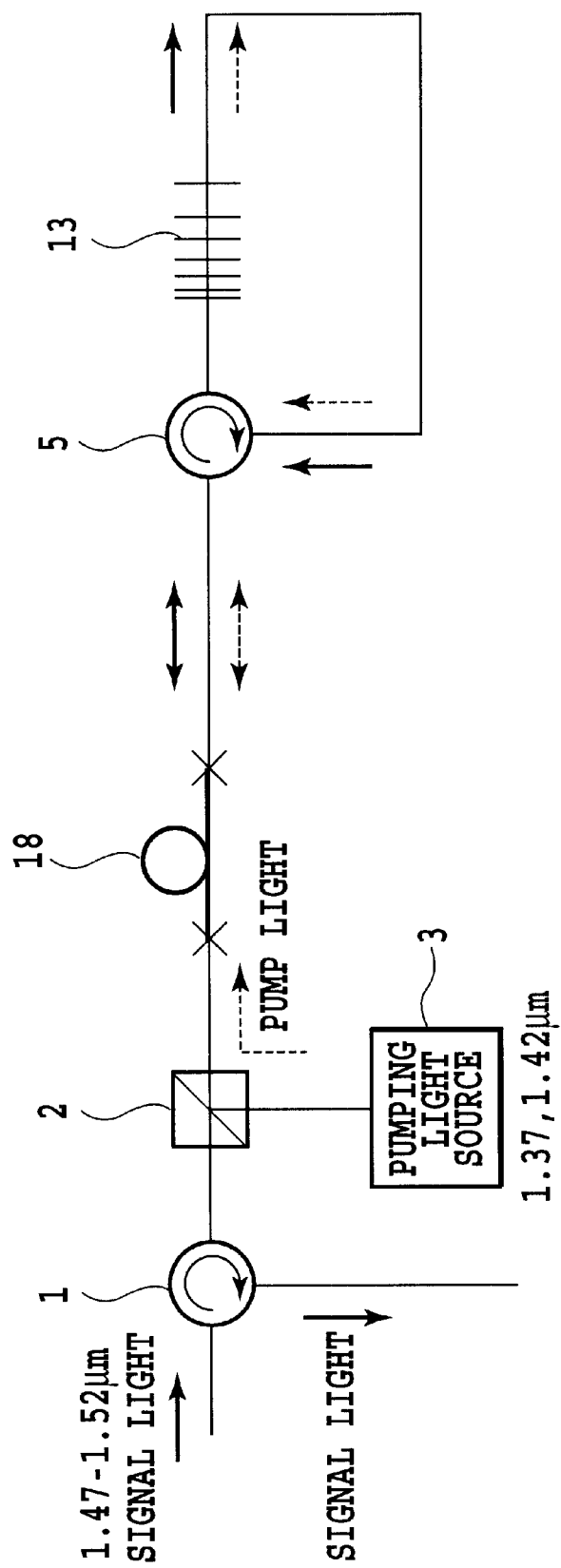
FIG. 12 is a block diagram showing another concrete example of the first embodiment of the optical amplifier as shown in FIG. 1.

FIG. 12 is a block diagram showing another concrete example of the first embodiment as shown in FIG. 1. The concrete example as shown in FIG. 12 uses a Raman fiber 18 as the gain medium, and a chirped Bragg fiber grating (CFG) 13 as the gain equalizer 6. The pump light fed from the pumping light source 3 includes two wavelengths of 1.37 μm and 1.42 μm, and its total power is 300 mW.

Figure 13A:
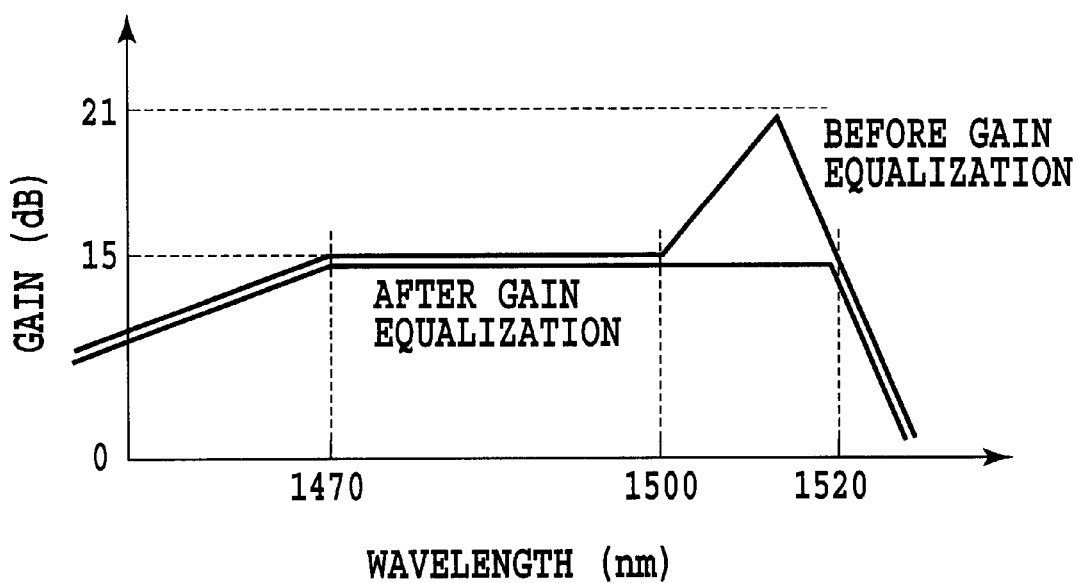
FIGS. 13A and 13B are diagrams illustrating a gain spectrum of the concrete example of the optical amplifier as shown in FIG. 12 and a transmission loss spectrum of its gain equalizer.
Figure 13B:
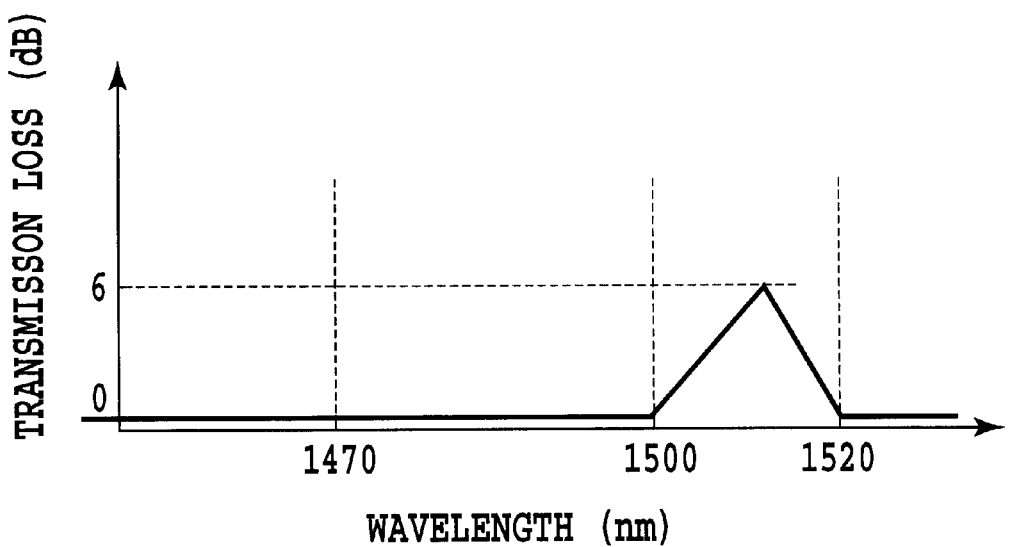

The Raman fiber 18 is 3 km long. FIGS. 13A and 13B illustrate a gain spectrum of the amplifier and a transmission loss spectrum of the gain equalizer 13 (6) in the present concrete example. Although the gain spectrum is unflat over a wavelength region 1500–1520 nm when the gain equalizer is not used, it is made flat over a wavelength region 1470–1520 nm by using the gain equalizer. The flat gain is 15 dB, and the peak loss of the gain equalizer is 6 dB.

In the conventional configuration as shown in FIG. 21, which achieves the same gain spectrum and optical output power, the length of the Raman fiber amounts to 6 km, each 3 km of which is assigned to the first Raman fiber and second Raman fiber, and the pump light power amounts to 800 mW, each 400 mW of which is assigned to the first Raman fiber and second Raman fiber. Thus, it is clear that the present concrete example can reduce its number of components and cost as compared with the first conventional configuration.

Figure 14:
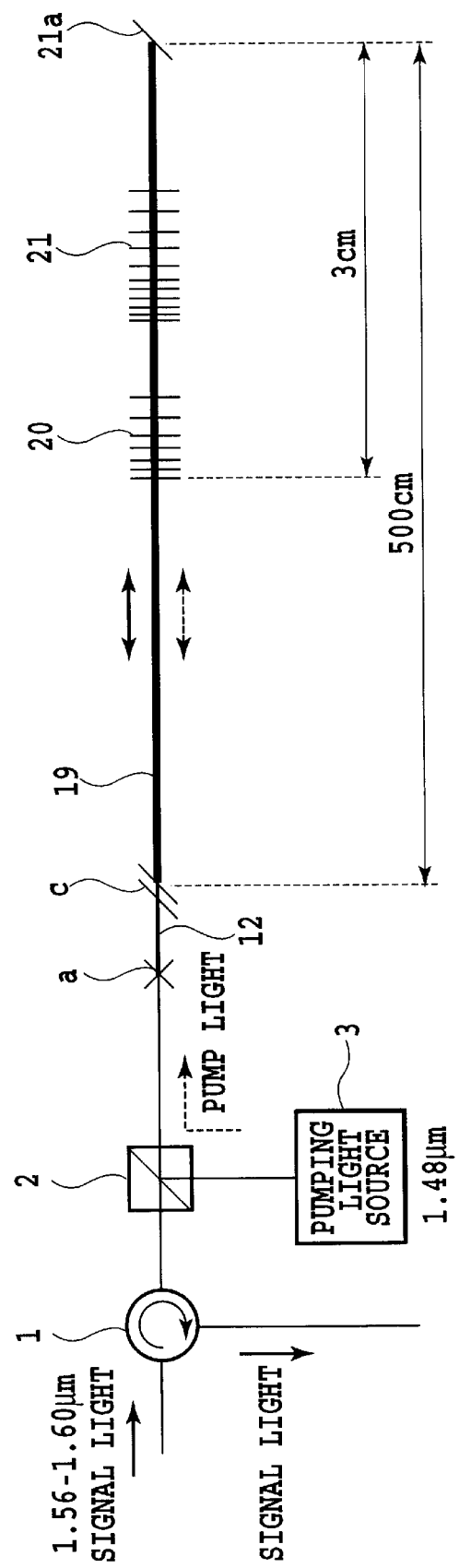
FIG. 14 is a diagram showing another concrete example of the third embodiment of the optical amplifier as shown in FIGS. 3 and 5.

FIG. 14 is a diagram showing another concrete example of the third embodiment as shown in FIGS. 3 and 5. The concrete example as shown in FIG. 14 uses a tellurite erbium-doped fiber 19, a non-silicate erbium-doped fiber, as its gain medium; and chirped Bragg fiber gratings (CFGs) 20 and 21, each for the pump light and signal light, as the fiber grating 10 that constitutes the wavelength dependent reflector 9. The symbol "a" designates a fusion splice, "c" designates an angled surface butted portion, 12 designates a high NA silicate fiber, and 21a designates an antireflection angled end.

Figure 15:
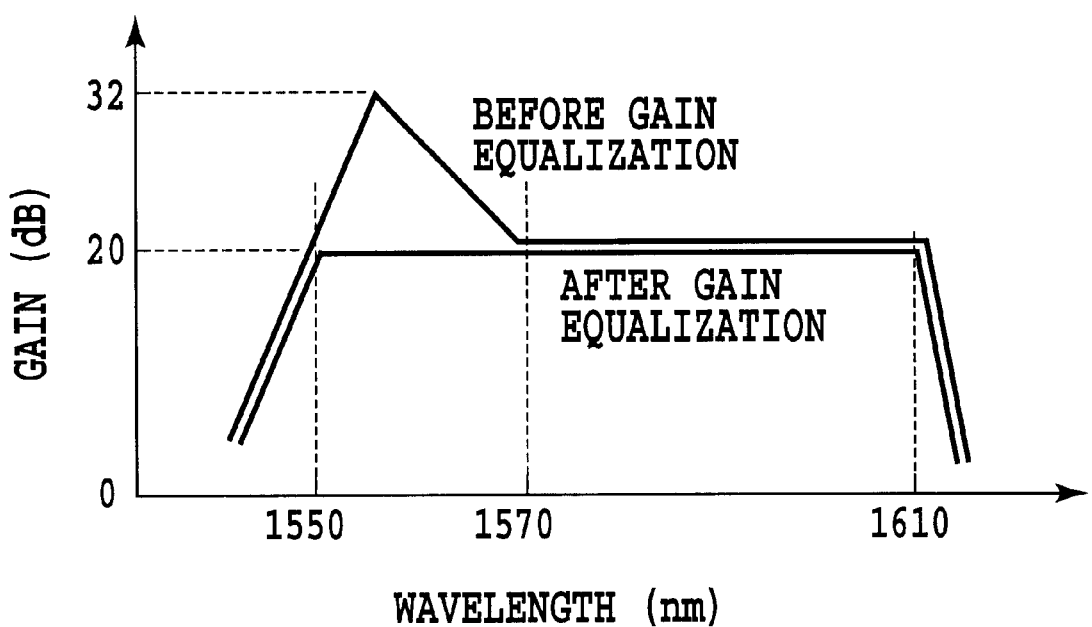
FIG. 15 is a diagram illustrating a gain spectrum of the concrete example of the optical amplifier as shown in FIG. 14.
Figure 16A:
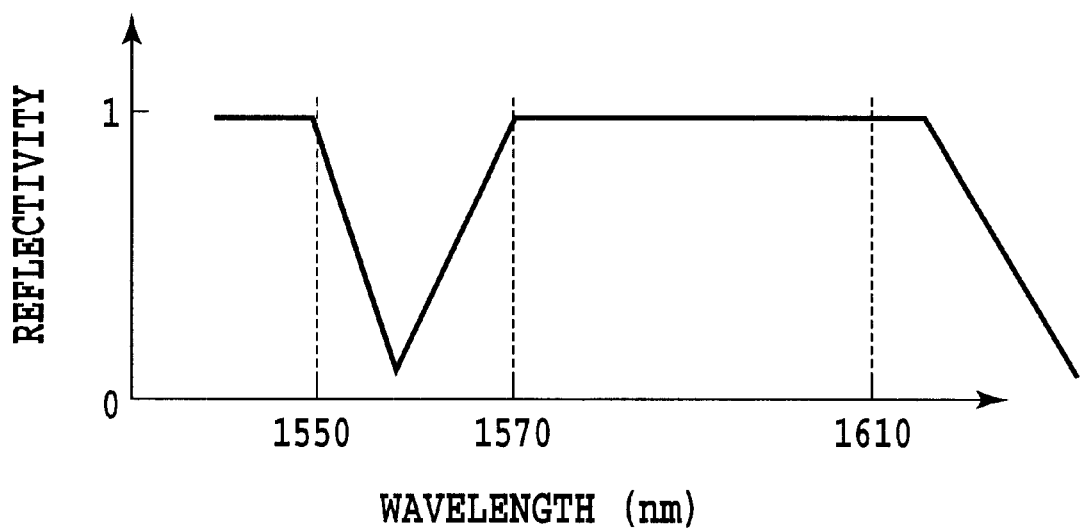
FIGS. 16A and 16B are diagrams illustrating a reflectivity spectrum and a reflection loss spectrum of signal light CFG of the concrete example as shown in FIG. 14.
Figure 16B:
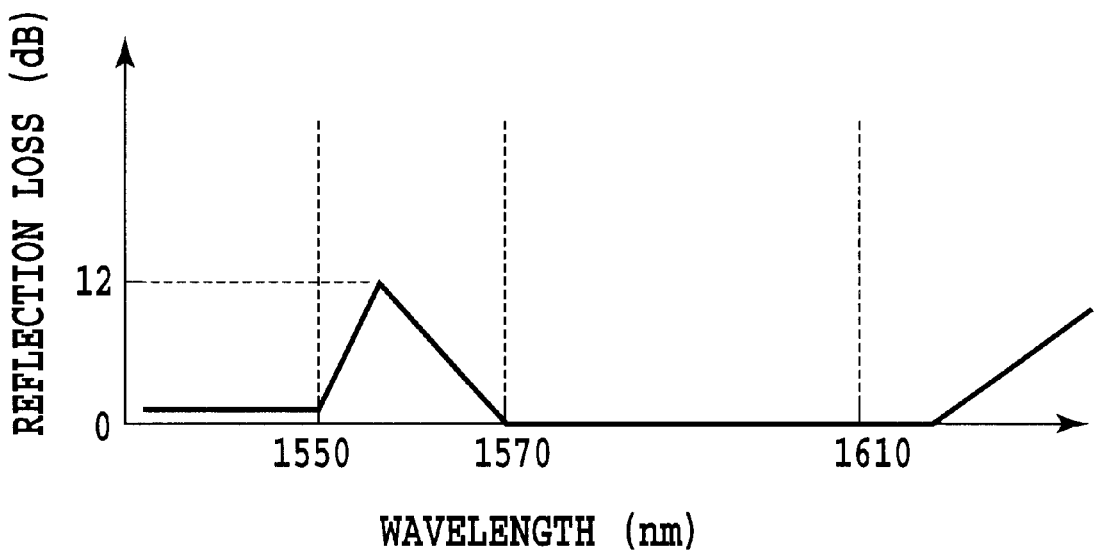

FIG. 15 illustrates a gain spectrum of the amplifier in the present concrete example, and FIGS. 16A and 16B illustrate a reflectivity spectrum and a reflection loss spectrum of the signal light CFG 21 in the present example. Although the gain spectrum is unflat in a wavelength region 1550–1570 nm when the gain equalizer is not used, it is made flat over a wavelength region 1550–1610 nm by the gain equalizer. The flat gain is 20 dB, and the peak loss of the gain equalizer is 12 dB.

The present concrete example has an advantage over the conventional technique as shown in FIG. 21 that the configuration is simple, thereby providing a low cost amplifier.

Figure 17:
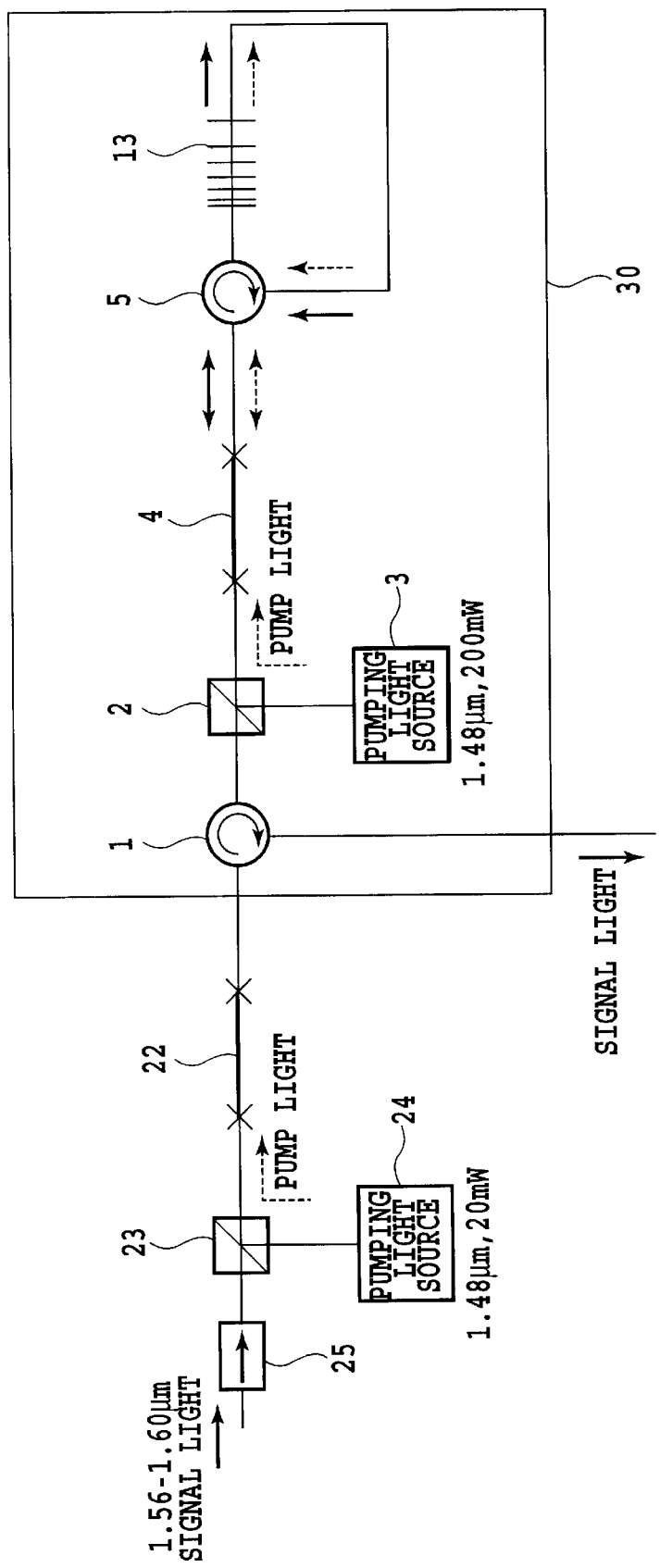
FIG. 17 is a block diagram showing a configuration of a fourth embodiment of the optical amplifier in accordance with the present invention.

FIG. 17 is a block diagram showing a configuration of a fourth embodiment of the optical amplifier in accordance with the present invention. The present embodiment of the optical amplifier as shown in FIG. 17 comprises a short erbium-doped fiber (EDF) 22 before the optical amplifier 30 of the concrete example of the first embodiment as shown in FIG. 6; and comprises an optical combiner 23, a pumping light source 24 and an optical isolator 25 on the input side of the EDF 22, thereby constructing a new pre-optical amplifier to prevent noise figure degradation in the optical amplifier 30.

Figure 19:
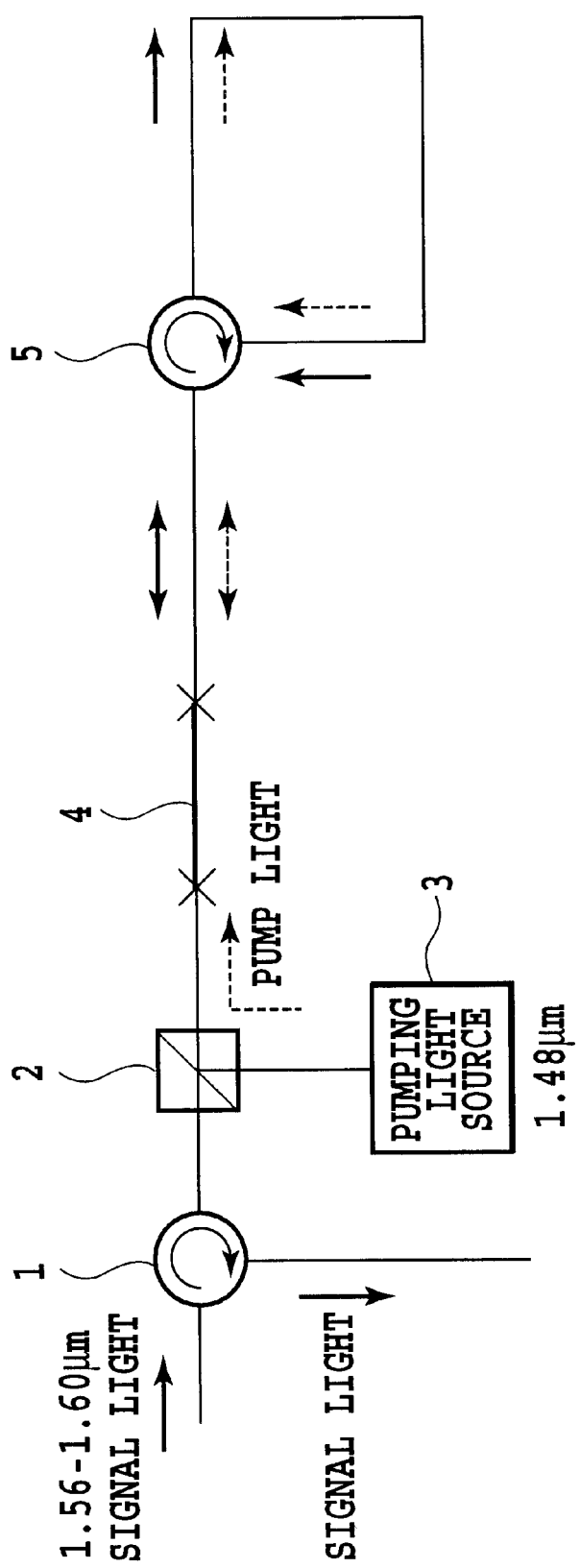
FIG. 19 is a block diagram showing another concrete example of the first embodiment of the optical amplifier in accordance with the present invention.

More specifically, since the optical amplifiers as shown in FIGS. 1, 2, 3, 6, 8, 10, 12 and 14 in accordance with the present invention and in the conventional optical amplifier as shown in FIG. 22 have such a structure that the signal light travels back and forth through the rare-earth doped fiber or Raman fiber, the signal light power is large on the input side of the signal light, that is, on the left-hand side of the optical amplifier 30 in FIG. 17. This causes the noise figure of the optical amplifier to be degraded as compared with that of the optical amplifier as shown in FIG. 19 in which the light signal does not travel back and forth. In view of this, the present embodiment provides an optical amplifier capable of preventing the degradation in the noise figure with maintaining the effects of the optical amplifiers in accordance with the present invention. Thus, the optical amplifier 30 of the fourth embodiment as shown in FIG. 17 is not limited to the concrete example of the first embodiment as shown in FIG. 6, but the optical amplifiers as shown in FIGS. 1, 2, 3, 6, 8, 10, 12 and 14 are also applicable.

The present fourth embodiment constructs a multi-stage amplifier by adding the short EDF 22 before the optical amplifier 30 using the EDF 4 to prevent the noise figure degradation. The short EDF 22 is pumped by the new pumping light source 24. In the optical amplifier of the concrete example of the first embodiment as shown in FIG. 6, the length of the EDF 4 is 50 m. In contrast with this, the length of the EDF 4 of the present embodiment is 45 m, and the length of the short EDF 22 is 10 m. In addition, the pump light powers to be impressed to the 45 m and 10 m long EDFs 4 and 22 of the present embodiment are 200 mW and 20 mW, respectively. In the optical amplifier of the concrete example of the first embodiment as shown in FIG. 6, the pump light power applied to the 50 m long EDF is 200 mW. Thus, the additional EDF is much shorter than the first EDF, and the pump light power of the additional pumping light source 24 is much smaller than that of the first pumping light source 3. Accordingly, the additional cost of the present embodiment is small from that of the optical amplifier of FIG. 6. As a result, comparing the present embodiment with the first conventional technique, it is clear that the present embodiment can reduce its number of components and cost.

It is not essential that the EDF 22 placed before the optical amplifier 30 is shorter than the EDF 4 in the optical amplifier 30, as long as the simplification and cost reduction of the optical amplifier 30 in accordance with the present invention does not prevent the simplification and cost reduction of the entire optical amplifier as shown in FIG. 17 by equipping the EDF 22. Generally, since the gain of the EDF 22 is small enough such as 10 dB, the EDF 22 and pumping light source 24 are not expensive. Furthermore, the length of the EDF depends on the Er doping concentration which can differ in the EDF 4 and EDF 22.

The noise figure of the optical amplifier of the concrete example as shown in FIG. 6 is about 8 dB, for example. In contrast, the noise figure of the present embodiment is about 6 dB, indicating an improvement in the noise figure.

Figure 18:
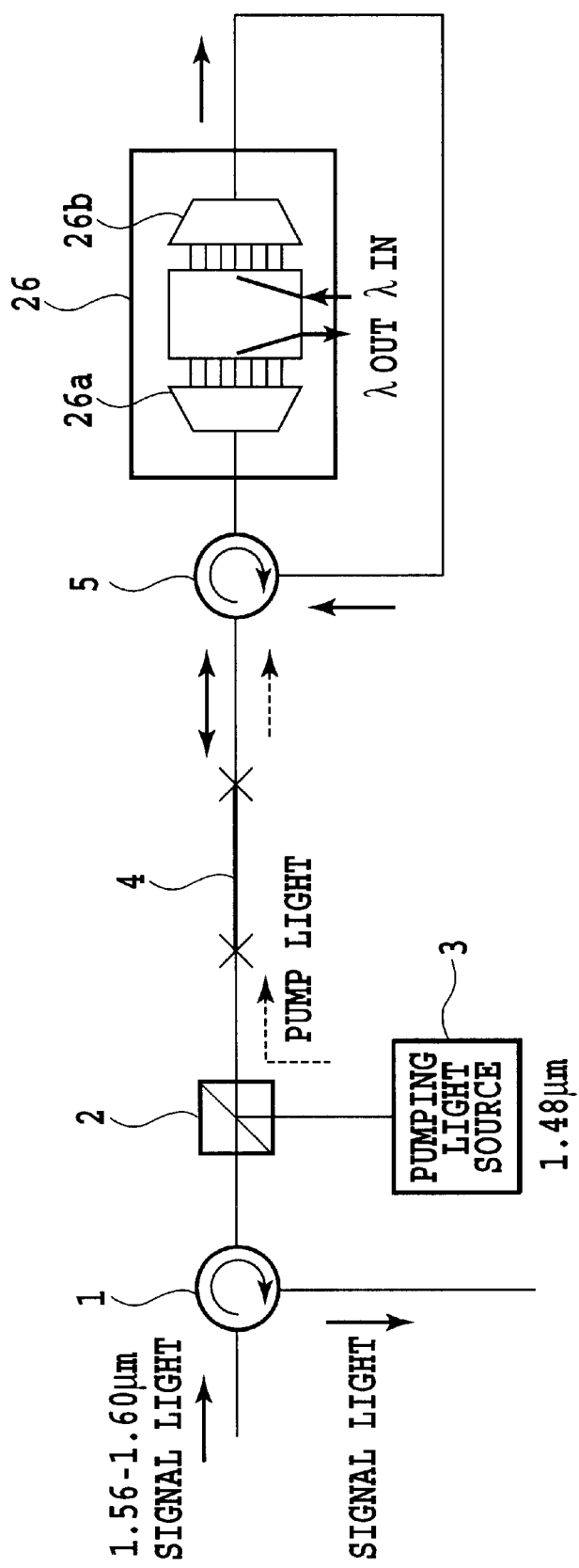
FIG. 18 is a block diagram showing still another concrete example of the first embodiment of the optical amplifier in accordance with the present invention.

FIG. 18 is a block diagram showing still another concrete example of the first embodiment of the optical amplifier in accordance with the present invention. The optical amplifier of FIG. 18 differs from the embodiment as shown in FIG. 1 in that it comprises an insertion divider 26 of the signal light as a concrete example of the optical component 6 inserted into a loop between the second port and third port of the second optical circulator 5 in the embodiment as shown in FIG. 1, and the remaining configuration and operation are the same. In addition, as compared with the conventional optical amplifier as shown in FIG. 21, for example, the present embodiment replaces the partially reflective gain equalizer 46 by the insertion divider 26 of the signal light.

In the insertion divider 26 of the signal light, reference numerals 26a and 26b each designate an arrayed waveguide, and λ out and λ in designate signal light wavelengths to be divided and inserted. The pre-stage AWG 26a divides the multiwavelength input signal light into a plurality of light paths in accordance with the wavelengths, and the post-stage AWG 26b combines multiwavelength signal light incident on the plurality of the light paths. Since the post-stage division and insertion of the signal light is usually carried out using a directional coupler, it is obvious that the insertion divider 26 can operated only in the direction of the signal input. In addition, since the insertion divider 26 has a considerable loss for the pump light, it cannot improve the pumping efficiency thanks to the reuse of the pump light as in the first embodiment.

The wavelength and power of the pump light from the pumping light source 3 are 1.48 $\mu$m and 200 mW, respectively, and the length of the EDF 4 is 50 m. In the conventional configuration as shown in FIG. 21, which achieves the same gain and optical output power, the length of the EDF amounts to 100 m, each 50 m of which is assigned to the EDF 44 and EDF 51, and the pump light power amounts to 300 mW, about 100 mW and 200 mW of which are assigned to the EDF 44 and EDF 51, respectively. Thus, it is clear that the present embodiment can reduce its number of components and the cost as compared with the first conventional configuration.

FIG. 19 is a block diagram showing another concrete example of the embodiment 1 of the optical amplifier in accordance with the present invention. The optical amplifier as shown in FIG. 19 differs from the embodiment as shown in FIG. 1 in that the optical component 6 is removed from the loop between the second port and third port of the second optical circulator 5 to connect them directly. This configuration corresponds to the first conventional configuration of the optical amplifier as shown in FIG. 21 from which the partially reflective gain equalizer 46 is removed.

In the optical amplifier with the configuration, the signal light and pump light passing through the erbium-doped fiber 4 is incident on the first port of the second optical circulator 5, is emitted from its second port to be incident on the third port, and is returned to the first port to be output therefrom. In this way, the signal light and pump light emitted from the first port of the second optical circulator passes through the erbium-doped fiber 4 again in the direction opposite to the first incident direction. The signal light and pump light passing through the erbium-doped fiber 4 again in the opposite direction are incident on the second port of the first optical circulator 1 via the optical combiner 2, and emitted from the third port of the first optical circulator.

It should be noted that the optical amplifier as shown in FIG. 19 has the same functions as the optical amplifier of the conventional technique as shown in FIG. 22. Specifically, the optical amplifiers of the present invention and the conventional technique both return the signal light and pump light emitted from the EDF to the EDF again by reflection. They differ in that although the conventional technique optical amplifier employs the wavelength independent reflector, the optical amplifier in accordance with the present invention uses the optical circulator to carry out the reflection. The optical circulator has an advantage over the wavelength independent reflector that it has higher durability to the high optical power.

The wavelength and power of the pump light emitted from the pumping light source 3 are 1.48 $\mu$m and 200 mW, respectively, and the length of the EDF 4 is 50 m. In the conventional configuration as shown in FIG. 21, which achieves the same gain and optical output power, the length of the EDF amounts to 100 m, each 50 m of which is assigned to the EDF 44 and EDF 51, and the pump light power amounts to 300 mW, about 100 mW and 200 mW of which are assigned to the EDF 44 and EDF 51, respectively. Thus, it is clear that the present concrete example can reduce the number of components and the cost as compared with the first conventional configuration.

Figure 20:
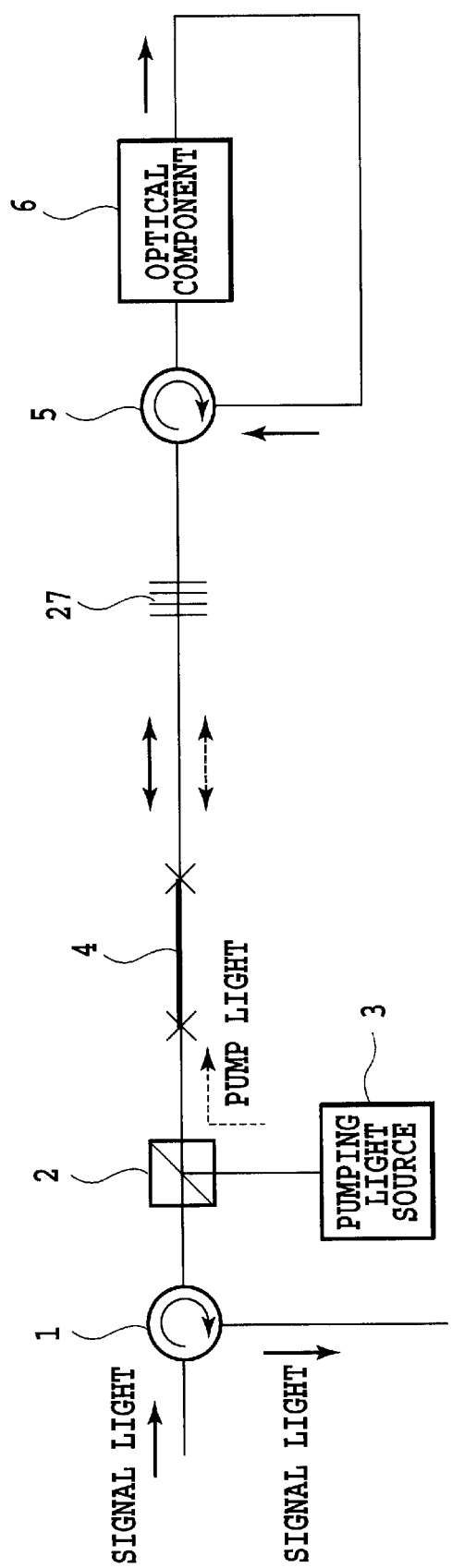
FIG. 20 is a block diagram showing a fifth embodiment of the optical amplifier in accordance with the present invention.

FIG. 20 is a block diagram showing a configuration of a fifth embodiment in accordance with the present invention. Although the present embodiment is similar to the first embodiment, it differs in comprising a reflector of the pump light interposed between the EDF 4 as the active optical fiber and the second optical circulator 5. The reflector can consist of a fiber grating (FG) 27, for example. The FG 27 reflects only the pump light at a high reflectivity, but transmits the signal light. Since the FG 27 has a small insertion loss and a high reflectivity, it has an advantage over the first embodiment of having a greater reflection power of the pump light. Furthermore, in the first embodiment, since the pump light passes through the second optical circulator 5 twice and the optical component once, the insertion loss is considerably greater than that of the fifth embodiment using the FG.

Figure 26:
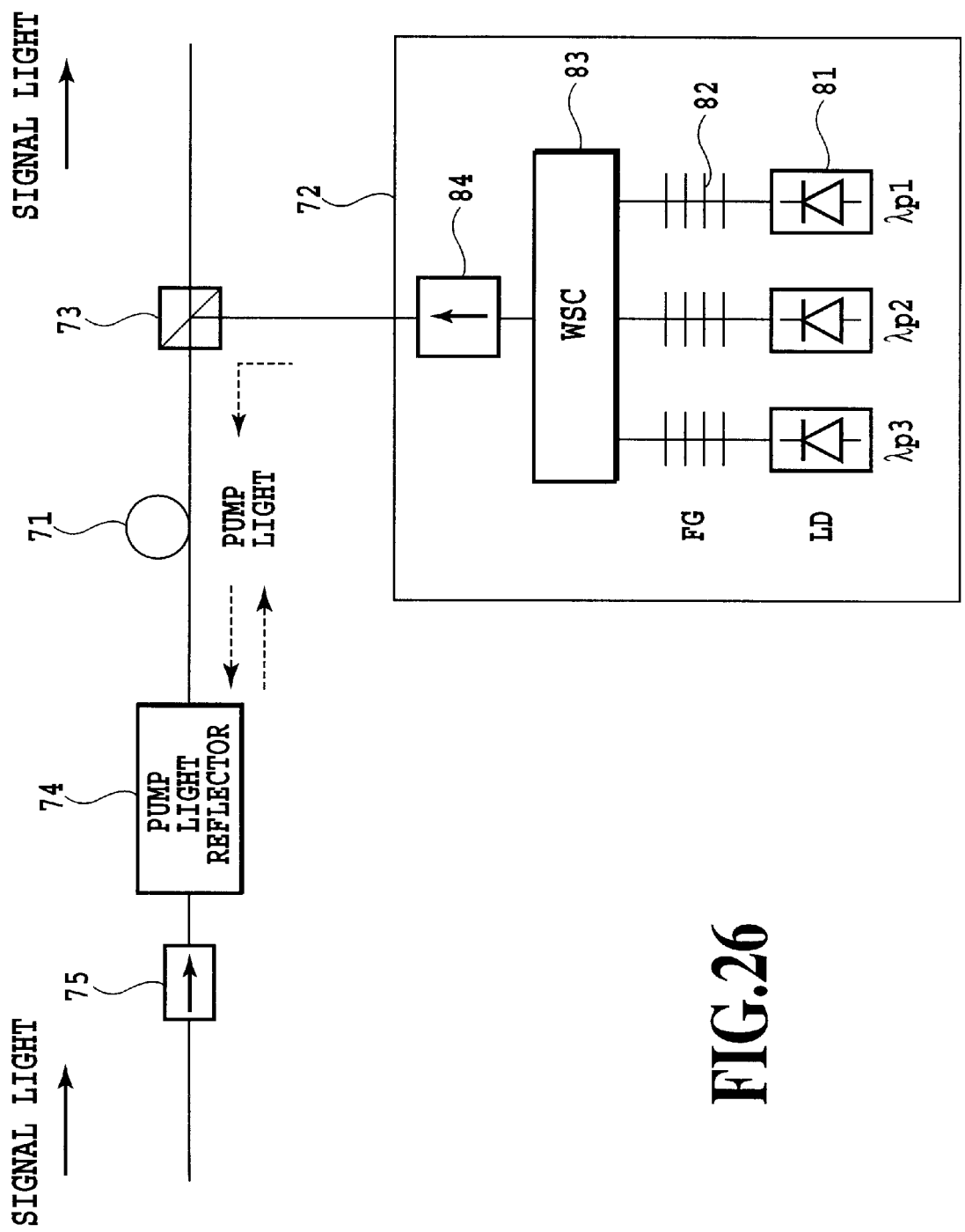
FIG. 26 is a block diagram showing a first embodiment of a Raman amplifier in accordance with the present invention.

FIG. 26 is a block diagram showing a first embodiment (configuration example) of a Raman amplifier in accordance with the present invention. In FIG. 26, the reference numeral 71 designates an optical fiber as a gain medium of the Raman amplifier; 72 designates a pumping light source for pumping the optical fiber 71; 73 designates an optical combiner for combining the pump light from the pumping light source 72 with signal light; 74 designates a pump light reflector for reflecting the pump light passing through the optical fiber 71; and 75 designates an optical isolator for eliminating the residual reflection light to the Raman amplifier.

The pumping light source 72 comprises laser diodes (LDs) 81 whose emitting light waves are subjected to the wavelength combining ($\lambda$S1 $\lambda$S2 and $\lambda$S3); fiber gratings (FGs) 82 for narrowing the oscillation wavelengths of the LDs 81; a wavelength selective combiner (WSC) 83 for carrying out wavelength division multiplexing of a plurality of wavelengths of the pump light; and an optical isolator 84 for removing residual reflection light from the outside.

Figure 46:
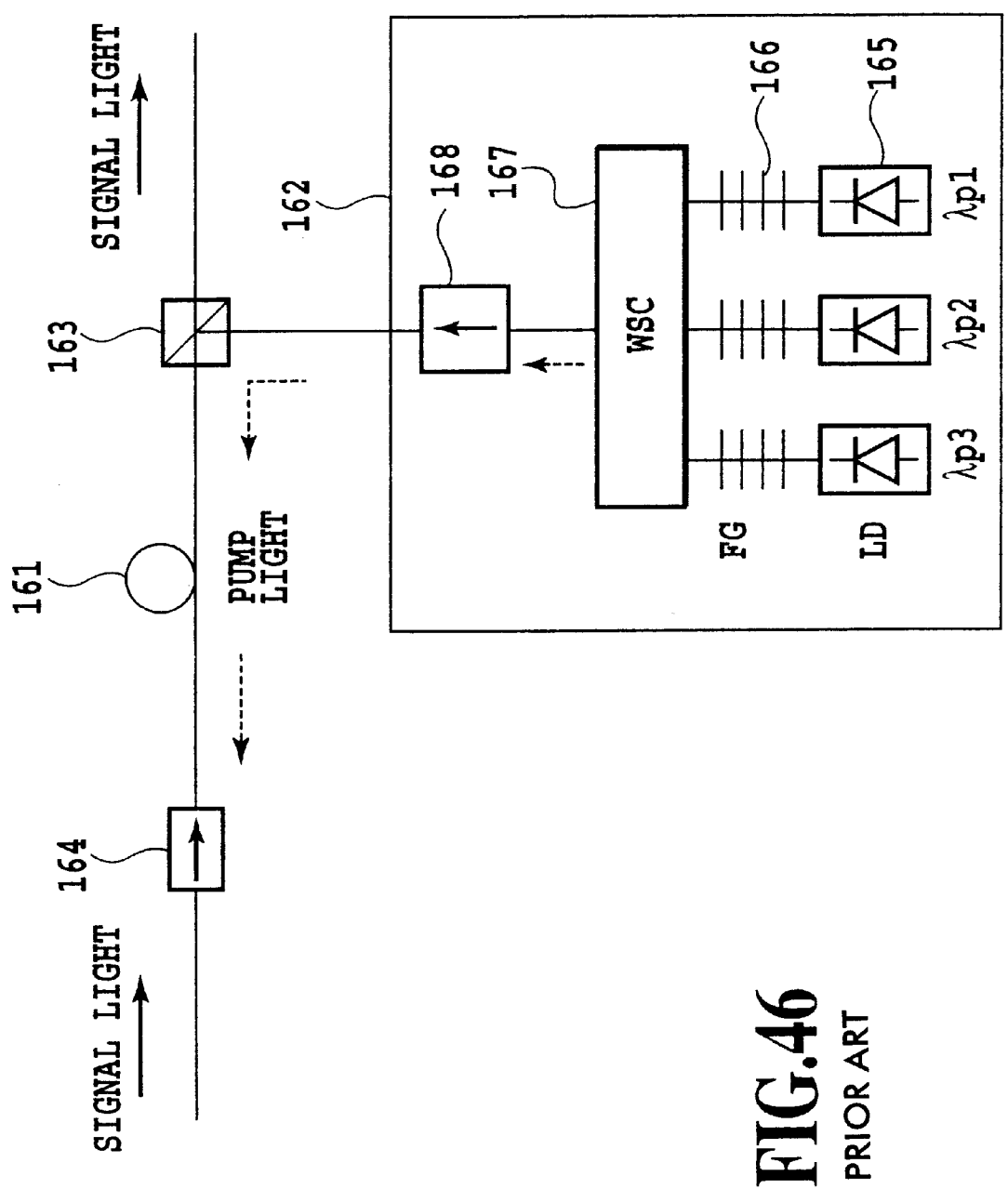
FIG. 46 is a block diagram showing a first configuration of a conventional Raman amplifier.
Figure 47A:
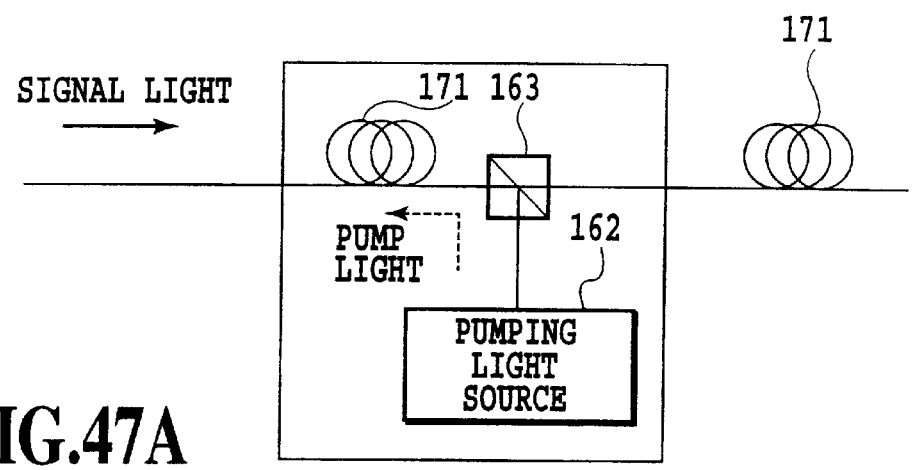
FIGS. 47A–47C are diagrams each illustrating an application scheme of the Raman amplifier.
Figure 47B:
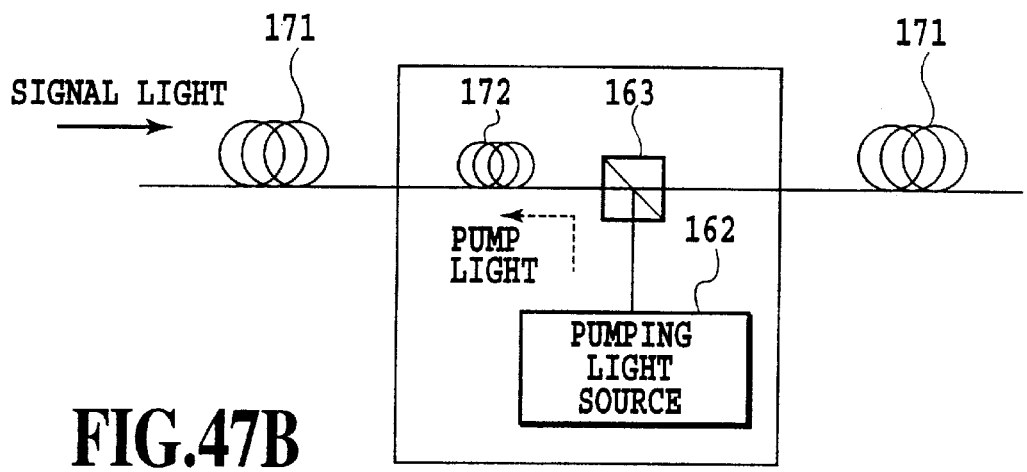
Figure 47C:
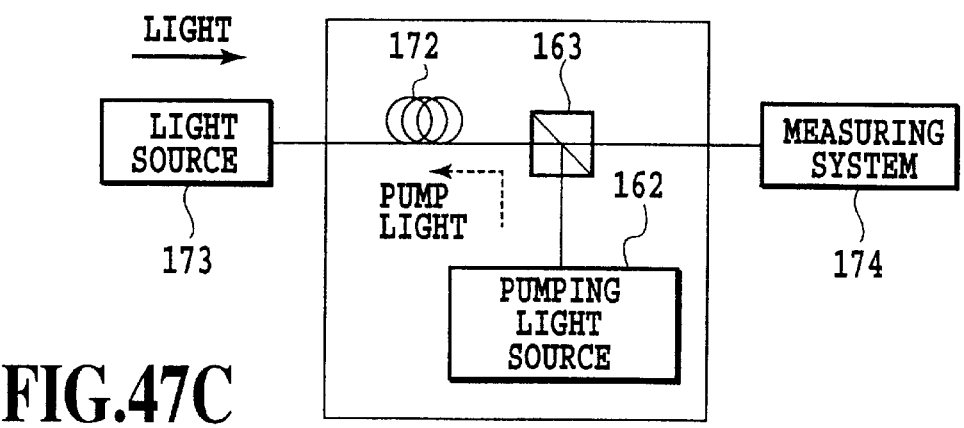
Figure 48:
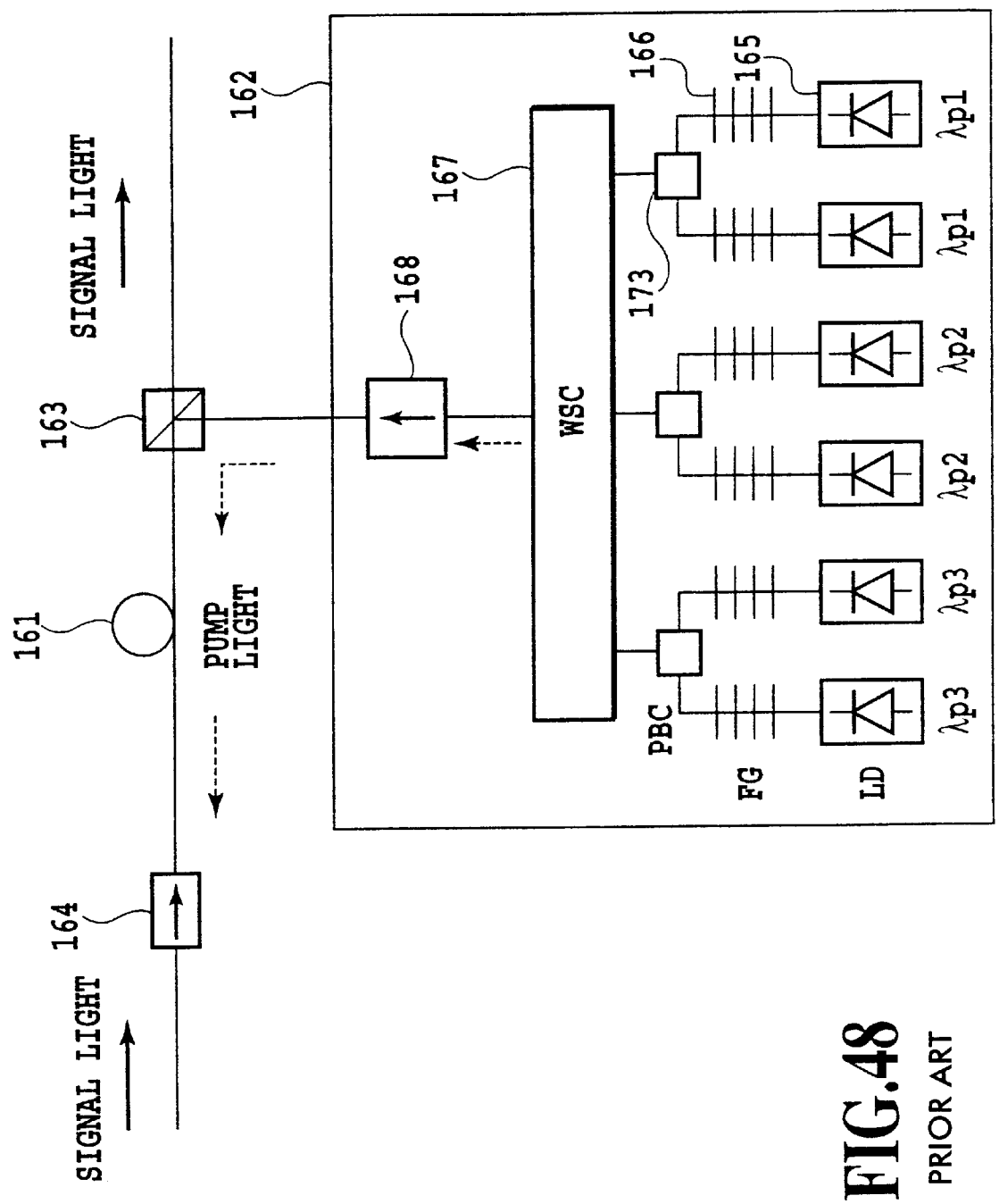
FIG. 48 is a block diagram showing a second configuration of a conventional Raman amplifier.
Figure 49:
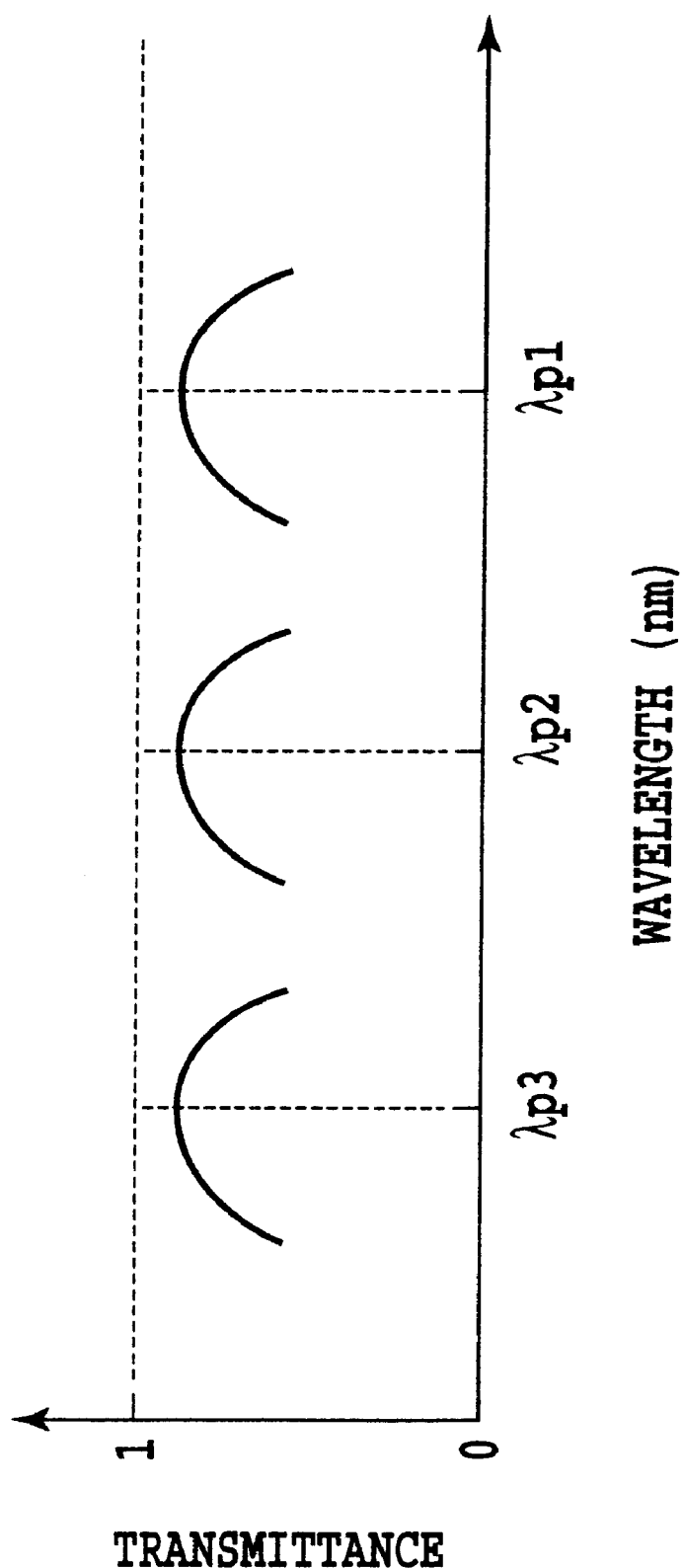
FIG. 49 is a diagram illustrating a transmittance spectrum of a conventional wavelength selective combiner.
Figure 50:
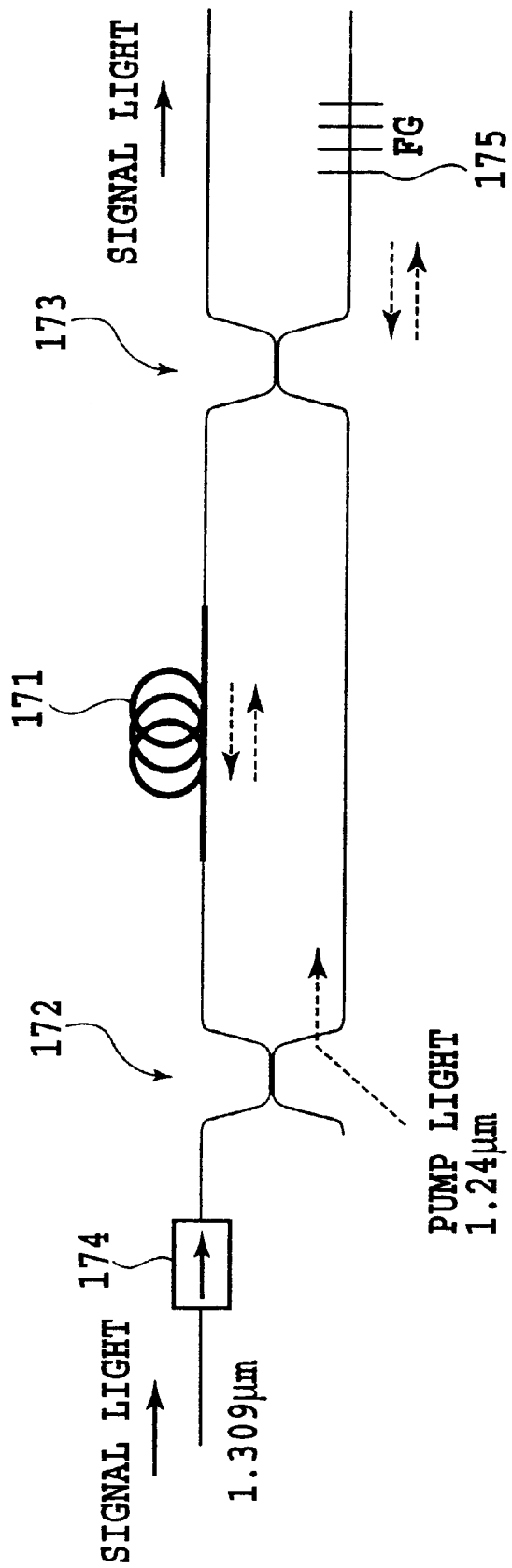
FIG. 50 is a diagram showing a third configuration of a conventional Raman amplifier.
Figure 51:
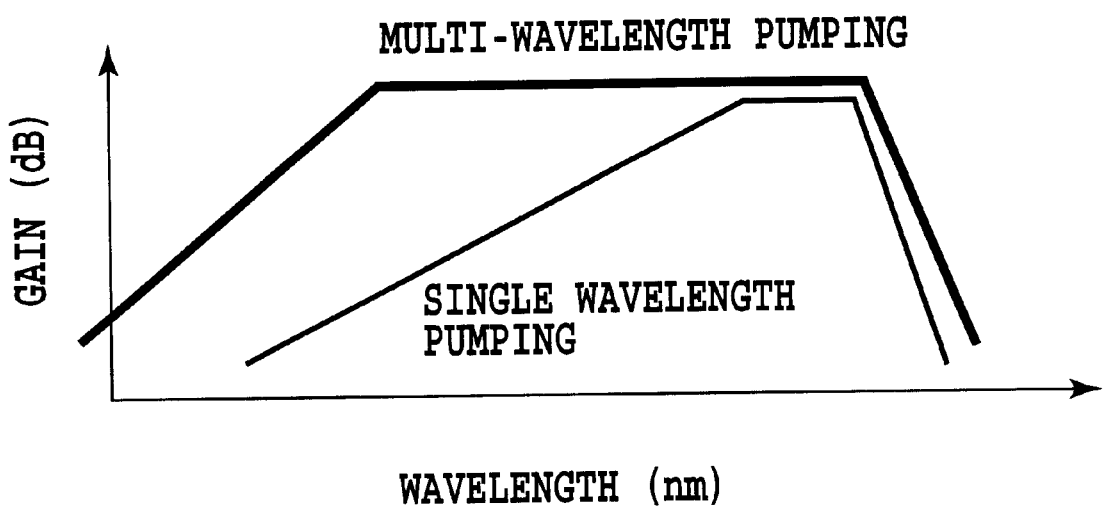
FIG. 51 is a diagram illustrating a transmittance spectrum of a conventional wavelength selective combiner.

Comparing the Raman amplifier in accordance with the present invention with the first conventional Raman amplifier as shown in FIG. 46, the former differs from the latter in that it comprises the pump light reflector 74 between the optical fiber 71 and the optical isolator 75. The pump light reflector 74 transmits the signal light at a low transmission loss, and reflects the pump light at a high reflectivity. Generally, the signal light wavelength of the Raman amplifier is set from a few tens of nanometers to about 100 nanometers, which is longer than the pump light wavelengths.

Figure 27A:
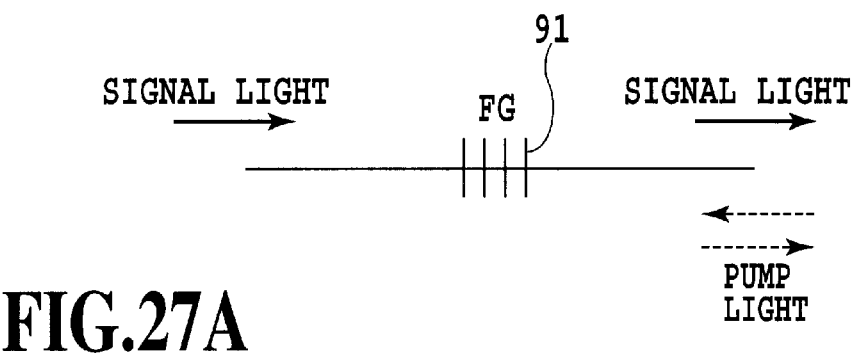
FIGS. 27A–27C are diagrams showing embodiments of a pump light reflector.
Figure 27B:
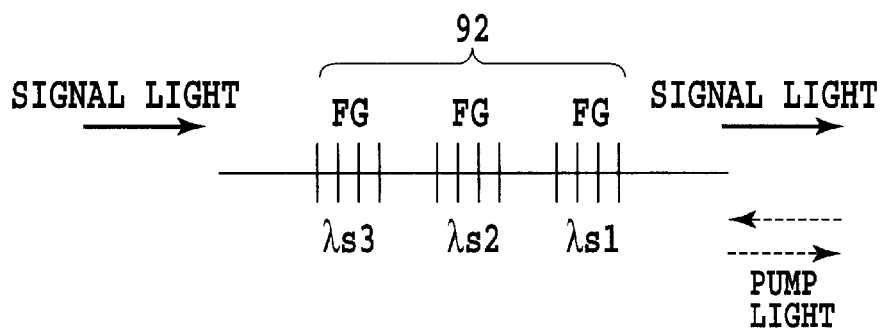
Figure 27C:
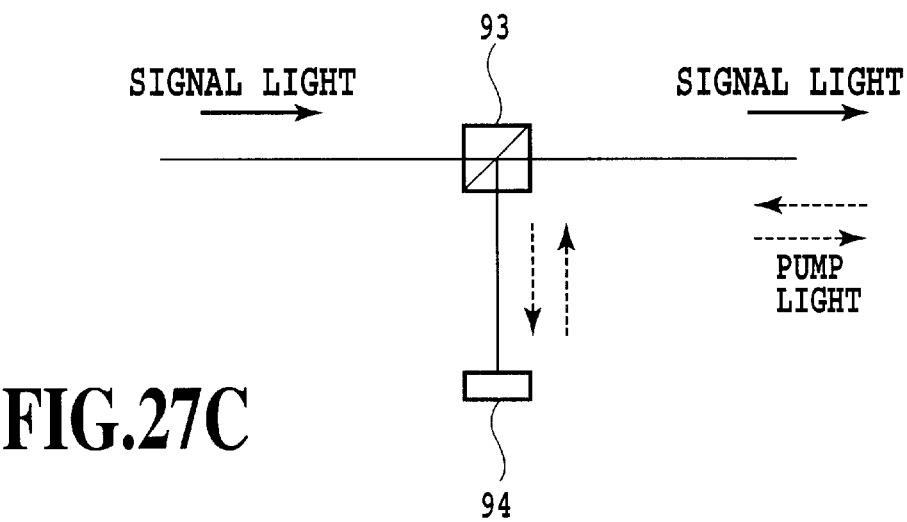

FIGS. 27A–27C are diagrams each showing a configuration of the pump light reflector: FIGS. 27A and 27B employ an FG 91 and FGs 92; and FIG. 27C employs an optical combiner 93 and a mirror 94. The FG 91 as shown in FIG. 27A reflects the plurality of wavelengths of the pump light collectively, but transmits the signal light. On the other hand, the FGs 92 as shown in FIG. 27B reflects the plurality of wavelengths of the pump light one by one, but transmits the signal light. The mirror 94 consists of a glass plate with metal film deposited thereon or of an FG. Generally, the FGs 91 and 92 of FIGS. 27A and 27B have smaller insertion loss than the optical combiner 93 in FIG. 27C. Accordingly, the configurations of FIGS. 27A and 27B are characterized by having a higher pump light reflectivity than that of the configuration as shown in FIG. 27C. In addition, the con- figuration of FIG. 27A is characterized in that it has a smaller number of components than the configuration of FIG. 27B.

Furthermore, since the configuration of FIG. 27C reflects the pump light after dividing it from the signal light, the mirror is easy to fabricate, which offers an advantage of being able to reduce the cost of the mirror. This is because the mirror can be fabricated independently of the signal light loss even when the pump light includes a plurality of wavelengths with a wide wavelength distribution. In addition, when the optical combiner 93 consists of a dielec- tric multi-layer filter, its wavelength separation characteris- tic of the pump light from the signal light is good, which offers an advantage over the conventional technique of being able to prevent the excessive loss at the signal light wavelength, and to fabricate it simply at low cost.

The optical combiner 93 as shown in FIG. 27C divides the input signal light from the input pump light, and combines the output signal light and output pump light. Thus, it will be more appropriate to call it an optical combiner and divider. However, since it is clear from the reciprocality of light propagation that the wavelength selective optical com- biner operates as a divider, the term "optical combiner" will be used below when various optical components operate as an optical combiner and divider.

When the optical fiber 71 is a Raman fiber consisting of a $GeO_2$-doped silicate fiber, the signal light wavelength is about 1.5 $\mu$m, the absorption coefficient of the pump light is about 0.4 dB/km, and the length of the optical fiber is about a few kilometers (depending on the pump light power and gain setting value). Accordingly, the absorption value of the pump light by the Raman fiber is about 4 dB at most, and a considerable amount of the pump light is emitted from the optical fiber 71.

On the other hand, when the optical fiber 71 is a trans- mission fiber consisting of a 1.3 $\mu$m zero-dispersion single- mode fiber (SMF) or 1.5 $\mu$m dispersion-shifted fiber (DSF), and when the signal light wavelength is about 1.5 $\mu$m, the absorption coefficient of the pump light is about 0.18 dB/km or 0.22 dB/km, and the length of the optical fiber is a few tens of kilometers (depending on the pump light power and gain setting value). Accordingly, the absorption value of the pump light by the transmission fiber is about 4 dB at most when its length is less than 20 km, and a considerable amount of the pump light is emitted from the optical fiber. Incidentally, comparing the SMF with the DSF, the DSF has a greater Raman gain coefficient, providing a greater Raman gain at the same pump light power.

Thus, since the above-described configuration reflects a considerable amount of the pump light by the pump light reflector 74 to launch the pump light into the optical fiber 71 again, it can increase the total power of the input pump light. On the other hand, the internal Raman gain (the gain in the optical fiber measured in terms of dB) is proportional to the total power of the input pump light. Thus, the internal Raman gain increases considerably as compared with that of the conventional Raman amplifier. The effective Raman gain (simply called "Raman gain" from now on), however, is obtained by subtracting the signal light loss of the Raman fiber from the internal Raman gain when the optical fiber 71 is a Raman fiber. In this way, according to the present invention, since the Raman gain increases as compared with the conventional Raman amplifier using the pumping light source, the pumping efficiency of the Raman amplifier also increases.

Figure 28A:
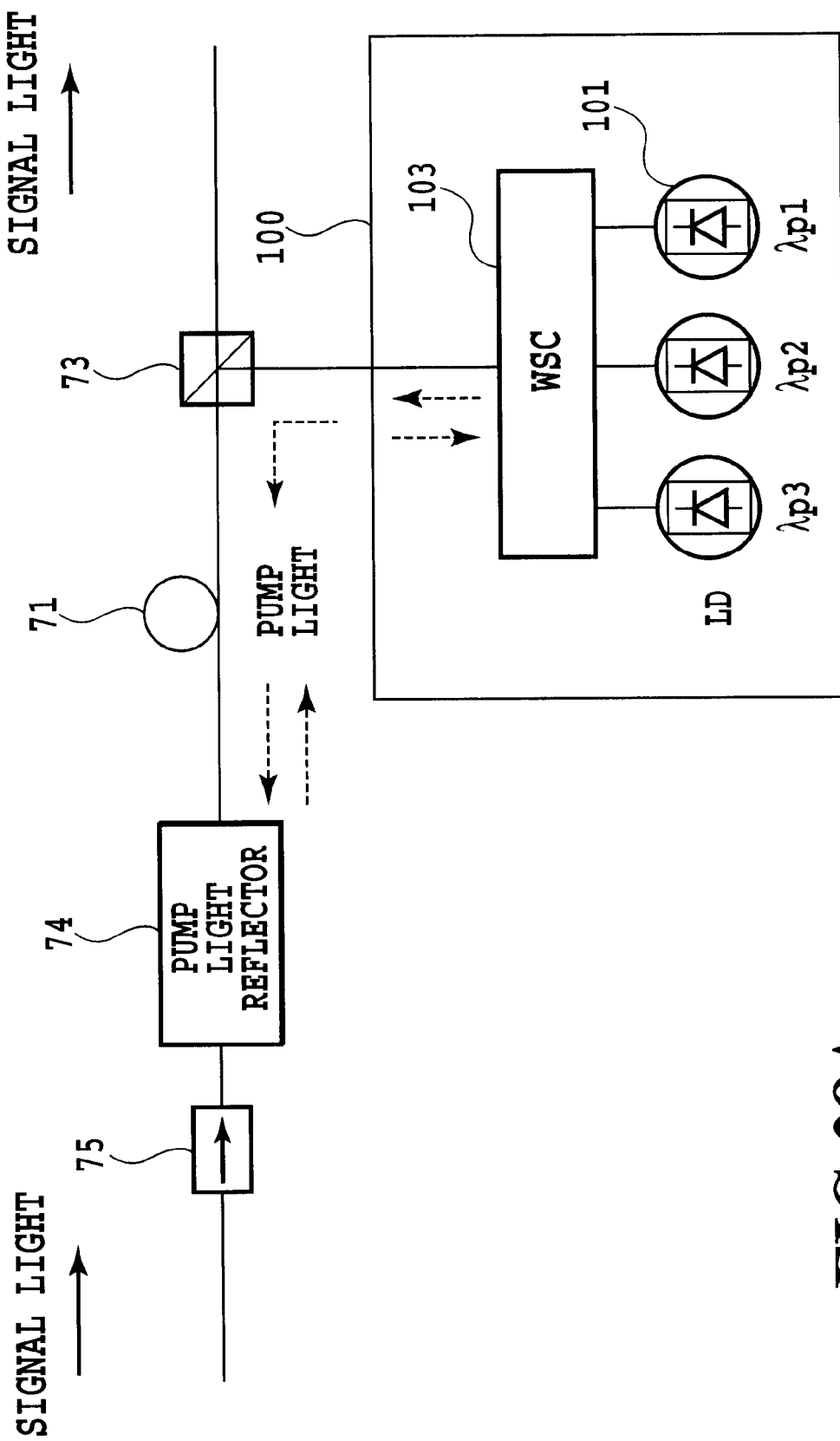
FIGS. 28A and 28B are block diagrams each showing a second embodiment of the Raman amplifier in accordance with the present invention.
Figure 28B:
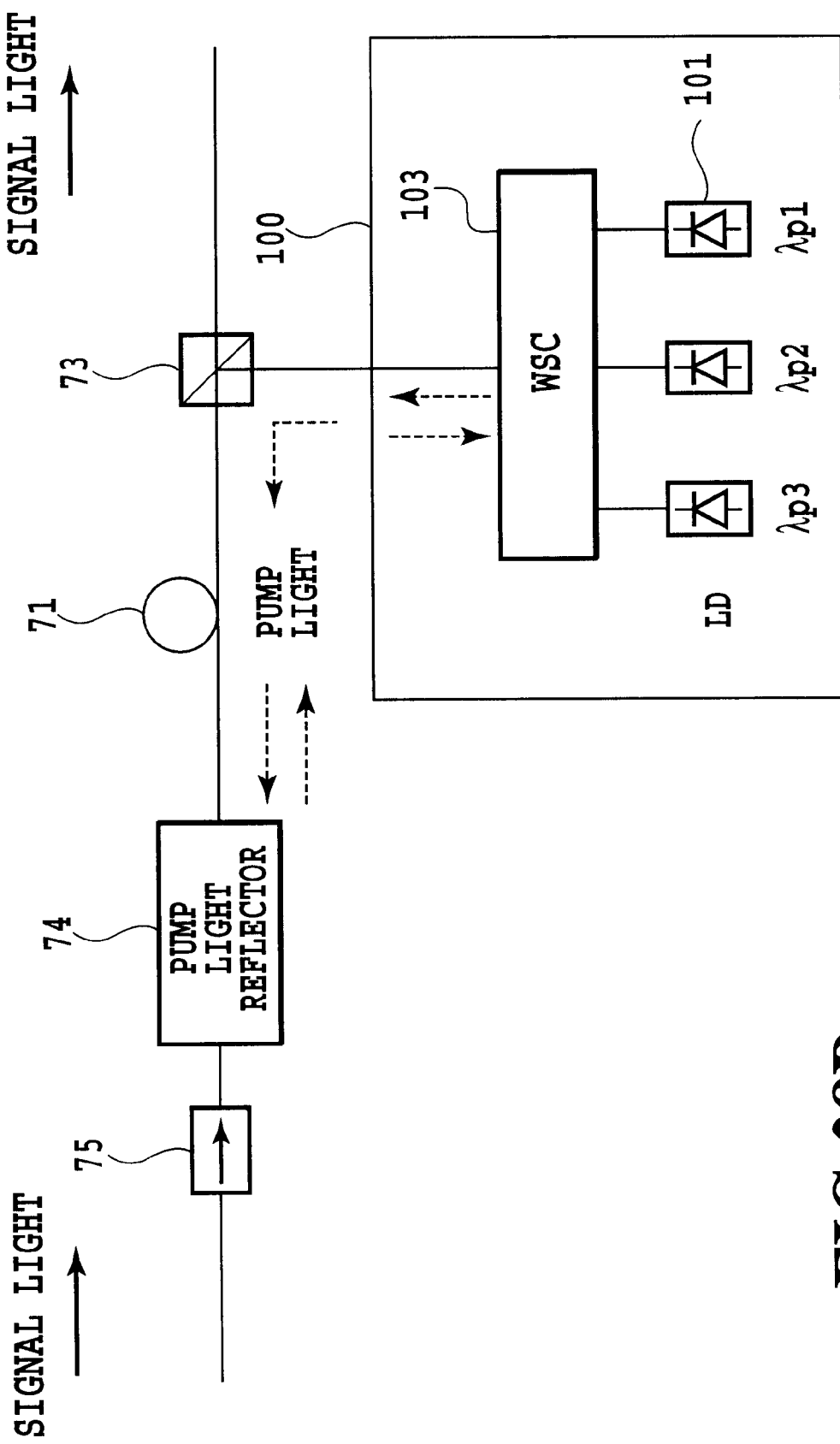

FIGS. 28A and 28B are block diagrams each showing the second embodiment of the Raman amplifier in accordance with the present invention, in which the configuration of the pumping light source differs from that of the foregoing first embodiment. More specifically, a pumping light source 100 of the second embodiment comprises a plurality of LDs 101 and a wavelength selective combiner 103. The FGs 82 and optical isolator 84 used in the first embodiment are removed from the second embodiment. The LDs 101 in the second embodiment have, except for a particular case, an intra-laser gain which is non-polarized with respect to the polarization mode, that is, the TE mode and TM mode.

The particular case refers to the case as shown in FIG. 28B where the polarization of the input signal light to the Raman amplifier is maintained at a linear polarization having a fixed polarization plane, and where the optical components between the pump light reflector 74 and LDs 101 (that is, the optical combiner 73, wavelength selective combiner 103 and LD pigtail optical fiber 71) are polarization maintaining components. In the particular case, it is unnecessary for the LDs to be non-polarized. The intra-laser gain is usually polarization dependent because of the spatial asymmetry of the LD waveguide structure.

In such a configuration, the pump light output from the LDs 101 and reflected by the pump light reflector 74 (called "return light" from now on) travels along the path in the direction opposite to that of the output pump light, to return to the LDs 101 in accordance with the pump light wavelengths. Each of the LDs 101 has an antireflection coated front end surface and a highly reflectively coated rear end surface, thereby forming an external cavity between the reflection surface of the pump light reflector 74 and the rear end surface.

When there is no return light, and when the oscillation wavelength width of the LDs 101 (normally about 10 nm) is greater than the transmission width of the wavelength selective combiner 103 for each pump light wavelength, the oscillation wavelength width is narrowed below the transmission width of the wavelength selective combiner 103 by the laser oscillation in the external cavity. Accordingly, the FGs next to the LDs are not necessary in the second embodiment.

In contrast, when there is no return light, and when the oscillation wavelength width is smaller than the transmission width of the wavelength selective combiner 103, the oscillation wavelength is not narrowed below the transmission width of the wavelength selective combiner 103 by the laser oscillation in the external cavity.

The wavelength selective combiner 103 employed in the second embodiment differs in the requirements for the transmittance spectrum characteristic from the wavelength selective combiner 167 in the conventional Raman amplifier or the wavelength selective combiner 83 in the first embodiment.

Figure 29:
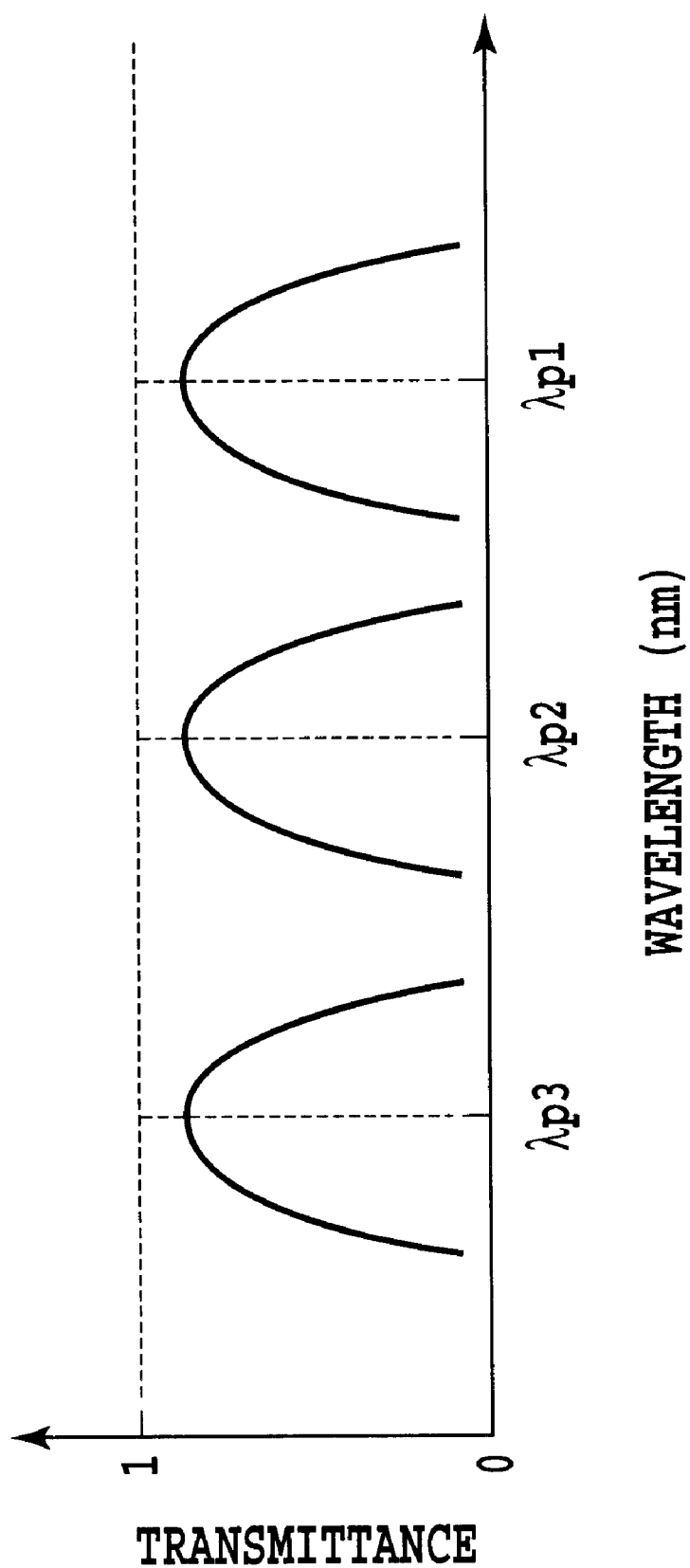
FIG. 29 is a diagram illustrating a transmittance spectrum of a wavelength selective combiner in accordance with the present invention.

When the pump light reflector 74 consists of the reflector as shown in FIG. 27A or 27C whose reflectivity is pump wavelength independent, the transmittance spectrum of the wavelength selective combiner 103 in the second embodiment is as shown in FIG. 29. In this case, the transmittance difference between different pump light wavelengths must be large enough to prevent the return light from being mixed with the wavelengths of the other LDs. The transmittance difference is greater than 20 dB, for example. In contrast, when the pump light reflector 74 consists of the reflector as shown in FIG. 27B whose reflectivity is wavelength selective, restrictions on the transmittance difference is relaxed.

Thus, the second embodiment has an advantage of being able to increase the total input pump light power and hence to improve the signal light gain as in the first embodiment, because the pump light reflected by the pump light reflector 74 is input to the optical fiber 71.

Figure 30:
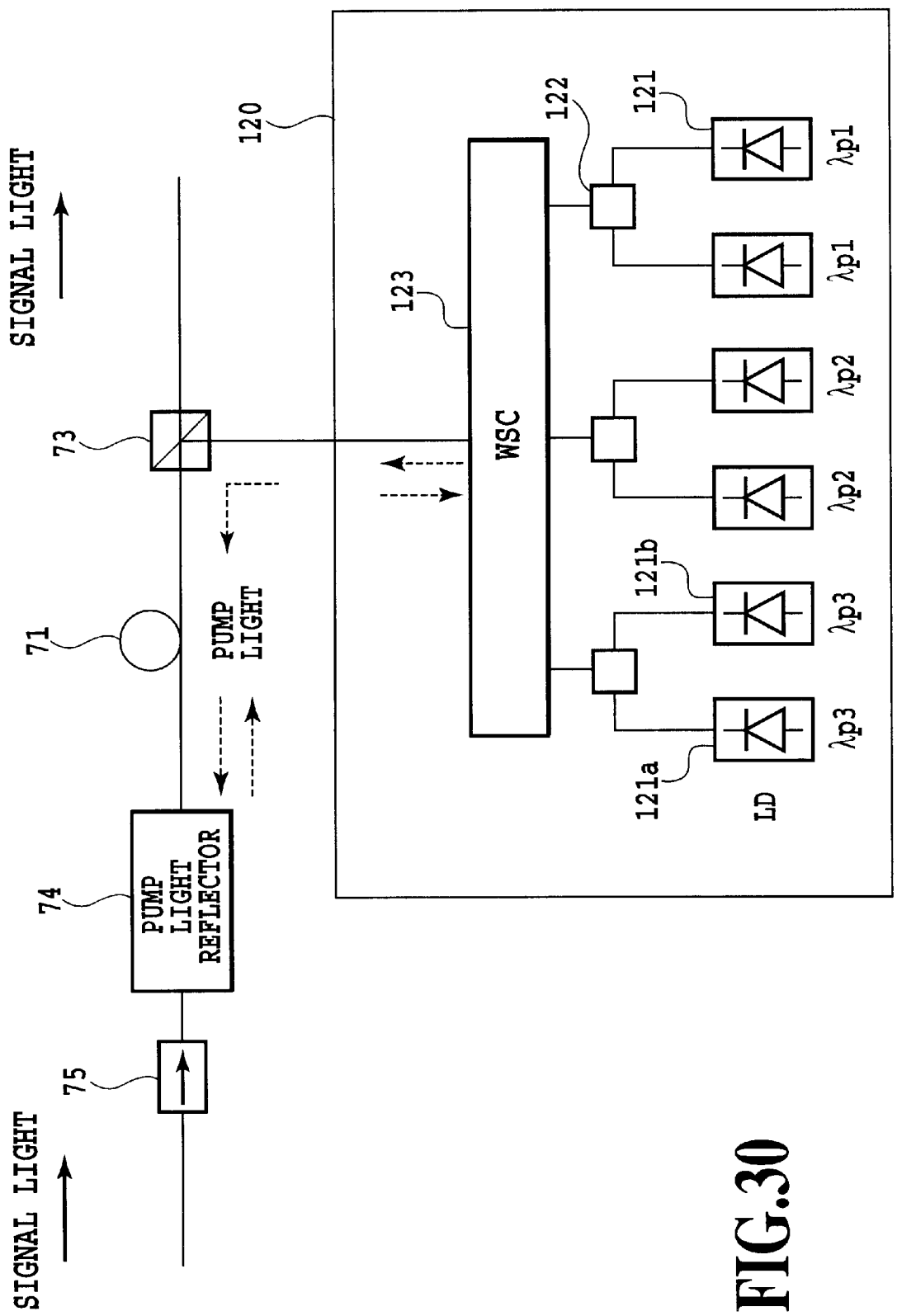
FIG. 30 is a block diagram showing a third embodiment of the Raman amplifier in accordance with the present invention.

FIG. 30 is a block diagram showing a third embodiment of the Raman amplifier in accordance with the present invention, which differs from the second embodiment in the configuration of a pumping light source 120. The pumping light source 120 of the third embodiment comprises a plurality of pairs of LDs 121a and 121b with the same pump light wavelength; polarization beam combiners (PBCs) 122 each assigned to one of the pairs; and a wavelength selective combiner 123. The LDs 121 of the third embodiment can be polarization dependent. The pump light emitted from the LDs and reflected by the pump light reflector 74 travels along the path in the opposite direction to that of the light emitted from the LDs, and returns to the original LDs or to the LDs having the same wavelength but different polarization in response to the pump wavelength. When the pump light returns to the original LDs emitting the very pump light, an external cavity is formed between the pump light reflector 74 and the rear end surface as in the second embodiment. On the other hand, when the reflected pump light returns to the LD with the same wavelength as the original LD emitting the very pump light, but with different polarization, an external cavity is formed between the rear end surfaces of the two LDs.

As described above, the third embodiment also has an advantage of being able to increase the total input pump light power and hence to improve the signal light gain as in the second embodiment, because the pump light reflected by the pump light reflector is input to the optical fiber.

Figure 31:
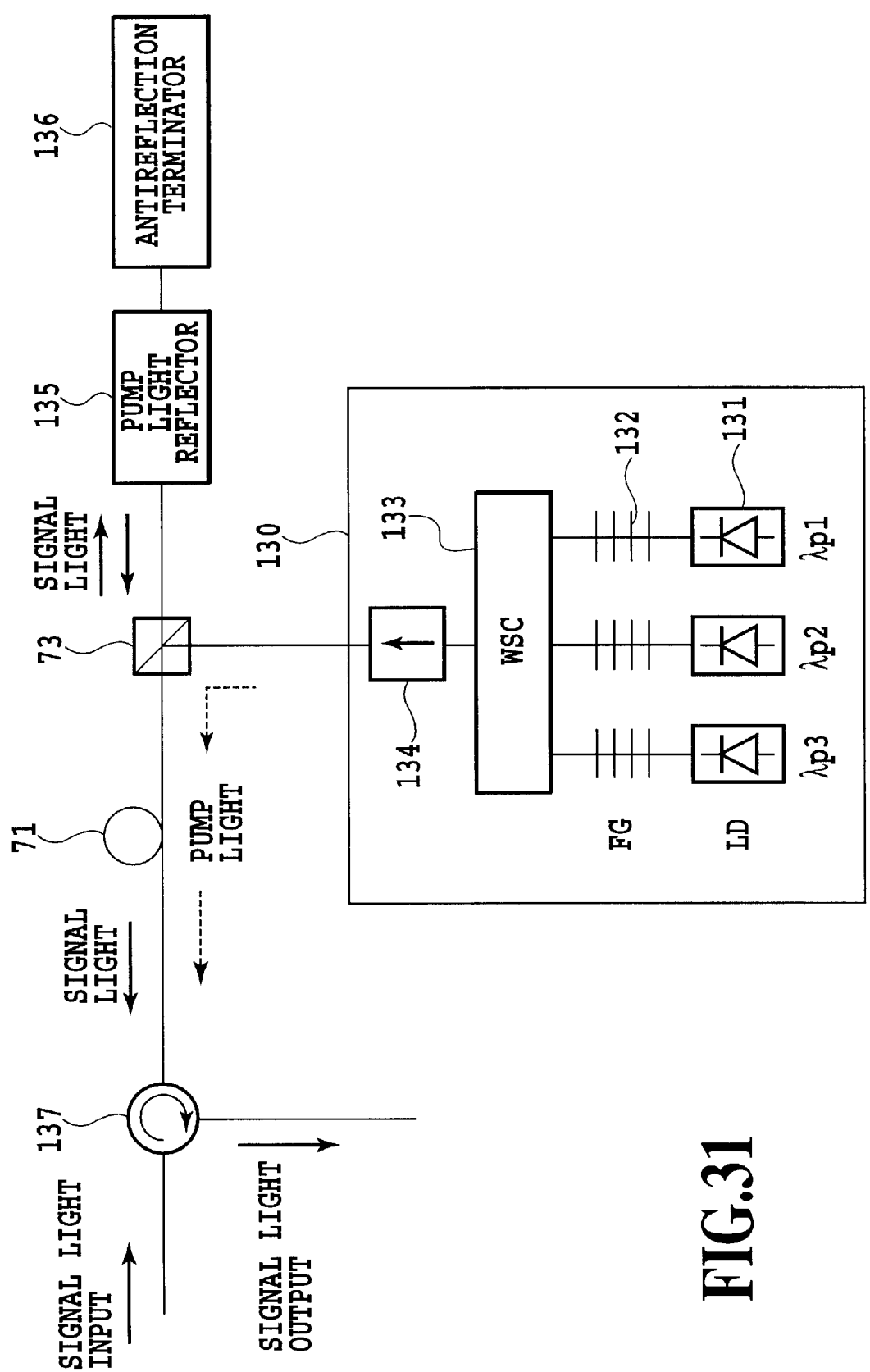
FIG. 31 is a block diagram showing a fourth embodiment of the Raman amplifier in accordance with the present invention.

FIG. 31 is a block diagram showing a fourth embodiment of the Raman amplifier in accordance with the present invention, which differs from the first conventional configuration as shown in FIG. 46 in that the two-port optical isolator 164 in the conventional optical amplifier is replaced by a three-port optical circulator 137 in the present embodiment. In addition, the present embodiment further comprises a signal light reflector 135 and an antireflection terminator 136.

In this configuration, the signal light is amplified while passing through the optical fiber 71, reflected by the signal light reflector 135, and amplified again by the optical fiber 71 while passing back through it. The reflected signal light emitted from the optical fiber 71 is output from the third port of the optical circulator 137 (the bottom port in FIG. 31). The antireflection terminator 136 is provided to prevent the residual signal light passing through the signal light reflector 135 from being reflected by a connector end surface or the like and mixed with the original reflected light, thereby bringing about noise.

Figure 32A:
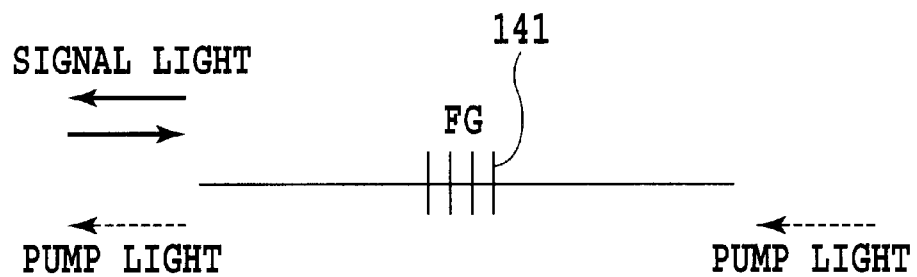
FIGS. 32A–32C are diagrams each showing a configuration of a signal light reflector.
Figure 32B:
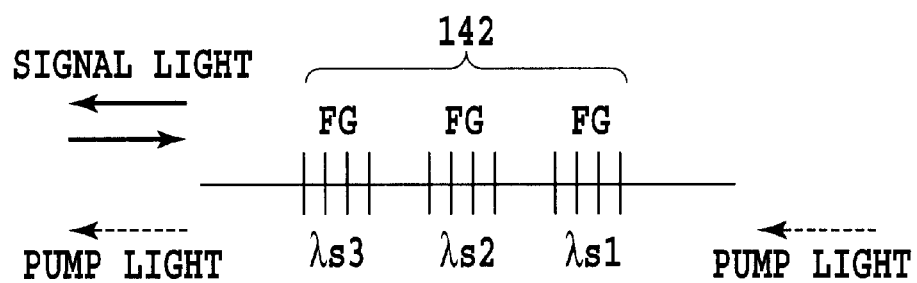
Figure 32C:
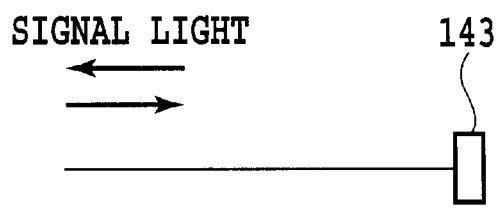

FIGS. 32A–32C are diagrams showing configurations of the signal light reflector. FIG. 32C shows a mirror 143 for simply reflecting only the signal light; FIG. 32A shows a fiber grating (FG) 141 for collectively reflecting the wavelength multiplexed signal light; and FIG. 32B shows a multi-stage connection of FGs 142 for reflecting the wavelength multiplexed signal light wavelength by wavelength of the signal light. It is assumed here that the signal light includes three wavelengths $\lambda S1$, $\lambda S2$ and $\lambda S3$. It is obvious that the signal light reflector 135 as shown in FIG. 32C does not require the antireflection terminator 136.

The fourth embodiment has an advantage of being able to increase the signal light gain to about twice that of the conventional configuration, unless the Raman gain is saturated by the signal light. When the Raman gain is saturated by the signal light, the improvement in the signal light gain is less than twice. In any case, the improvement in the signal light gain is achieved. Since the FGs 141 are 142 are generally transparent to light with a wavelength other than that of the reflected light, they transmit the pump light as illustrated in FIGS. 32A and 32B.

Figure 33:
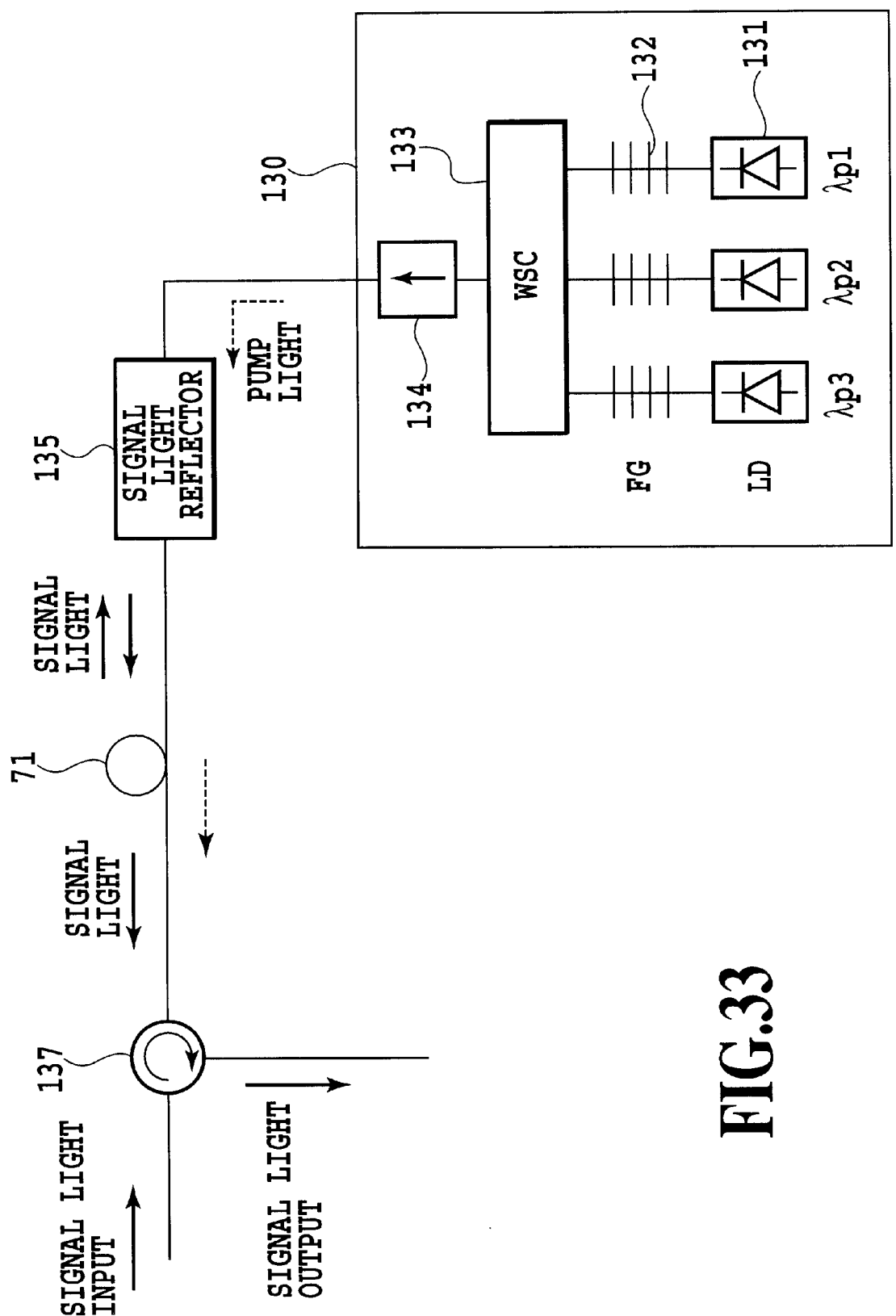
FIG. 33 is a block diagram showing a fifth embodiment of the Raman amplifier in accordance with the present invention.

FIG. 33 is a block diagram showing a fifth embodiment of the Raman amplifier in accordance with the present invention, which employs the signal light reflector as shown in FIG. 32A or 32B. The fifth embodiment differs from the fourth embodiment as shown in FIG. 31 in that it does not comprise the optical combiner 73 nor the antireflection terminator 136. As for the signal light gain improvement, it is similar to the fourth embodiment in that it can increase the signal light gain to about twice that of the conventional configuration.

As described above, the first to third embodiments improve the Raman gain by reflecting the pump light, whereas the fourth and fifth embodiments improve the Raman gain by reflecting the signal light. Comparing the first to third embodiments with the fourth and fifth embodiments, it is seen from FIGS. 26, 28, 30, 31 and 33, that they have configurations independent of each other. In other words, any combinations of one of the first to third embodiments with one of the fourth and fifth embodiments is possible. More specifically, it is possible to implement the combination of one of the first to third embodiments with the fourth embodiment, and the combination of one of the first to third embodiments with the fifth embodiment.

Figure 34:
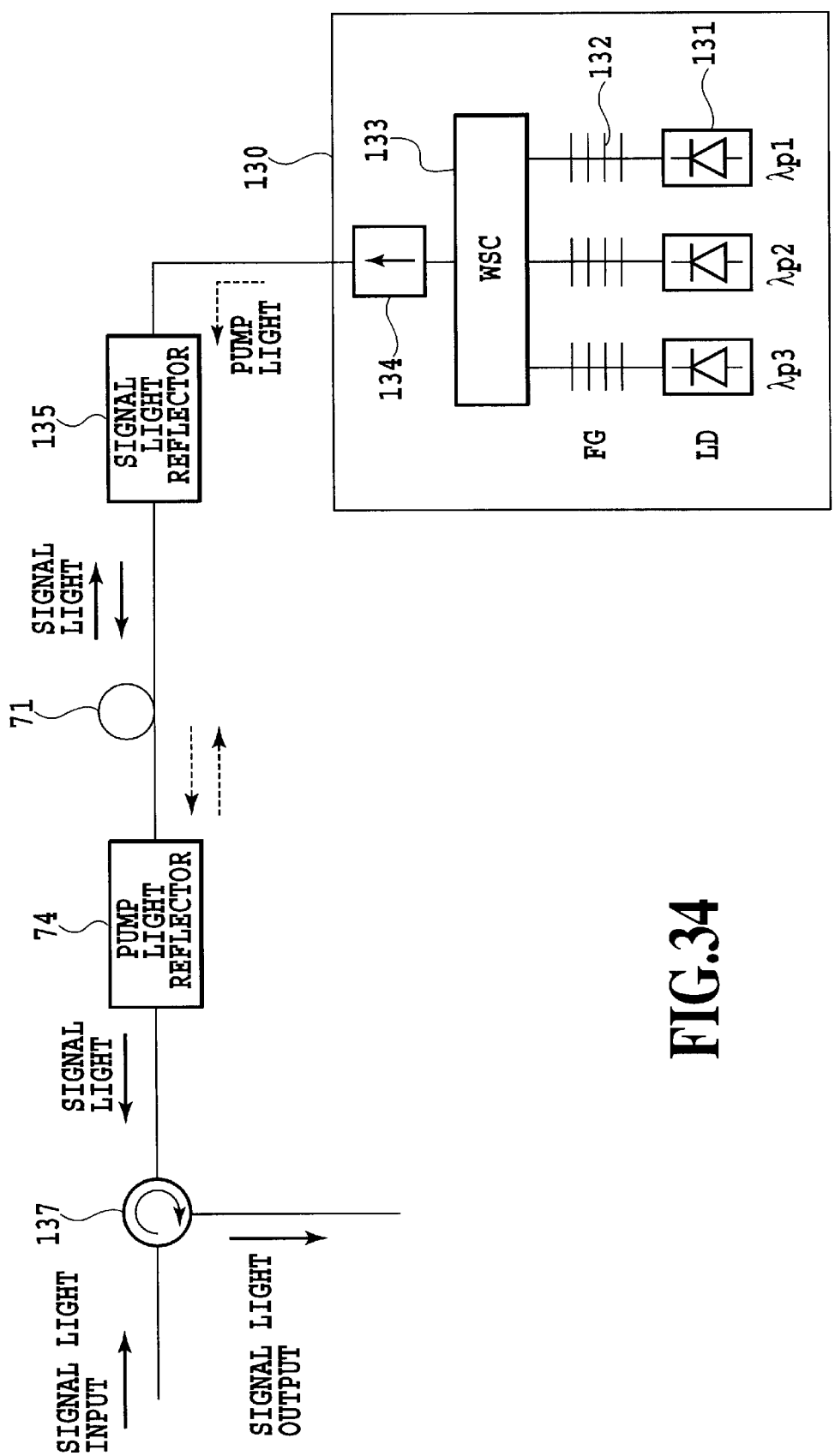
FIG. 34 is a block diagram showing a sixth embodiment of the Raman amplifier in accordance with the present invention.

FIG. 34 is a block diagram showing a sixth embodiment of the Raman amplifier in accordance with the present invention, which combines the first embodiment with the fifth embodiment. The pump light reflector 74 as shown in FIG. 34 reflects the pump light, but transmits the signal light, whereas the signal light reflector 135 reflects the signal light, but transmits the pump light. Since the sixth embodiment has the advantages of both the first and fifth embodiments, it can markedly improve the signal light gain.

Figure 35:
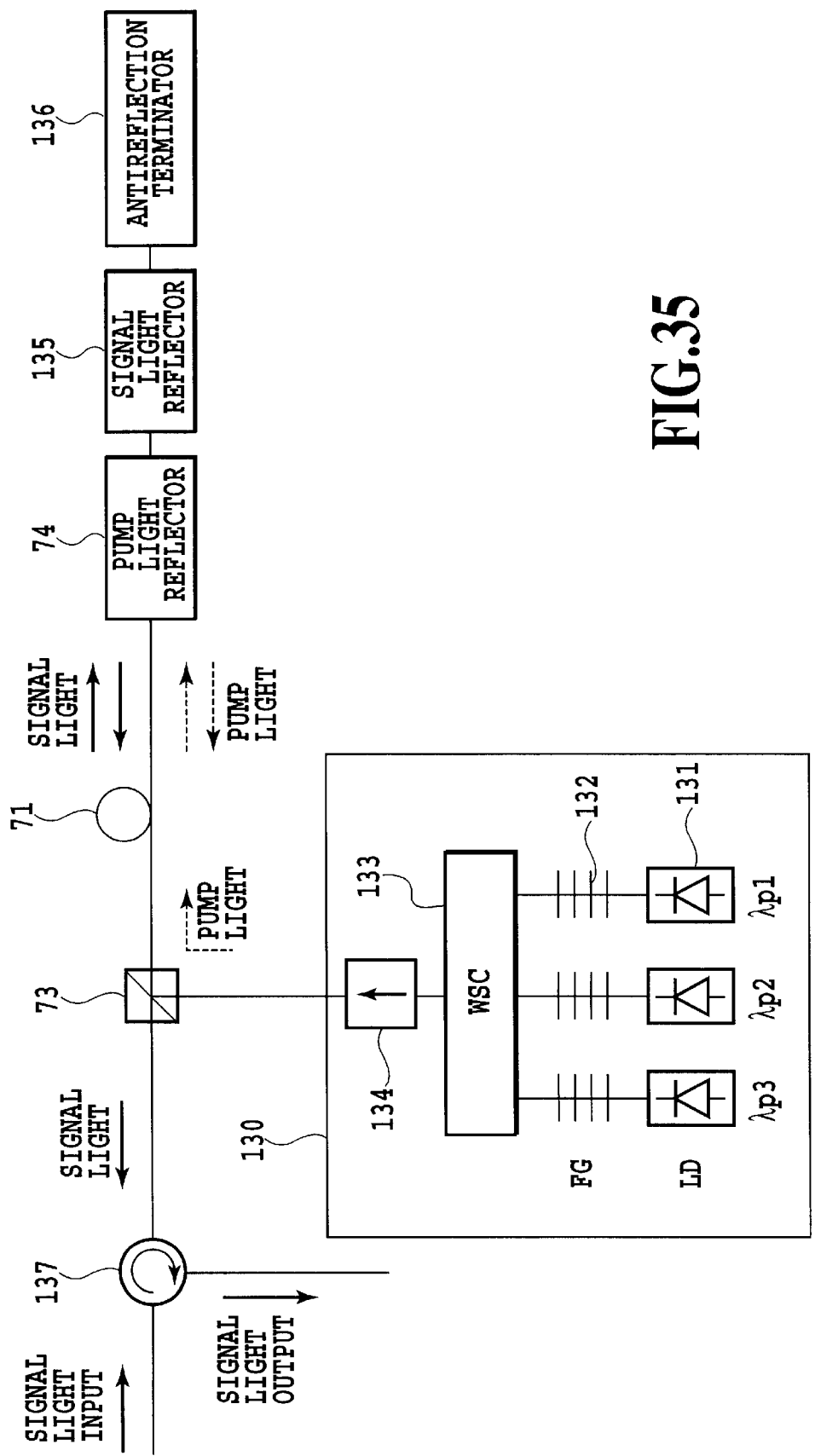
FIG. 35 is a block diagram showing a seventh embodiment of the Raman amplifier in accordance with the present invention.

FIG. 35 is a block diagram showing a seventh embodiment of the Raman amplifier in accordance with the present invention, which is applicable to an arrangement in which the signal light and pump light would propagate through the optical fiber 71 in the same direction without a pump light reflector and a signal light reflector. The connection order of a pump light reflector 74 and a signal light reflector 135 can be reversed from that of FIG. 35. The antireflection terminator 136 is not essential as described above. Since the seventh embodiment has the advantages of both the first and fifth embodiments as the sixth embodiment, it can markedly improve the signal light gain.

As described above, the first to seventh embodiments in accordance with the present invention offer an advantage over the conventional techniques of being able to improve the signal light gain.

Next, more concrete examples (first to ninth example) of the Raman amplifier in accordance with the present invention will be described. The first, eighth and ninth examples correspond to the first embodiment in accordance with the present invention, and the second to seventh examples correspond to the second to seventh embodiments described above, respectively. Furthermore, the first to seventh examples employ the Raman fiber as the optical fiber, and are used for carrying out lumped amplification, while the eighth and ninth examples employ the transmission fiber as the optical fiber, and are used for carrying out distributed amplification.

As described above, using the transmission fiber as the optical fiber is characterized in that it can further improve the optical noise characteristic than using the Raman fiber as the optical fiber because the former amplifies the signal light dispersedly. On the other hand, as described above, using the Raman fiber as the optical fiber is characterized in that it has fewer restrictions on the transmission fiber than using the transmission fiber as the optical fiber because the former amplifies the signal light concentratedly.

Figure 36:
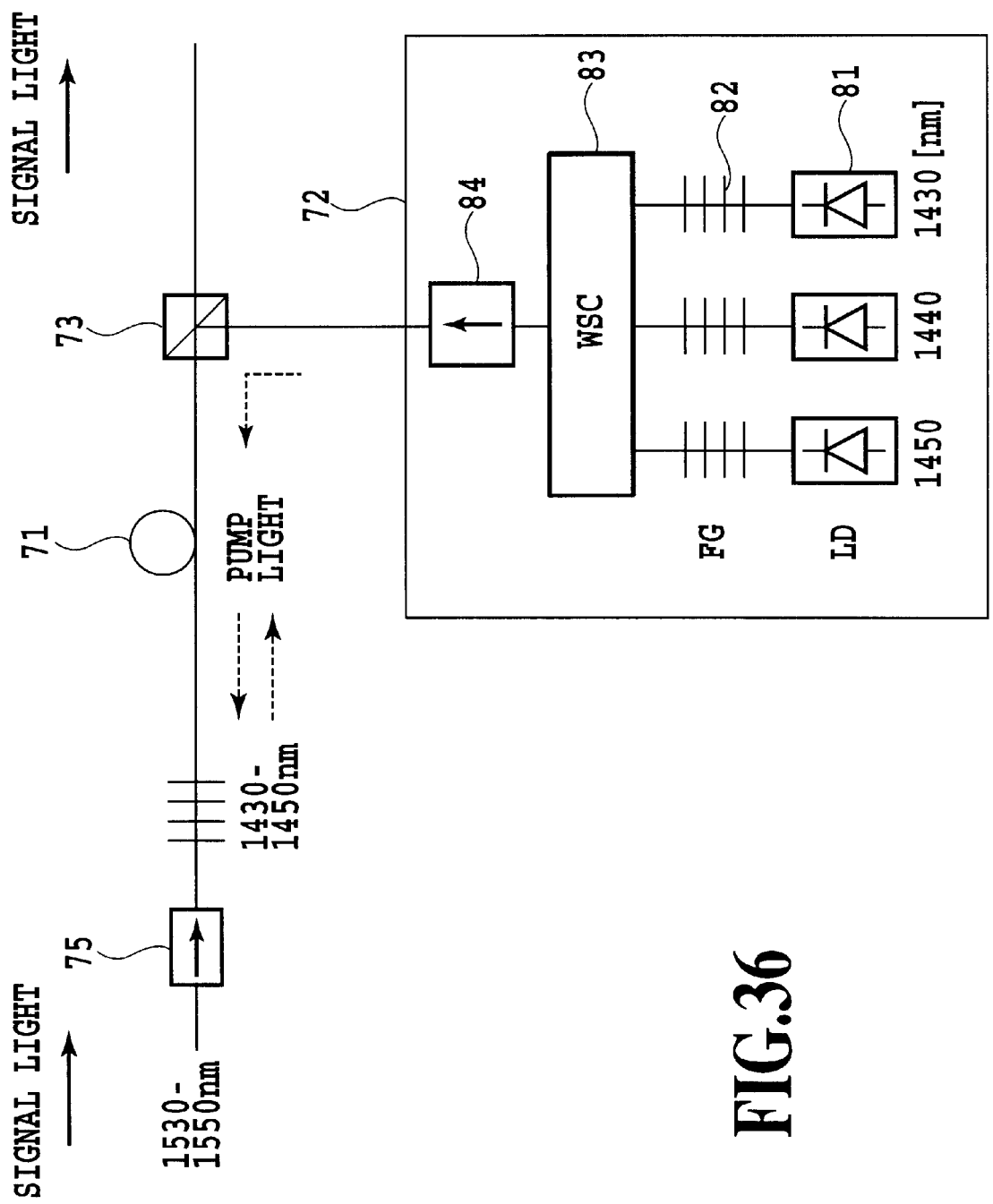
FIG. 36 is a block diagram showing a first example of the Raman amplifier in accordance with the present invention.

FIG. 36 is a block diagram showing a first example of the Raman amplifier in accordance with the present invention. The wavelengths of the LDs 81 of the pumping light source 72 are 1430, 1440 and 1450 nm, which are determined in accordance with the reflectivity center wavelengths of the fiber gratings (FGs) 82 connected to the LDs 81. The LDs 81 are a Fabry-Perot LD, the oscillation wavelength width of which is about 10 nm when the FGs 82 connected to the LDs 81 are not used. The reflectivity half-width of the FGs 82 connected to the LDs 81 is 1 nm. Thus, the oscillation wavelength width when using the FGs 82 connected to the LDs 81 is less than 1 nm. The Raman fiber consists of a $GeO_2$-doped silicate fiber, and its absorption coefficient for the pump light, length and pump light loss (absorption value) are 0.4 dB/km, 8 km and 3.2 dB, respectively. The gain wavelength band, which depends on the pump light wavelengths, is about 1530–1550 nm.

The pump light power incident on the Raman fiber from the optical combiner 3 side is a few tens of milliwatts to about 100 milliwatts for each of the pump light wavelengths. For the sake of simplicity, however, it is assumed to be 100 mW for each of the pump light wavelengths. As an FG 74a corresponding to the pump light reflector 74 as shown in FIG. 26, the FG as shown in FIG. 27A is used which collectively reflects the pump light including three wavelengths. The pump light reflectivity is nearly 100% (99%, for example), and the transmission loss of the signal light is less than 0.2 dB. Without the pump light reflector, the present example will reduce to the conventional Raman amplifier as shown in FIG. 46, whose internal Raman gain is about 15 dB at the signal light wavelength of 1530–1550 nm.

As described above, since the pump light loss of the Raman fiber is 3.2 dB, the pump light power reflected by the FG 74a as the pump light reflector 74 is about 48 mW. Accordingly, the total input pump light power to the Raman fiberisabout 148 mW. The internalRaman gain in the first example is about 22.2 dB, so that the improvement in the Raman gain is about 7.2 dB (22.2−15=7.2).

Figure 37:
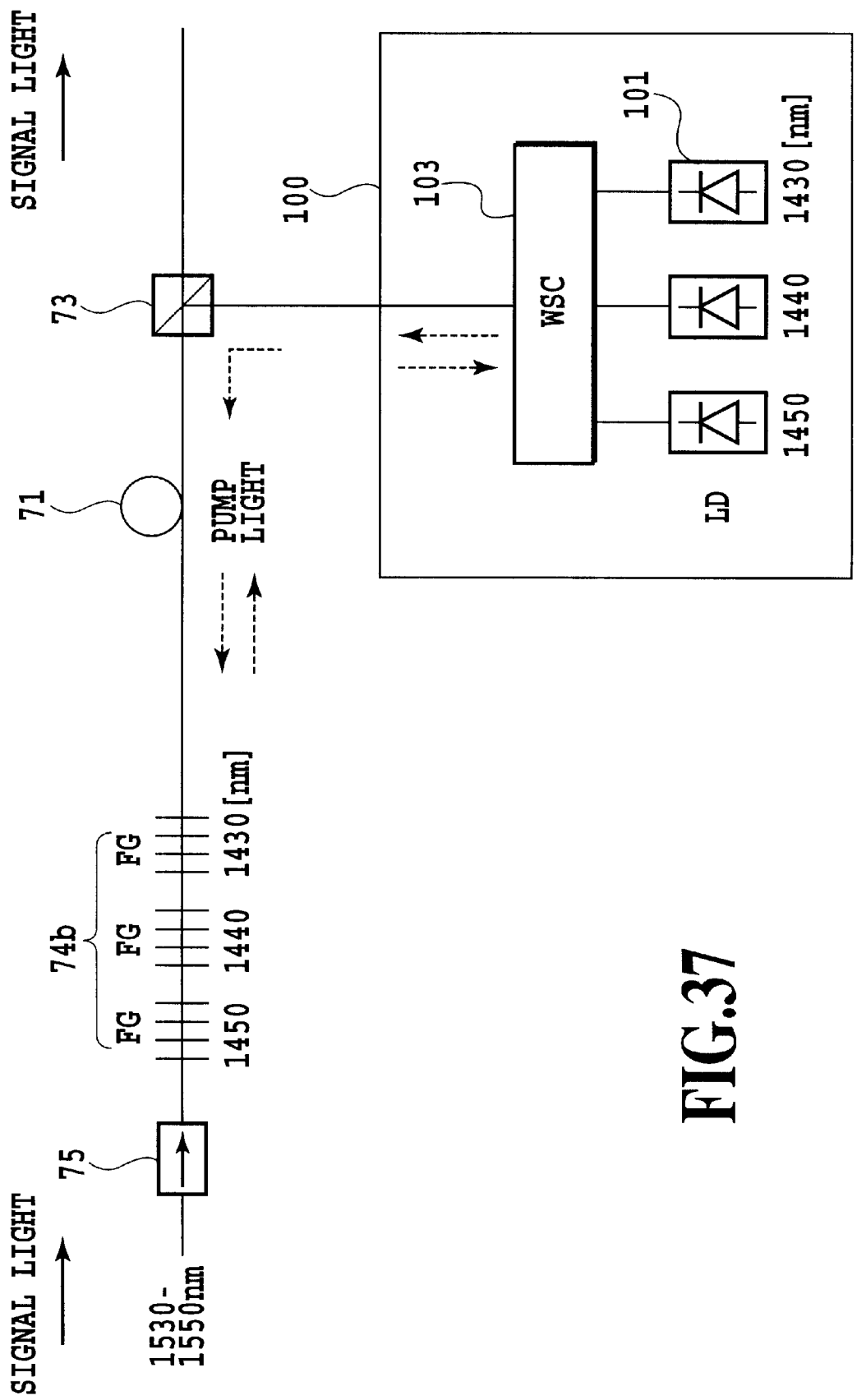
FIG. 37 is a block diagram showing a second example of the Raman amplifier in accordance with the present invention.

FIG. 37 is a block diagram showing a second example of the Raman amplifier in accordance with the present invention. It uses as FGs 74b corresponding to the pump light reflector 74, the FGs as shown in FIG. 27B which individually reflect the three wavelengths of the pump light. Each of the FGs 74b has a pump light reflectivity of about 100% (99%, for example), and a reflectivity half-width of 2 nm. The total transmission loss of the signal light of the three FGs 74b is less than 0.5 dB. Each LD 101 has a front end surface reflectivity of about 1%, and a rear end surface reflectivity of about 70%. Although each LD 101 oscillates with forming an external cavity between the rear end surface and the FGs 74b for reflecting the pump light, the total optical component loss in the external cavity is not excessively large, bringing about sufficient return light. The oscillation wavelength width of the pump light with the respective wavelengths, which is limited by the reflectivity half-width, is less than 2 nm.

The Raman fiber consists of a $GeO_2$-doped silicate fiber whose absorption coefficient for the pump light, length and pump light loss (absorption value) are 0.4 dB/km, 4 km and 1.6 dB, respectively. As described above in connection with the first example, the internal Raman gain of the conventional Raman amplifier is about 10 dB for the signal light wavelength of 1530–1550 nm.

However, since the length of the Raman fiber is half that of the first example, the internal Raman gain is reduced.

As described above, since the pump light loss of the Raman fiber is 1.6 dB, the pump light power reflected by each of the FGs 74b as the pump light reflector 74 is about 69 mW. Thus, the total input pump light power to the Raman fiber is about 169 mW. The internal Raman gain in the second example is about 16.9 dB, and the improvement in the Raman gain is about 6.9 dB (16.9−10=6.9).

Figure 38:
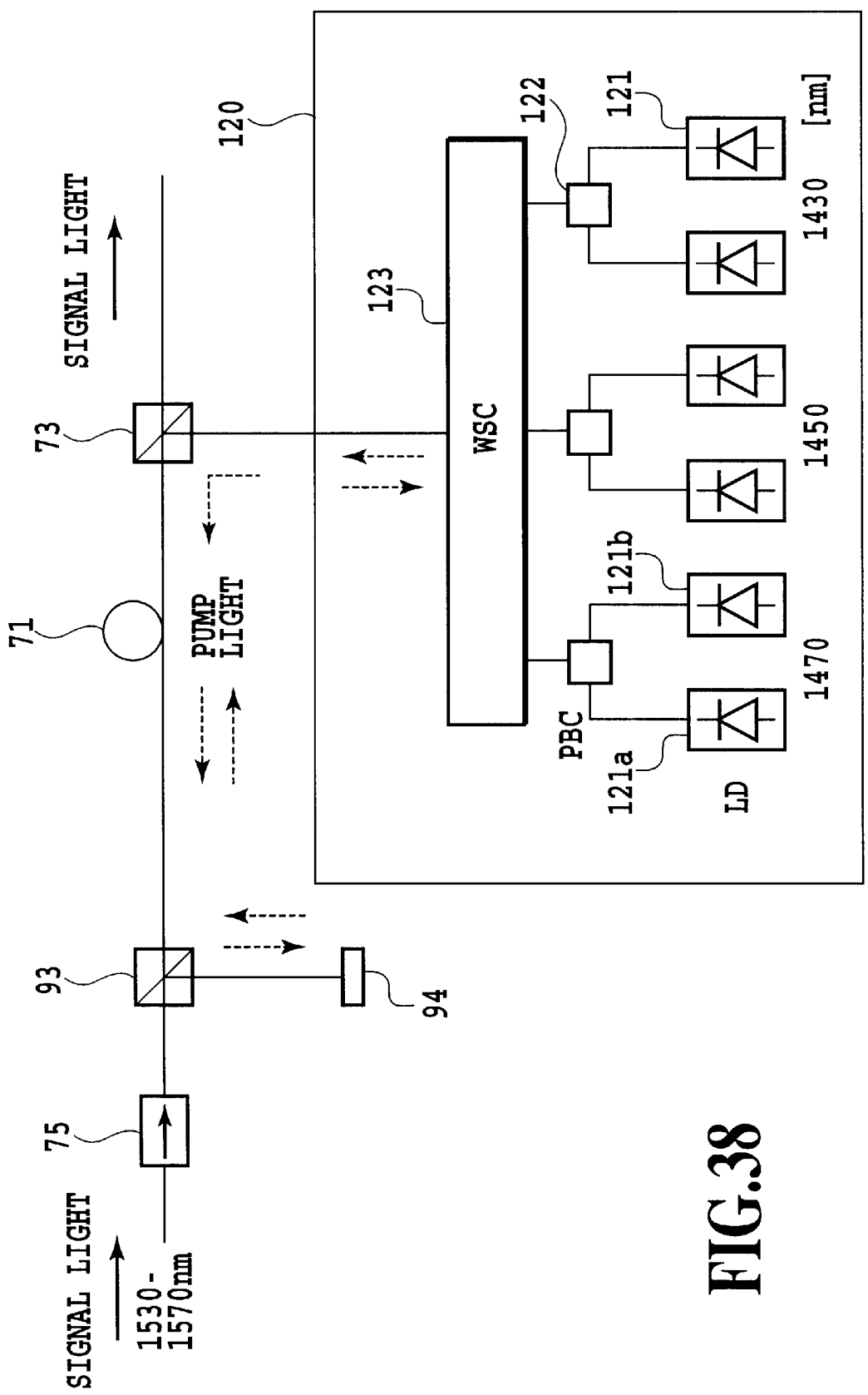
FIG. 38 is a block diagram showing a third example of the Raman amplifier in accordance with the present invention.

FIG. 38 is a block diagram showing a third example of the Raman amplifier in accordance with the present invention. The pump light power of the respective wavelengths is nearly doubled by the optical polarization division multiplexing. The spacing between the pump light wavelengths is set at 20 nm, twice that of the first and the second examples. The three pump light wavelengths are 1430, 1450 and 1470 nm. As the pump light reflector 74 is used the type as shown in FIG. 27C. The pump light reflectivity of the pump light reflector 74 is about 80%, and the transmission loss of the signal light is about 0.5 dB. Each of the LDs oscillates with forming the external cavity between its rear end surface and the mirror 94 for reflecting the pump light, in which the total optical components loss in the external cavity is not excessively large, bringing about sufficient return light. As described in connection with the second example, the internal Raman gain of the conventional Raman amplifier is about 10 dB for the signal light wavelength of 1530–1570 nm.

As described above, since the pump light loss of the Raman fiber is 1.6 dB, and the pump light reflectivity of the pump light reflector 74 is about 80%, the pump light power reflected by the pump light reflector 74 is about 55 mW. Accordingly, the total input pump light power to the Raman fiber is about 155 mW. The internal Raman gain in the third example is about 15.5 dB, and hence the improvement in the Raman gain is about 5.5 dB (15.5−10=5.5).

Figure 39:
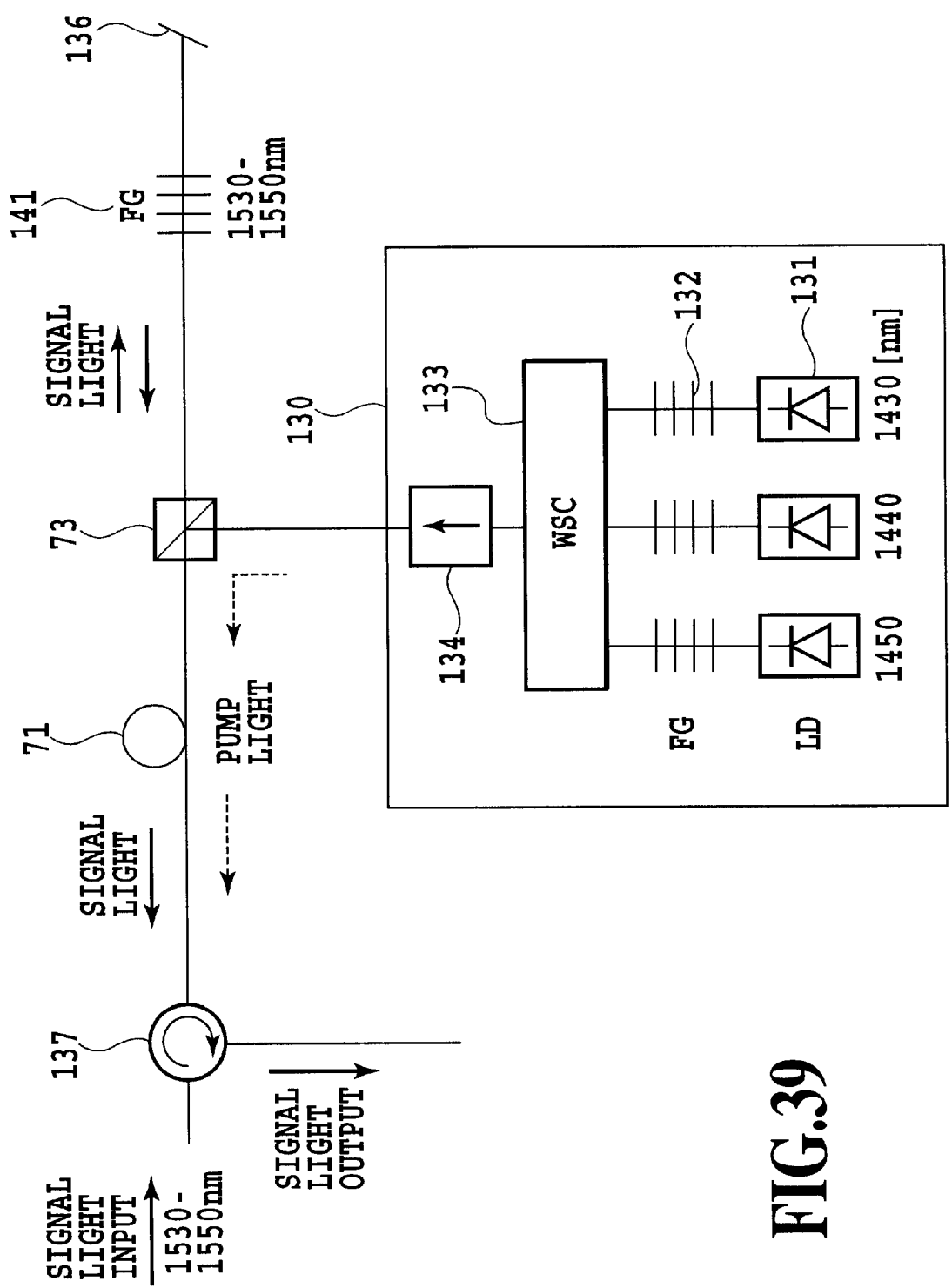
FIG. 39 is a block diagram showing a fourth example of the Raman amplifier in accordance with the present invention.

FIG. 39 is a block diagram showing a fourth example of the Raman amplifier in accordance with the present invention. As the signal light reflector 135 (see, FIG. 31) is used the FG 141 as shown in FIG. 32A which collectively reflects the 3-wavelength signal light. The signal light reflectivity of the FG 141 is about 100% (99%, for example). An angled polished end surface of the optical fiber 71 is used as the antireflection terminator 136, and its reflective attenuation amount is greater than 50 dB, a sufficiently high value.

In the fourth example, the signal light transmission loss of the optical combiner 3 is about 0.5 dB. Since the signal light travels back and forth through the optical combiner 73, the transmission loss is about 1.0 dB. The signal light transmission loss of the optical circulator 137 is about 0.5 dB.

Without the signal light reflector 135, the fourth example will reduce to the conventional Raman amplifier as shown in FIG. 46. The signal light transmission loss of the optical isolator 134 is about 0.5 dB. Since the internal Raman gain of the conventional Raman amplifier is about 10 dB over the signal light wavelength of 1530–1550 nm, and the loss of the Raman fiber is 1.6 dB, the Raman gain is about 8.4 dB (10−1.6=8.4). Comparing the fourth example with the conventional technique, the signal light of the fourth example passes through the optical combiner 73 two more times and through the Raman fiber and optical circulator 137 one more time than in the conventional amplifier. Accordingly, an increase in the Raman gain is about 6.9 dB (8.4−0.5×2−0.5=6.9).

Figure 40:
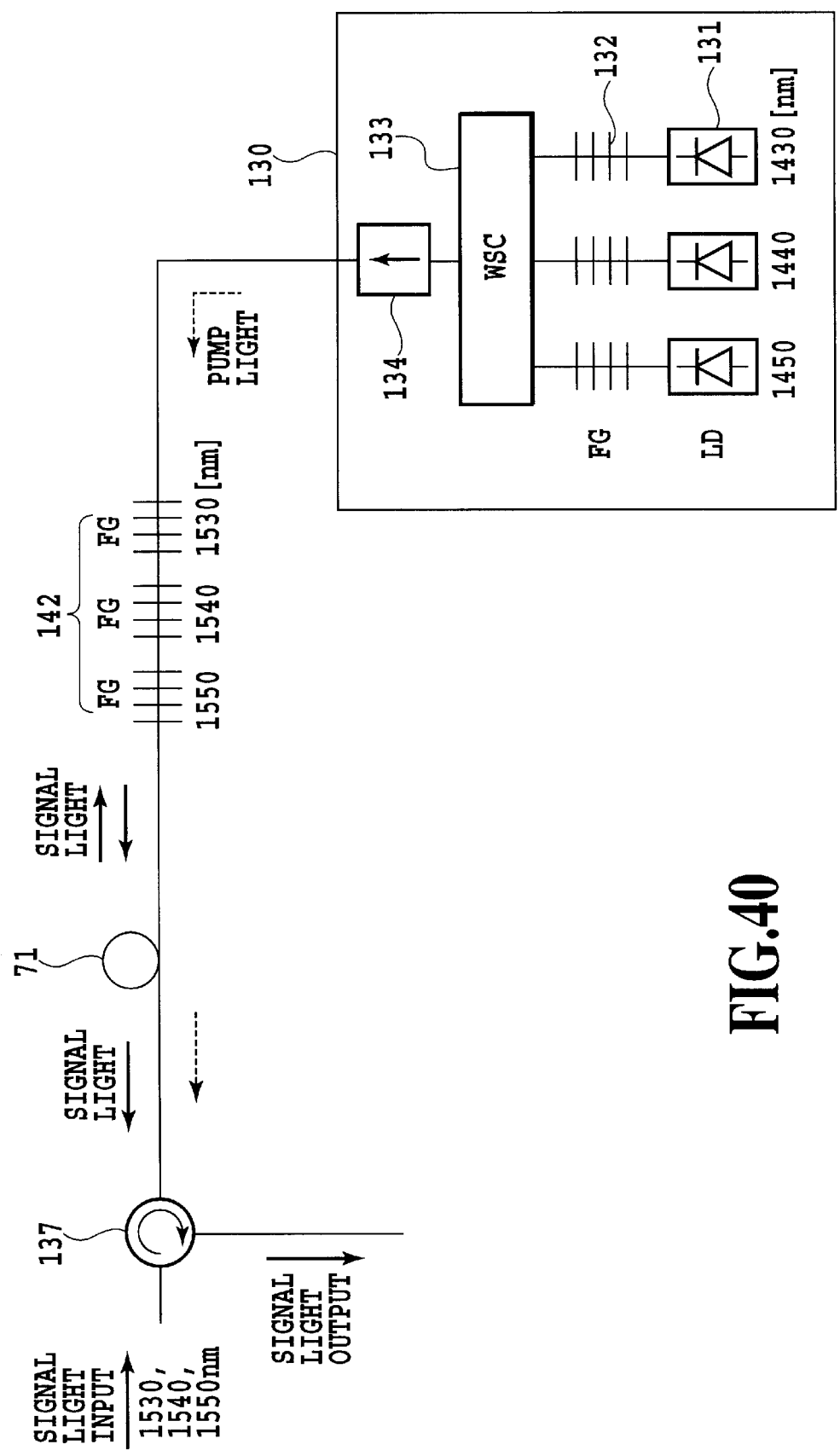
FIG. 40 is a block diagram showing a fifth example of the Raman amplifier in accordance with the present invention.

FIG. 40 is a block diagram showing a fifth example of the Raman amplifier in accordance with the present invention. As the signal light reflector 135 (see, FIG. 33), it uses the FGs 142 as shown in FIG. 32B, which individually reflect the 3-wavelength signal light. Each of the FGs 142 has the signal light reflectivity of about 100% (99%, for example), and the total pump light transmission loss of the three FGs is less than 0.5 dB. Comparing the fifth example with the conventional technique, the signal light of the fifth example passes through the Raman fiber 71 and optical circulator 137 one more time than in the conventional technique. Thus, as in the fourth example, an increase in the Raman gain is about 7.9 dB (8.4−0.5=7.9).

Figure 41:
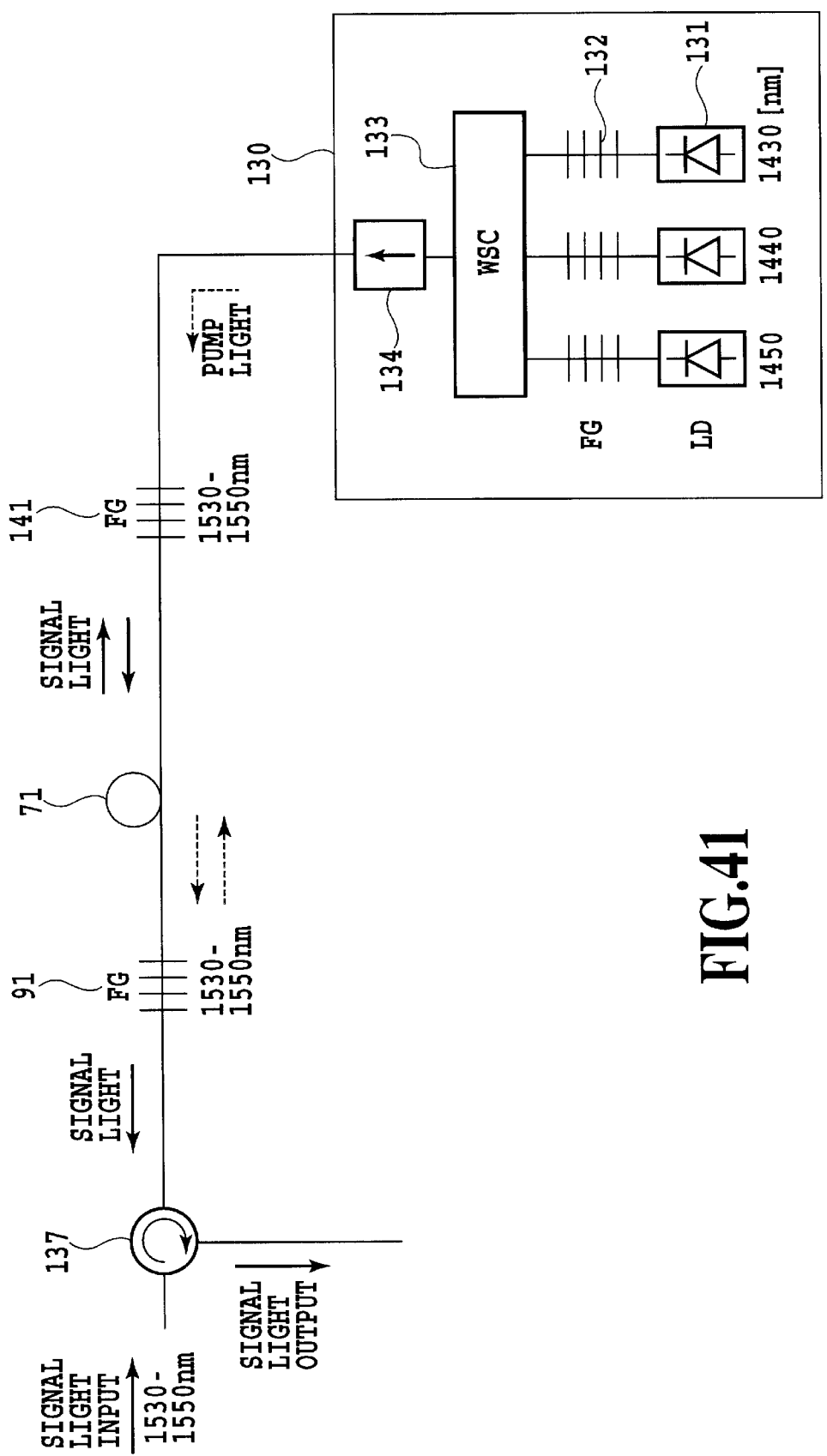
FIG. 41 is a block diagram showing a sixth example of the Raman amplifier in accordance with the present invention.

FIG. 41 is a block diagram showing a sixth example of the Raman amplifier in accordance with the present invention. It employs as the signal light reflector 135 (see, FIG. 34), the FG 141 as shown in FIG. 32A, which collectively reflects the 3-wavelength signal light, and as the pump light reflector 74, the FG 91 as shown in FIG. 27A, which collectively reflects the 3-wavelength pump light. The signal light reflectivity of the FG 141 operating as the signal light reflector 135 is about 100% (99%, for example), and the transmission loss of the pump light is less than 0.2 dB. On the other hand, the pump light reflectivity of the FG 91 operating as the pump light reflector 74 is about 100% (99%, for example), and the transmission loss of the signal light is less than 0.2 dB. The absorption coefficient, length and pump light loss (absorption value) of the Raman fiber for the pump light are 0.4 dB/km, 4 km and 1.6 dB, respectively. As described in connection with the first example, the internal Raman gain of the conventional Raman amplifier is about 10 dB at the signal light wavelength of 1530–1550 nm.

As described above, since the pump light loss of the Raman fiber is 1.6 dB, the pump light power reflected by the FG as the pump light reflector 74 is about 69 mW. Thus, the total input pump light power to the Raman fiber is about 169 mW, and the internal Raman gain in the sixth example is about 16.9 dB. In the sixth example, the signal light passes through the Raman fiber 71 and optical circulator 137 one more time than the conventional technique. As in the fifth example, an increase in the Raman gain is about 23.3 dB (16.9×2−0.5−10=23.3).

Figure 42:
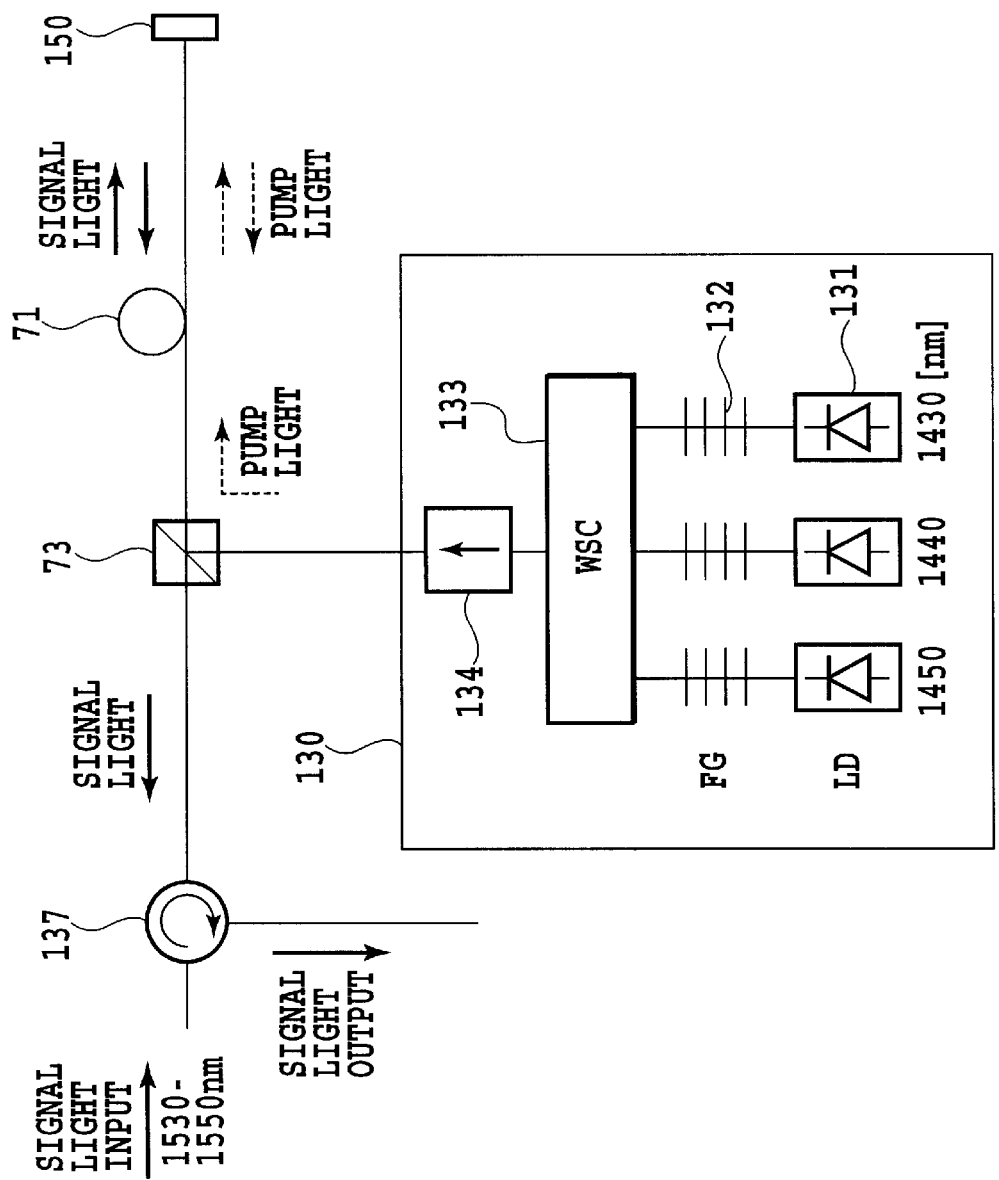
FIG. 42 is a block diagram showing a seventh example of the Raman amplifier in accordance with the present invention.

FIG. 42 is a block diagram showing a seventh example of the Raman amplifier in accordance with the present invention, which uses a mirror 150 that shares the signal light reflector 135 and pump light reflector 74 as shown in FIG. 35, and reflects both the signal light and pump light. Its reflectivity is about 100% (for example, 95%), and the signal light transmission loss of the optical combiner 73 is 0.5 dB. As in the first example, the internal Raman gain of the conventional Raman amplifier is about 10 dB at the signal light wavelength of 1530–1550 nm.

As described above, since the pump light loss of the Raman fiber is 1.6 dB, the pump light power reflected by the mirror 150 as the pump light reflector 74 is about 69 mW. Thus, the total input pump light power to the Raman fiber is about 169 mW. The internal Raman gain in the seventh example is about 16.9 dB. In the seventh example, the signal light passes through the optical combiner 73 two more times, and through the Raman fiber 71 and optical circulator 137 one more time than in the conventional technique. As in the sixth example, an increase in the Raman gain is about 23.3 dB (16.9×2−0.5−10=23.3).

Figure 43:
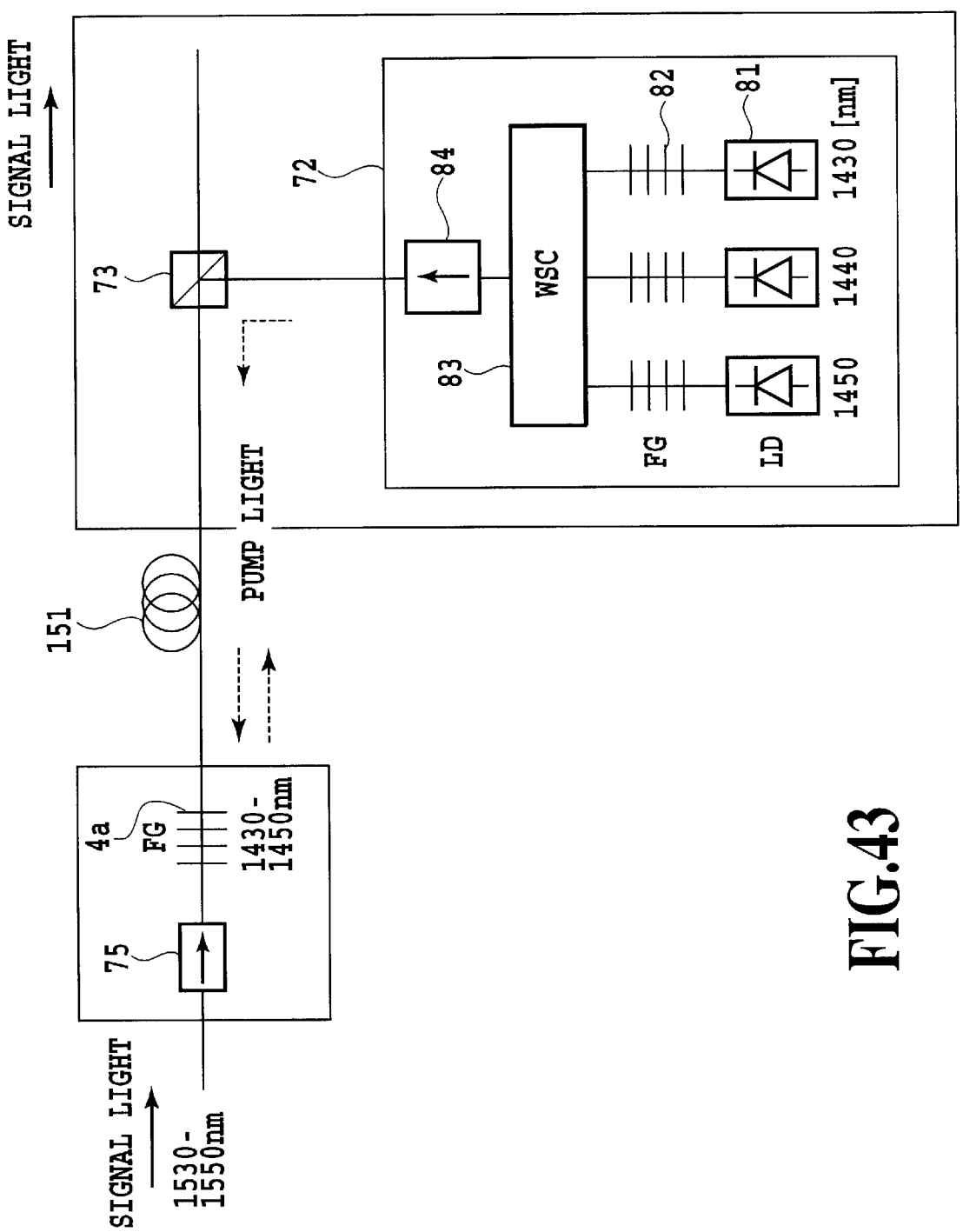
FIG. 43 is a block diagram showing an eighth example of the Raman amplifier in accordance with the present invention.

FIG. 43 is a block diagram showing an eighth example of the Raman amplifier in accordance with the present invention. The eighth example differs from the first example as shown in FIG. 36 which carries out the lumped amplification using the Raman fiber in that the eighth example carries out the distributed amplification using a transmission fiber 151. The Raman fiber is a DSF or SMF whose absorption coefficient for the pump light, length and pump light loss (absorption value) are about 0.2 dB/km, km and about 4 dB, respectively. Without the pump light reflector 74 (FG 74a), the eighth example will reduce to the conventional Raman amplifier as shown in FIG. 46. The internal Raman gain of the conventional Raman amplifier is about 10 dB and about 6 dB for the DSF and SMF, respectively, at the signal light wavelength of 1530–1550 nm.

As described above, since the pump light loss of the transmission fiber is 4 dB, the pump light power reflected by the FG 74a as the pump light reflector 74 is about 40 mW. Accordingly, the total input pump light power to the transmission fiber is about 140 mW. The internal Raman gain in the eighth example is about 14 dB and about 8.4 dB for the DSF and SMF, respectively, and an increase in the Raman gain is about 4 dB (14−10=4) and about 2.4 dB (8.4−6=2.4), respectively.

Figure 44:
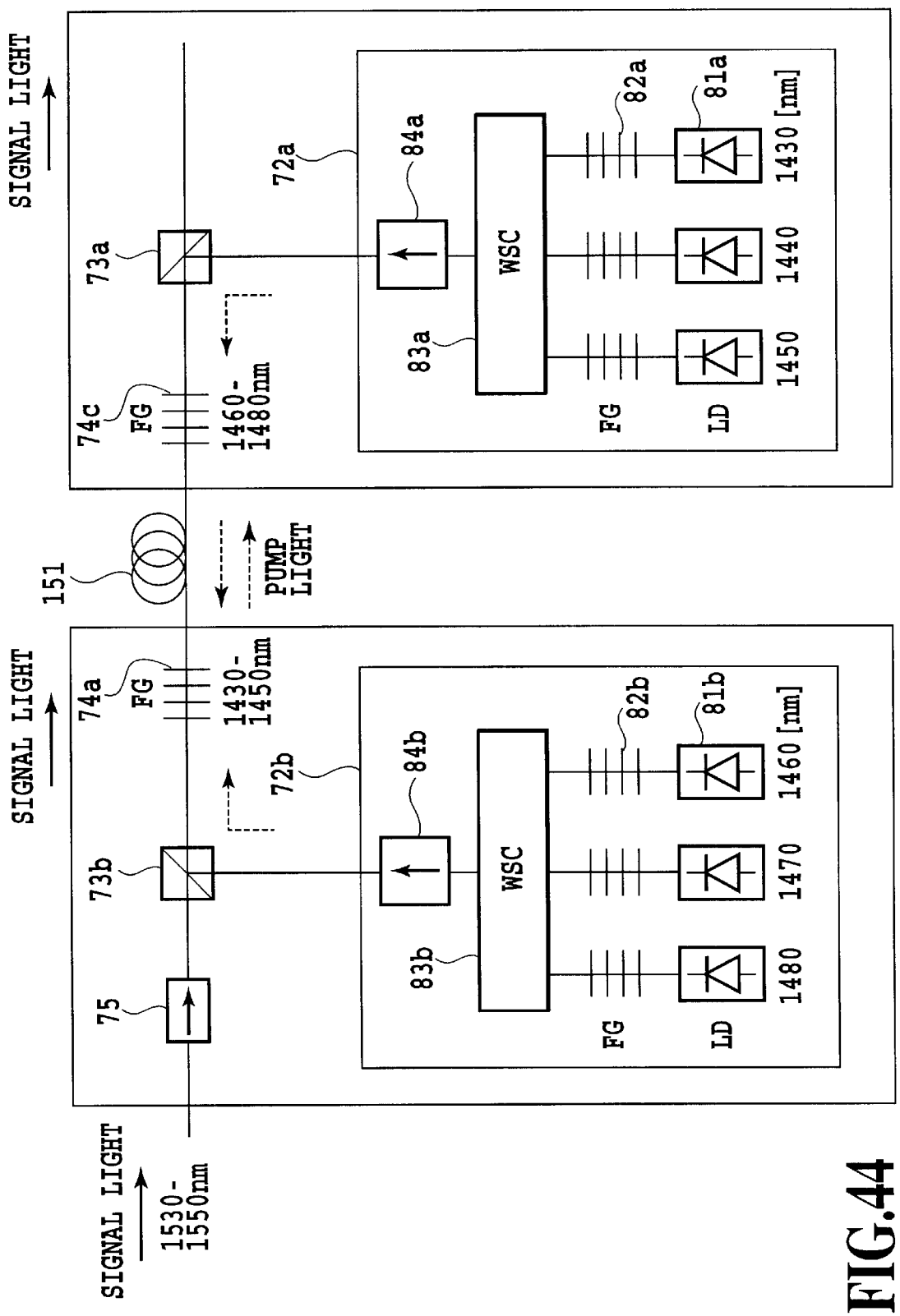
FIG. 44 is a block diagram showing a ninth example of the Raman amplifier in accordance with the present invention.

FIG. 44 is a block diagram showing a ninth example of the Raman amplifier in accordance with the present invention, which differs from the eighth example in that it comprises two pumping light sources 72a and 72b to carry out bidirectional pumping. The pumping light sources 72a and 72b comprise LDs 81a and 81b, FGs 82a and 82b, wavelength selective combiners 83a and 83b, and optical isolators 84a and 84b, respectively, and the optical combiners 73a and 73b are connected to the pumping light sources 72a and 72b.

The pump light wavelengths are 1430, 1440 and 1450 nm in the backward pumping light source 72a, and 1460, 1470 and 1480 nm in the forward pumping light source 72b. The signal light wavelengths corresponding to the pump light wavelengths are 1530–1580 nm. Without the two pump light reflectors 74a and 74c, the ninth example will reduce to the conventional Raman amplifier as shown in FIG. 46. The internal Raman gain of the conventional Raman amplifier is about 10 dB and about 6 dB for the DSF and SMF over the signal light wavelength 1530–1580 nm, respectively.

As in the eighth example, the internal Raman gain in the ninth example is about 14 dB and about 8.4 dB for the DSF and SMF, and the improvement in the Raman gain are about 4 dB and about 2.4 dB from 14−10=4 and 8.4−6=2.4, respectively.

Figure 45:
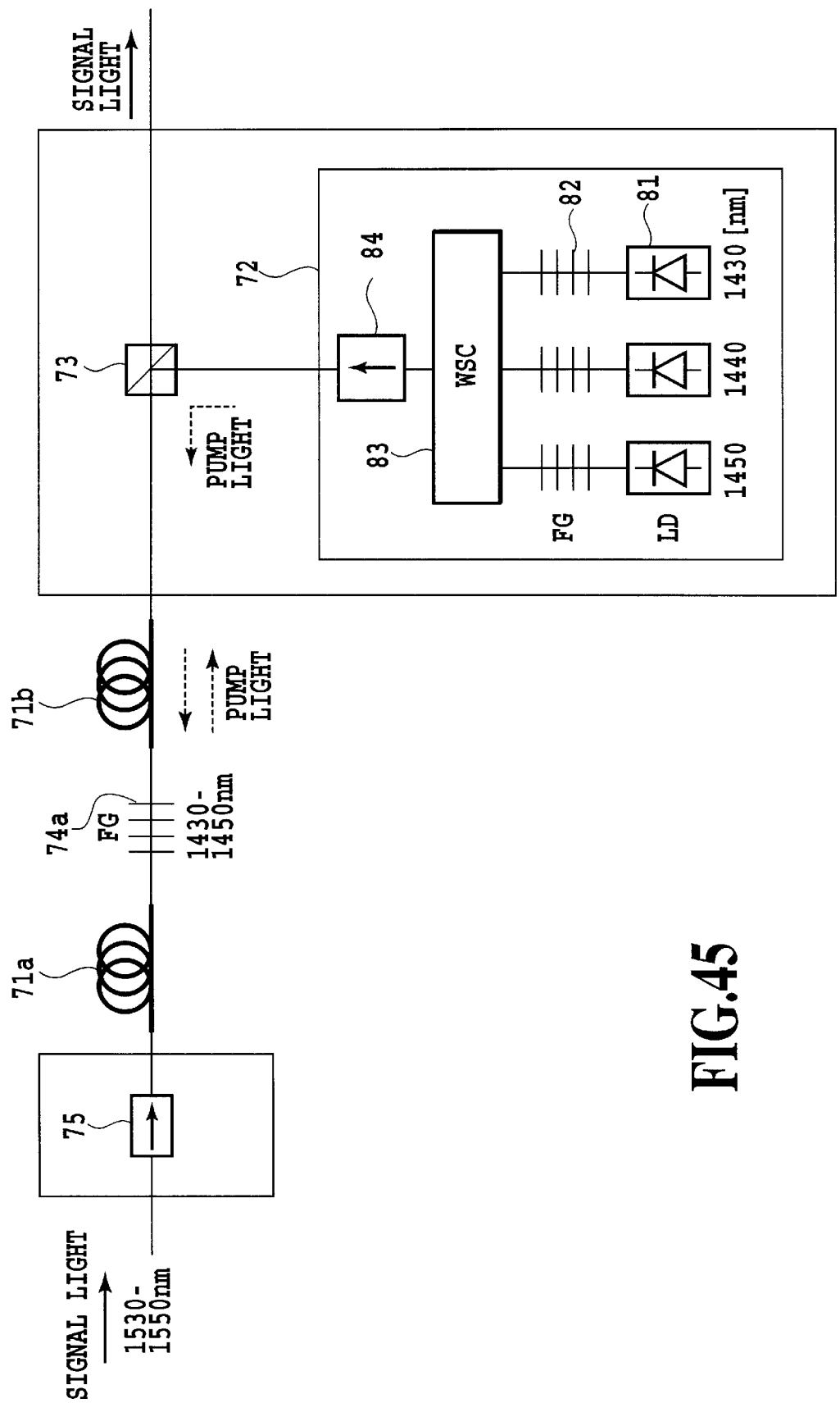
FIG. 45 is a block diagram showing a tenth example of the Raman amplifier in accordance with the present invention.

FIG. 45 is a block diagram showing a tenth example of the Raman amplifier in accordance with the present invention. Although it is similar to the eighth example as shown in FIG. 43, it differs from the eight example whose transmission fiber is a 20 km long DSF in that its transmission fiber consists of a connection of a 10 km long SMF 71a and a 10 km long RDF (reverse dispersion fiber). The fiber configuration of such a transmission path is applied to a high-speed transmission system. Comparing the SMF and RDF, the RDF has a higher pumping efficiency. Accordingly, the tenth example has an advantage over the eight example of having a greater Raman gain.

The foregoing examples of the Raman amplifier are applicable to constructing an optical fiber communication system, in which the signal light can include multiple wavelengths passing through the wavelength division multiplexing, or a single wavelength passing through the time division multiplexing. Likewise, the signal light in various fields associated the optical fiber communication system such as measurement can be either multiple or single wavelength light.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical amplifier comprising:
   an optical fiber operating as a gain medium of a Raman amplifier;
   a pumping light source for pumping the optical fiber; an optical combiner for combining pump light fed from said pumping light source with input signal light; and
   a pump light reflector for reflecting the pump light passing through said optical fiber;
   wherein said pumping light source comprises a laser diode with a gain independent of a polarization of propagated light, wherein said laser diode has a front end surface having antireflection processing and a rear end surface having reflection processing, and wherein said pump light reflector reflects the pump light with different wavelengths fed from said laser, and transmits the signal light at a low loss.

2. The optical amplifier as claimed in claim 1 wherein said pumping light source comprises a plurality of laser diodes for oscillating light waves of different wavelengths with a gain independent of polarization of propagated light, and a wavelength selective optical combiner and divider for combining the plurality of pump light waves fed from said plurality of laser diodes,
   wherein said laser diodes each have a front end surface undergone antireflection processing and a rear end surface undergone reflection processing, and wherein said pump light reflector reflects all the pump light waves with different wavelengths fed from said laser diodes, and transmits the signal light at a low loss.

3. The optical amplifier as claimed in claim 1, wherein said pumping light source comprises a laser diode with its front end surface undergone an antireflection processing and its rear end surface undergone a high reflection processing, wherein said pump light reflector reflects the pump light with different wavelengths fed from said laser diode, and transmits the signal light at a low loss, and wherein optical components transmitting the pump light from said pumping light source each consist of a polarization maintaining optical component for the pump light.

4. The optical amplifier as claimed in claim 1, wherein said pumping light source comprises a plurality of laser diodes for oscillating light waves of different wavelengths, and a wavelength selective optical combiner and divider for combining the plurality of pump light waves fed from said plurality of laser diodes, wherein said laser diodes each have a front end surface undergone antireflection processing and a rear end surface undergone reflection processing, wherein said pump light reflector reflects all the pump light waves with different wavelengths fed from said laser diodes, and transmits the signal light at a low loss, and wherein optical components transmitting the pump light from said pumping light source each consist of a polarization maintaining optical component for the pump light.

5. The optical amplifier as claimed in claim 1, wherein said pumping light source comprises a pair of laser diodes for oscillating light waves of a same wavelength, and a polarization beam combiner and divider for combining two pump light waves with different wavelengths from said laser diodes, wherein said laser diodes each have a front end surface having antireflection processing and a rear end surface having reflection processing, and wherein said pump light reflector reflects the pump light waves with different wavelengths fed from said laser diodes, and transmits the signal light at a low loss.

6. The optical amplifier as claimed in claim 1, wherein said pumping light source comprises a plurality of pairs of laser diodes, each pair including two laser diodes for oscillating light waves of a same wavelength; a natural number of polarization beam combiner and dividers each for combining pump light waves from two laser diodes in each pair, and a wavelength selective optical combiner and divider for combining the combined pump light waves output from said polarization beam combiner and dividers; and wherein said laser diodes each have a front end surface having antireflection processing and a rear end surface having reflection processing.

7. The optical amplifier as claimed in claim 1, wherein said pump light reflector consists of a fiber grating.

8. The optical amplifier as claimed in claim 1, wherein the pump light includes a plurality of wavelengths, and said pump light reflector comprises an optical fiber grating for each pumping light wavelength.

9. The optical amplifier as claimed in claim 1, wherein said pump light reflector comprises an optical combiner and divider of the signal light and pump light; and a mirror.

10. The optical amplifier as claimed in claim 9, wherein said optical combiner and divider comprises a dielectric multi-layer filter.

11. The optical amplifier as claimed in claim 1, wherein said pump light reflector consists of a mirror.

12. The optical amplifier as claimed in claim 1, wherein said optical fiber comprises a reflector of the pump light interposed between two different types of optical fibers with different Raman amplification pumping efficiency.

13. An optical amplifier comprising:
   an optical fiber operating as a gain medium of a Raman amplifier;
   a pumping light source for pumping said optical fiber from an opposite direction to a propagation direction of signal light;
   a signal light reflector for reflecting the signal light passing through said optical fiber;
   a pump light reflector for reflecting pump light passing through said optical fiber; and
   an optical circulator for receiving at its two different ports the signal light reflected by said signal light reflector and the input signal light,
   wherein said signal light reflector transmits the pump light fed from said pumping light source at a low loss, and said pump light reflector transmits the signal light at a low loss;
   wherein said pumping light source comprises a laser diode with a gain independent of a polarization of propagated light, wherein said laser diode has a front end surface having antireflection processing and a rear end surface having reflection processing, and wherein said pump light reflector reflects the pump light with different wavelengths fed from said laser diode, and transmits the signal light at a low loss.

14. The optical amplifier as claimed in claim 13, wherein said pumping light source comprises a plurality of laser diodes for oscillating light waves of different wavelengths with a gain independent of polarization of propagated light, and a wavelength selective optical combiner and divider for combining the plurality of pump light waves fed from said plurality of laser diodes, wherein said laser diodes each have a front end surface undergone antireflection processing and a rear end surface undergone reflection processing, and wherein said pump light reflector reflects all the pump light waves with different wavelengths fed from said laser diodes, and transmits the signal light at a low loss.

15. The optical amplifier as claimed in claim 13, wherein said pumping light source comprises a laser diode with its front end surface undergone an antireflection processing and its rear end surface undergone a high reflection processing, wherein said pump light reflector reflects the pump light with different wavelengths fed from said laser diode, and transmits the signal light at a low loss, and wherein optical components transmitting the pump light from said pumping light source each consist of a polarization maintaining optical component for the pump light.

16. The optical amplifier as claimed in claim 13, wherein said pumping light source comprises a plurality of laser diodes for oscillating light waves of different wavelengths; and a wavelength selective optical combiner and divider for combining the plurality of pump light waves fed from said plurality of laser diodes, wherein said laser diodes each have a front end surface having antireflection processing and a rear end surface having reflection processing, wherein said pump light reflector reflects all the pump light waves with different wavelengths fed from said laser diodes, and transmits the signal light at a low loss, and wherein optical components transmitting the pump light from said pumping light source each consist of a polarization maintaining optical component for the pump light.

17. The optical amplifier as claimed in claim 13, wherein said pumping light source comprises a pair of laser diodes for oscillating light waves of a same wavelength, and a polarization beam combiner and divider for combining two pump light waves with different wavelength from said laser diodes, wherein said laser diodes each have a front end surface having antireflection processing and a rear end surface having reflection processing, and wherein said pump light reflector reflects the pump light waves with different wavelengths fed from said laser diodes, and transmits the signal light at a low loss.

18. The optical amplifier as claimed in claim 13, wherein said pumping light source comprises a plurality of pairs of laser diodes, each pair including two laser diodes for oscillating light waves of a same wavelength; a natural number of polarization beam combiner and dividers each for combining pump light waves from two laser diodes in each pair, and a wavelength selective optical combiner and divider for combining the combined pump light waves output from said polarization beam combiner and dividers, and wherein said laser diodes each have a front end surface undergone antireflection processing and a rear end surface undergone reflection processing.

19. The optical amplifier as claimed in claim 13, wherein at least one of said pump light reflector and said signal light reflector consists of a fiber grating.

20. The optical amplifier as claimed in claim 13 wherein the pump light includes a plurality of wavelengths, and said pump light reflector comprises an optical fiber grating for each pumping light wavelength, or wherein the signal light includes a plurality of wavelengths, and said signal light reflector comprises an optical fiber grating for each signal light wavelength.

21. The optical amplifier as claimed in claim 13, wherein said pump light reflector comprises an optical combiner and divider of the signal light and pump light; and a mirror, or wherein said signal light reflector comprises an optical combiner and divider of the signal light and pump light; and a mirror.

22. The optical amplifier as claimed in claims 21, wherein said optical combiner and divider comprises a dielectric multi-layer filter.

23. The optical amplifier as claimed in claim 13, wherein said optical fiber comprises a reflector of the pump light interposed between two different types of optical fibers with different Raman amplification pumping efficiency.

24. An optical amplifier comprising:
an optical fiber operating as a gain medium of a Raman amplifier;
a pumping light source for pumping said optical fiber from a forward direction with respect to a propagation direction of signal light;
an optical combiner and divider for combining and dividing pump light fed from said pumping light source with and from input signal light;
a signal light reflector for reflecting the signal light passing through said optical fiber;
a pump light reflector for reflecting pump light fed from said pumping light source and passing through said optical fiber; and
an optical circulator for receiving at its two different ports the signal light reflected by said signal light reflector and the input signal light;
wherein when said signal light reflector is disposed closer to said optical fiber than said pump light reflector is, said signal light reflector transmits the pump light fed from said pumping light source at a low loss, whereas when said pump light reflector is disposed closer to said optical fiber than said signal light reflector is, said pump light reflector transmits the signal light at a low loss;
wherein said pumping light source comprises a laser diode with gain independent of a polarization of propagated light; wherein said laser diode has a front end surface having antireflection processing and a rear end surface having reflection processing, and wherein said pump light reflector reflects the pump light with different wavelengths fed from said laser, and transmits the signal light at a low loss.

25. The optical amplifier as claimed in claim 24, wherein said pumping light source comprises a plurality of laser diodes for oscillating light waves of different wavelengths with a gain independent of polarization of propagated light, and a wavelength selective optical combiner and divider for combining the plurality of pump light waves fed from said plurality of laser diodes, wherein said laser diodes each have a front end surface having antireflection processing and a rear end surface having reflection processing, and wherein said pump light reflector reflects all the pump light waves with different wavelengths fed from said laser diodes, and transmits the signal light at a low loss.

26. The optical amplifier as claimed in claim 24, wherein said pumping light source comprises a laser diode with its front end surface undergone an antireflection processing and its rear end surface undergone a high reflection processing, wherein said pump light reflector reflects the pump light with different wavelengths fed from said laser diode, and transmits the signal light at a low loss, and wherein optical components transmitting the pump light from said pumping light source each consist of a polarization maintaining optical component for the pump light.

27. The optical amplifier as claimed in claim 24, wherein said pumping light source comprises a plurality of laser diodes for oscillating light waves of different wavelengths, and a wavelength selective optical combiner and divider for combining the plurality of pump light waves fed from said plurality of laser diodes, wherein said laser diodes each have a front end surface having antireflection processing and a rear end surface having reflection processing, wherein said pump light reflector reflects all the pump light waves with different wavelengths fed from said laser diodes, and transmits the signal light at a low loss, and wherein optical components transmitting the pump light from said pumping light source each consist of a polarization maintaining optical component for the pump light.

28. The optical amplifier as claimed in claim 24, wherein said pumping light source comprises a pair of laser diodes for oscillating light waves of a same wavelength, and polarization beam combiner and divider for combining two pump light waves with different wavelengths from said laser diodes, wherein said laser diodes each have a front end surface having antireflection processing and a rear end surface having reflection processing, and wherein said pump light reflector reflects the pump light waves with different wavelengths fed from said laser diodes; and transmits the signal light at a low loss.

29. The optical amplifier as claimed in claim 24, wherein said pumping light source comprises a plurality of pairs of laser diodes, each pair including two laser diodes for oscillating light waves of a same wavelength; a natural number of polarization beam combiner and dividers each for combining pump light waves from two laser diodes in each pair, and a wavelength selective optical combiner and divider for combining the combined pump light waves output from said polarization beam combiner and dividers, and wherein said laser diodes each have a front end surface undergone antireflection processing and a rear end surface undergone reflection processing.

30. The optical amplifier as claimed in claim 24, wherein at least one of said pump light reflector and said signal light reflector consists of a fiber grating.

31. The optical amplifier as claimed in claim 24, wherein the pump light includes a plurality of wavelengths, and said pump light reflector comprises an optical fiber grating for each pumping light wavelength, or wherein the signal light includes a plurality of wavelengths, and said signal light reflector comprises an optical fiber grating for each signal light wavelength.

32. The optical amplifier as claimed in claim 24, wherein said pump light reflector comprises an optical combiner and divider of the signal light and pump light; and a mirror, or wherein said signal light reflector comprises an optical combiner and divider of the signal light and pump light; and a mirror.

33. The optical amplifier as claimed in claim 32, wherein said optical combiner and divider comprises a dielectric multi-layer filter.

34. The optical amplifier as claimed in claim 24, wherein at least one of said pump light reflector and said signal light reflector consists of a mirror.

35. The optical amplifier as claimed in claim 24, wherein said optical fiber comprises a reflector of the pump light interposed between two different types of optical fibers with different Raman amplification pumping efficiency.

36. An optical fiber communication system for transmitting signal light via an optical fiber using an optical amplifier, said optical amplifier comprising:

an optical fiber operating as a gain medium of a Raman amplifier;

a pumping light source for pumping the optical fiber;

an optical combiner for combining pump light fed from said pumping light source with input signal light;

a pump light reflector for reflecting the pump light passing through said optical fiber, wherein said optical fiber is a transmission optical fiber for amplifying the optical signal dispersedly; and said optical fiber comprises a first type of optical fiber operating as a gain medium of a Raman amplifier and a second type of optical fiber operating as a gain medium of a Raman amplifier with Raman amplification pumping efficiency higher than that of the first optical fiber adjacent said optical combiner and a reflector of the pump light are interposed between the two different types of optical fibers with different Raman amplification pumping efficiencies.

37. The optical fiber communication system as claimed in claim 36, wherein said pump light reflector consists of a fiber grating.

38. The optical fiber communication system as claimed in claim 36, wherein the pump light includes a plurality of wavelengths, and said pump light reflector comprises an optical fiber grating for each pump light wavelength.

39. The optical fiber communication system as claimed in claim 36 wherein said pump light reflector comprises an optical combiner and divider of the signal light and pump light; and a mirror.

40. The optical fiber communication system as claimed in claim 39, wherein said optical combiner and divider comprises a dielectric multi-layer filter.

41. The optical fiber communication system as claimed in claim 36, wherein said pump light reflector consists of a mirror.

* * * * *